US008164604B2

United States Patent
Chung et al.

(10) Patent No.: US 8,164,604 B2
(45) Date of Patent: Apr. 24, 2012

(54) FLAT PANEL DISPLAY DEVICE AND METHOD OF CONTROLLING PICTURE QUALITY OF FLAT PANEL DISPLAY DEVICE

(75) Inventors: In-Jae Chung, Gwacheon-si (KR); Deuk-Su Lee, Yongin-si (KR); Jong Hee Hwang, Osan-si (KR)

(73) Assignee: LG Display Co., Ltd., Seoul (KR)

( * ) Notice: Subject to any disclaimer, the term of this patent is extended or adjusted under 35 U.S.C. 154(b) by 1369 days.

(21) Appl. No.: 11/636,604

(22) Filed: Dec. 11, 2006

(65) Prior Publication Data

US 2008/0001869 A1  Jan. 3, 2008

(30) Foreign Application Priority Data

Jun. 29, 2006  (KR) .................. 10-2006-0059303

(51) Int. Cl.
*G09G 5/02*  (2006.01)
*G09G 3/36*  (2006.01)

(52) U.S. Cl. ......................... 345/694; 345/98

(58) Field of Classification Search ............ 345/87–100, 345/204, 214, 690, 698, 694; 348/744, 758, 348/177–194; 349/5, 8, 192
See application file for complete search history.

(56) References Cited

U.S. PATENT DOCUMENTS

| | | | | |
|---|---|---|---|---|
| 5,504,504 A | * | 4/1996 | Markandey et al. | 345/214 |
| 7,733,313 B2 | * | 6/2010 | Hwang | 345/88 |
| 7,742,028 B2 | * | 6/2010 | Nitta et al. | 345/88 |
| 7,786,971 B2 | * | 8/2010 | Chung et al. | 345/98 |
| 7,889,165 B2 | * | 2/2011 | Hwang | 345/88 |
| 8,059,143 B2 | * | 11/2011 | Chung et al. | 345/694 |
| 2002/0113766 A1 | | 8/2002 | Keeney et al. | |
| 2005/0088455 A1 | * | 4/2005 | Chang | 345/603 |
| 2005/0179675 A1 | | 8/2005 | Hekstra et al. | |
| 2007/0126975 A1 | * | 6/2007 | Choi et al. | 349/192 |
| 2007/0257866 A1 | * | 11/2007 | Cok | 345/76 |

FOREIGN PATENT DOCUMENTS

| | | |
|---|---|---|
| EP | 0706165 | 4/1996 |
| JP | 2003-066924 | 3/2003 |

* cited by examiner

*Primary Examiner* — Sumati Lefkowitz
*Assistant Examiner* — Rodney Amadiz
(74) *Attorney, Agent, or Firm* — McKenna Long & Aldridge, LLP

(57) ABSTRACT

A flat panel display device includes a display panel having at least one link pixel which has a non-defect area and a panel defect area and where adjacent pixels are linked to each other; a memory which stores a first compensation data for compensating the data which are to be displayed in the panel defect area, a second compensation data for compensating the data of a bordering part between the panel defect area and the non-defect area, and a third compensation data for compensating the data which are to be displayed in the link pixel. The first compensation data is adjusted through at spatial dispersion or temporal dispersion; the data that are to be displayed in a fixed area inclusive of the boundary are adjusted by dispersing the second compensation data to the fixed area inclusive of the boundary; the data that are to be displayed in the link pixel are adjusted to the third compensation data.

14 Claims, 62 Drawing Sheets

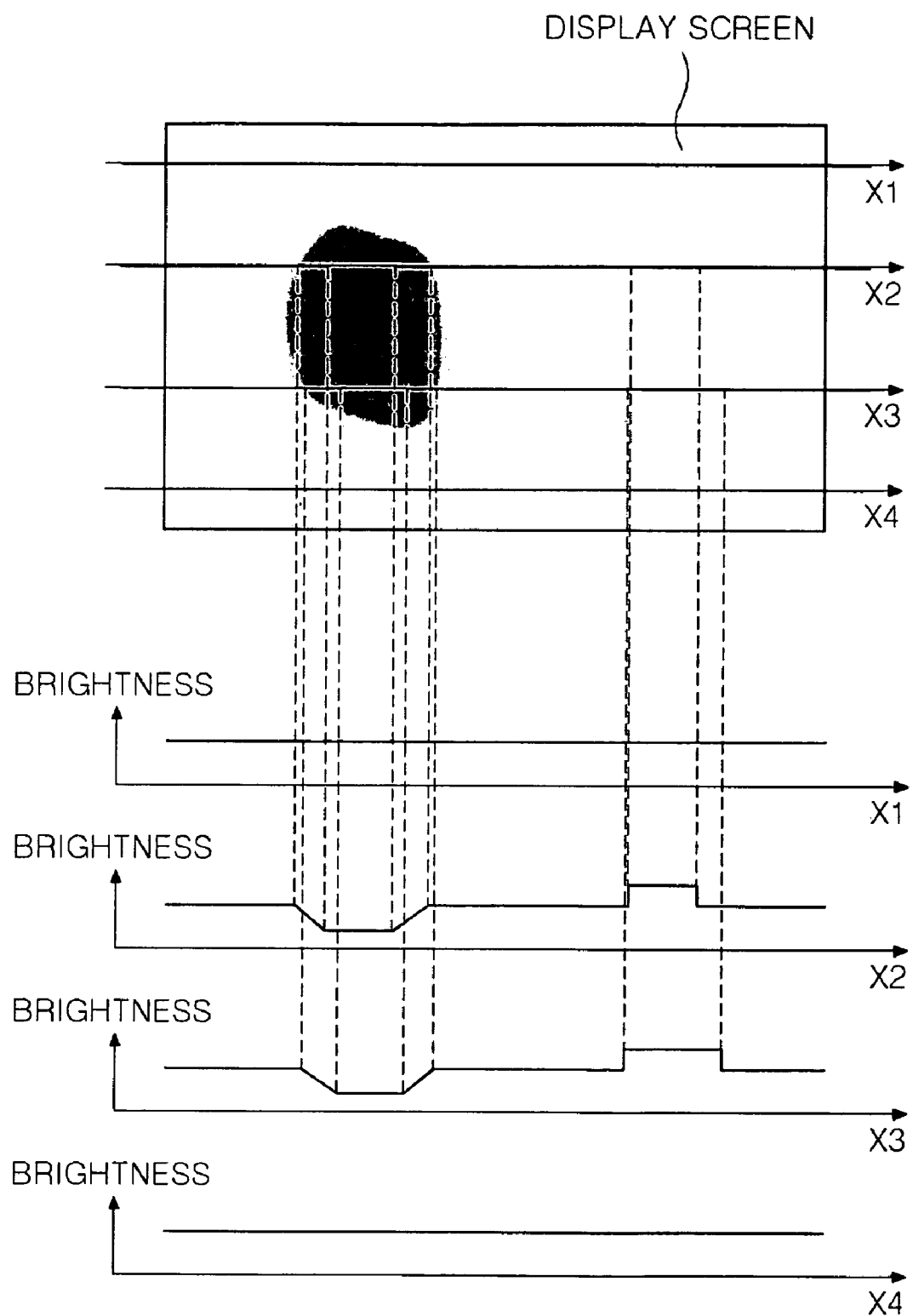

DISPLAY SCREEN

FIG.16
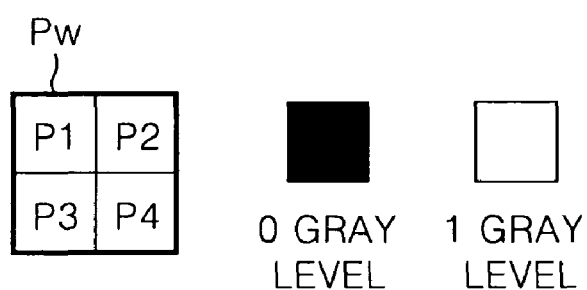
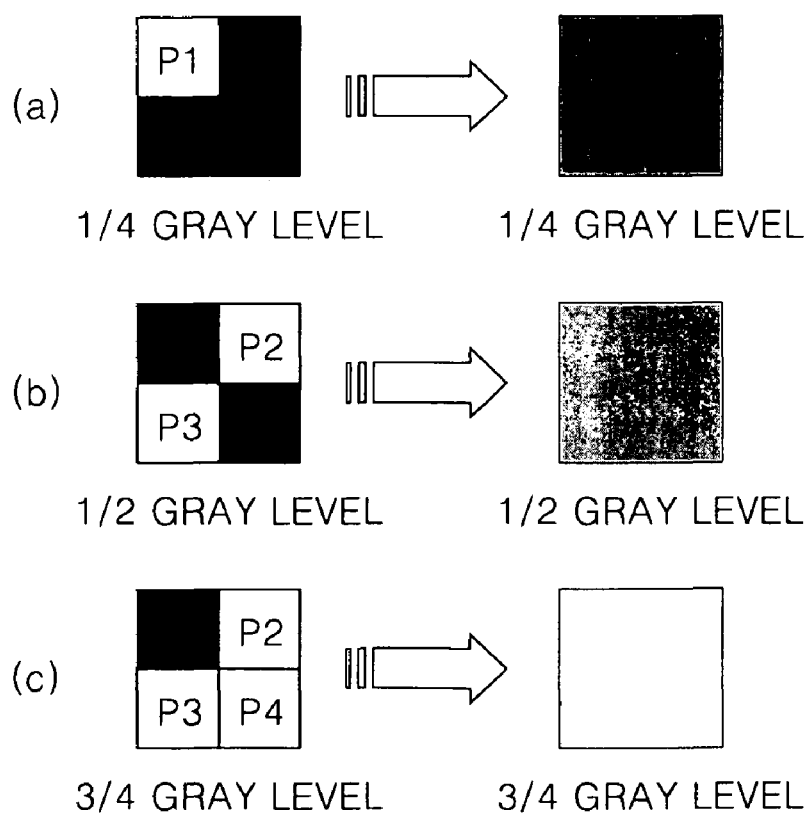

FIG.19A
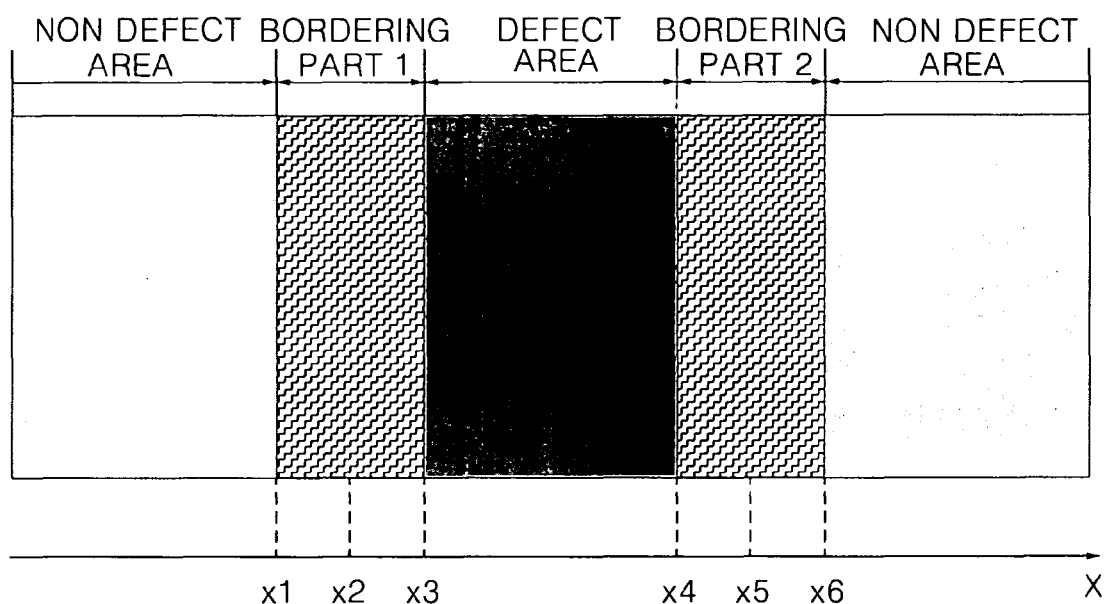
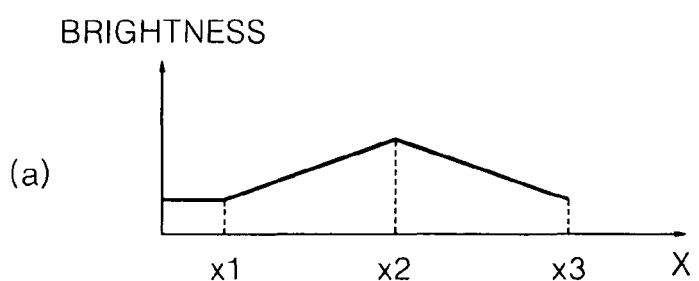
(a)
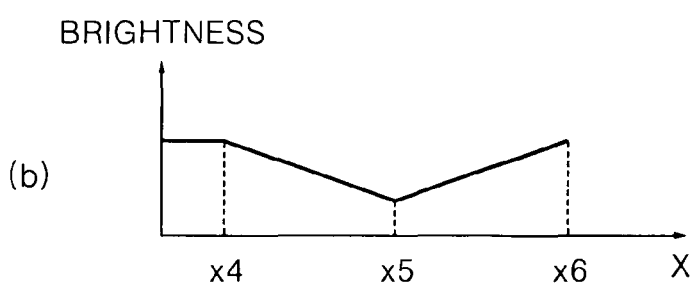
(b)

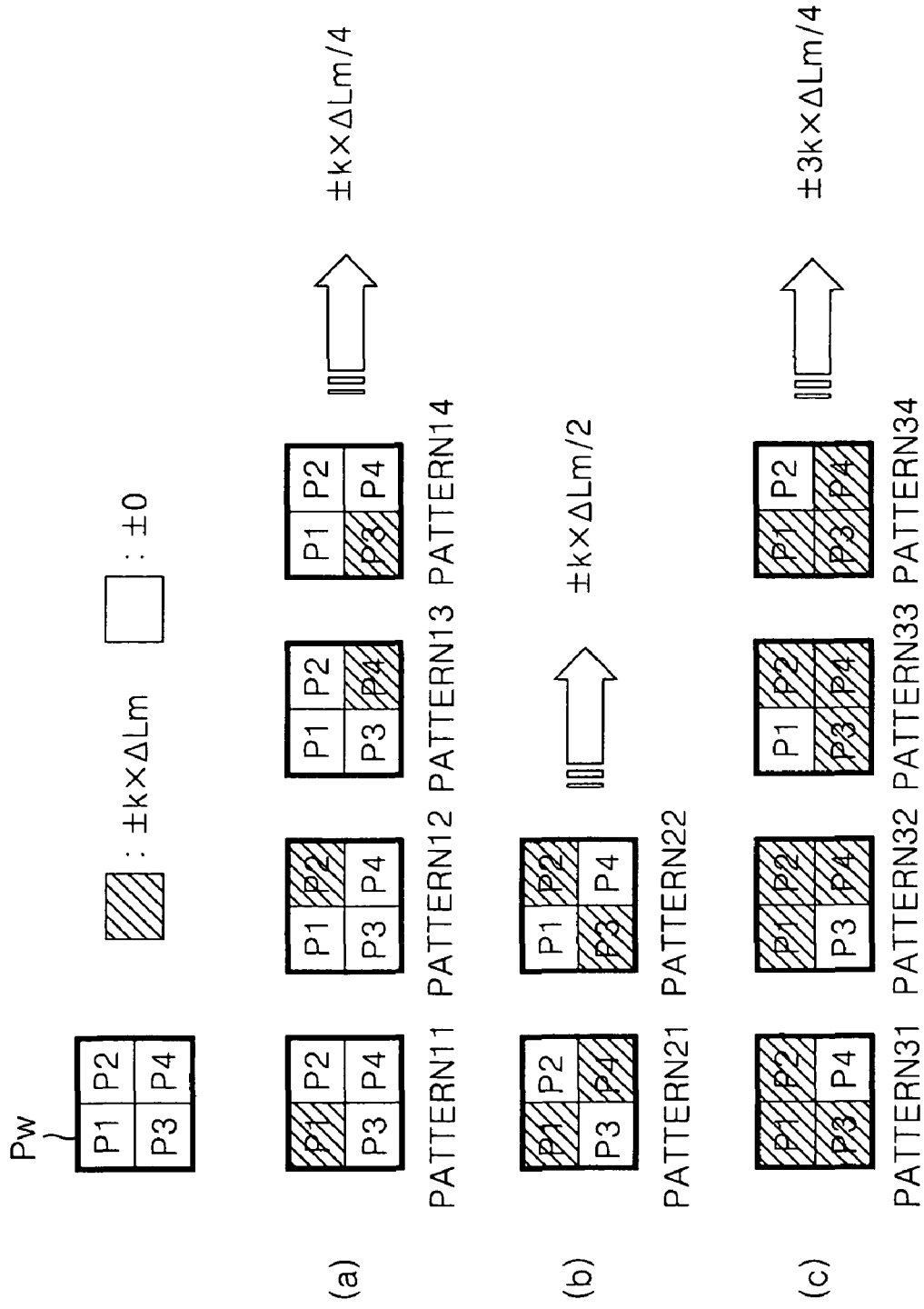

FIG.19D
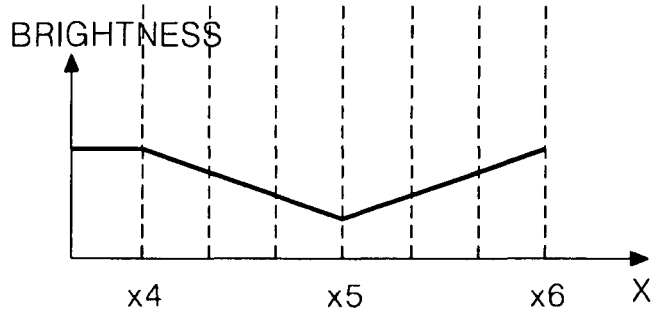

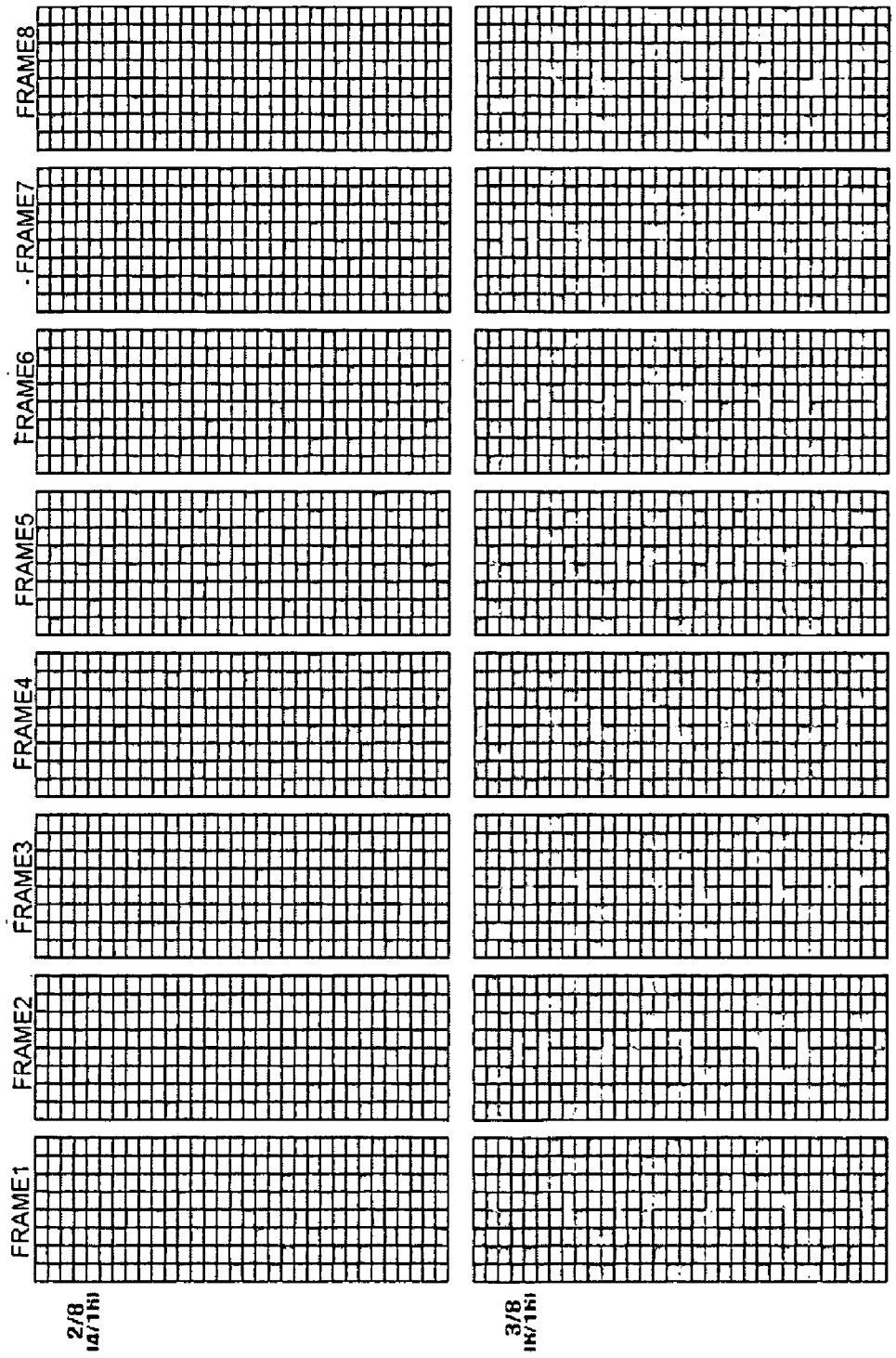

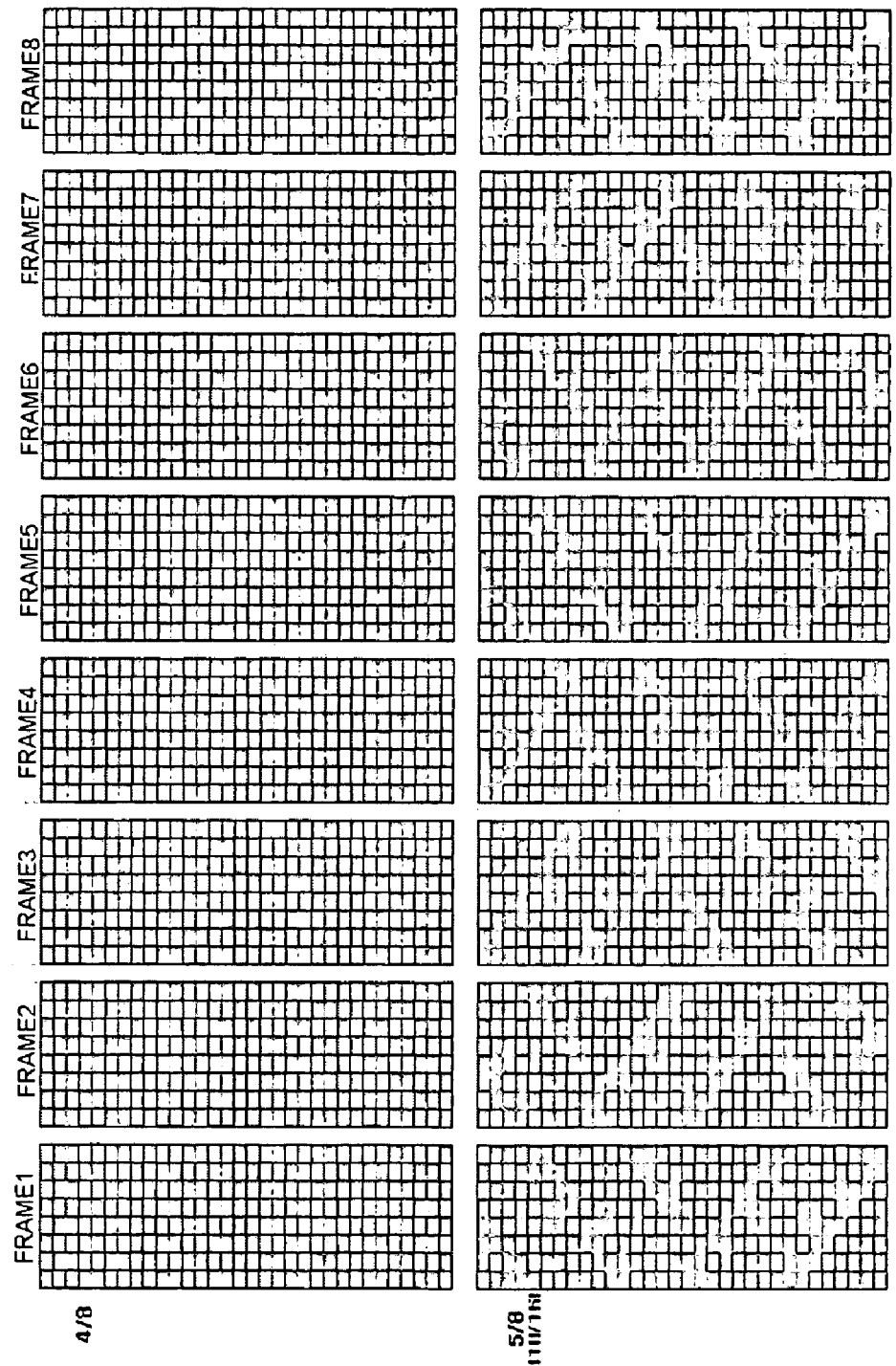

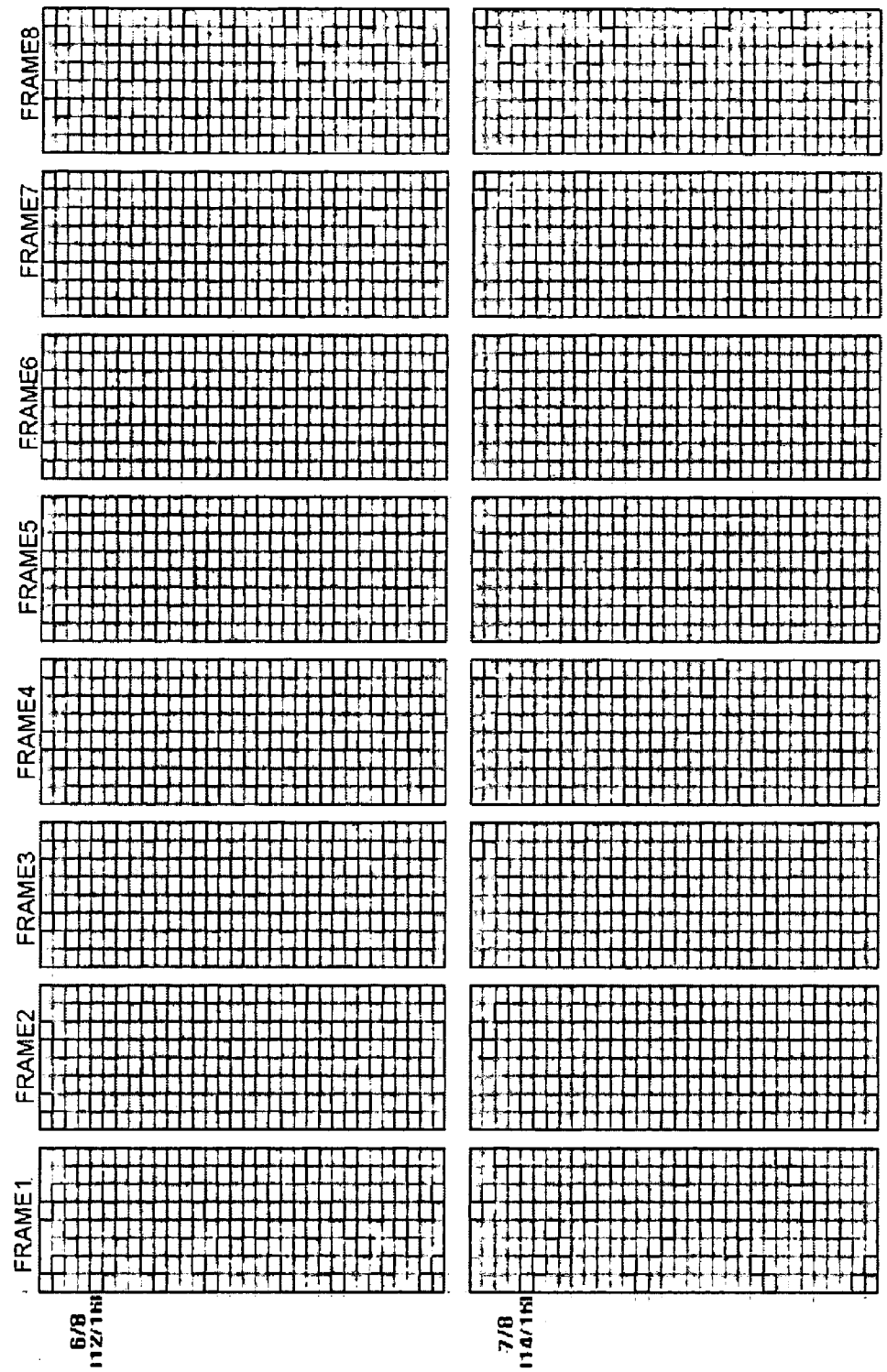

FLAT PANEL DISPLAY DEVICE AND METHOD OF CONTROLLING PICTURE QUALITY OF FLAT PANEL DISPLAY DEVICE

This application claims the benefit of the Korean Patent Application No. P2006-0059303 filed on Jun. 29, 2006, which is hereby incorporated by reference for all purposes as if fully set forth herein.

BACKGROUND OF THE INVENTION

1. Field of the Invention

The present invention relates to a flat panel display device, and more particularly to a flat panel display device that is capable of compensating for a panel defect via a repair process and optimizing the data, which are to be displayed in the panel defect area, with a compensation value of a compensation circuit, and a picture quality controlling method thereof.

2. Description of the Related Art

Recently, various flat panel display devices with reduced weight and size, which have been a disadvantage of a cathode ray tube, are becoming more common. Flat panel display devices include liquid crystal display, field emission display, plasma display panel, organic light emitting diode, etc.

The flat panel display devices include a display panel for displaying a picture, but a panel defect may be found during a test process in such a display panel.

The picture quality defect appearing during the test process is mainly causingd during the manufacturing process. For example, the panel defect can be causingd by a deviation in an amount of exposure, the number difference of lens of an exposure machine, etc. in an overlapping exposure process. The panel defect causingd by the process deviation can be manifested as a fixed form such as dot, line, belt, circle, polygon, etc, as illustrated in FIG. 1 to 5, or as an undetermined form.

A repair process such as a thin film forming, a patterning process, etc., is carried out in order to recover the panel defect, but the panel defect recovered by the repair process is limited and the defective product may have to be disposed as a waste if the panel defect is too much. Further, in most cases, brightness or chromaticity in an area where there has been the panel defect appears different from a non-defect area even if the repair process is carried out.

The repair process for a pixel defect which appears as the dot shape in the panel defect mainly includes a method of making the defect pixel a dark spot. But, the created dark spot is almost not perceived in a black gray level as in FIG. 6A, but is clearly perceived as a dark spot in a display screen of a middle gray level and a white gray level, as in FIGS. 6B and 6C.

As a result, there is a limit in compensating a picture quality deterioration causingd by the panel defect with only the repair process of creating a dark spot for recovering the panel defect.

SUMMARY OF THE INVENTION

Accordingly, the present invention is directed to a flat panel display and method of controlling picture quality thereof that substantially obviates one if more of the limitations due to the problems of the prior art.

Accordingly, it is an advantage of the present invention to provide to a flat panel display device that is adaptive for compensating a panel defect with a repair process and optimizing the data, which are to be displayed in the panel defect area, with a compensation value of a compensation circuit, and a picture quality controlling method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other advantages of the invention, a flat panel display device according to an aspect of the present invention includes a display panel having a non-defect area and a panel defect area; a memory to store first compensation data for compensating the display panel in the panel defect area, a second compensation data for compensating a bordering part between the panel defect area and the non-defect area, and a third compensation data for compensating data outside the defect area; a first compensation part to change the data that are to be displayed in the panel defect area to the first compensation data by dispersing the first compensation data to the panel defect area; a second compensation part to change the data that are to be displayed in a fixed area inclusive of the boundary to the second compensation data by dispersing the second compensation data to the fixed area inclusive of the boundary; and a driver for driving the display panel using the data which are changed by the first and second third compensation parts.

In another aspect of the present invention, a method of controlling picture quality of a flat panel display device includes determining a first compensation data for compensating the data that are to be displayed in a panel defect area of the display panel, a second compensation data for compensating the data that are to be displayed in a bordering part between the panel defect area and a non-defect area of the display panel, storing the first and second compensation data to a memory; a first compensation step of adjusting the data that are to be displayed in the panel defect area to the first compensation data through a dispersion method; a second compensation step of adjusting the data that are to be displayed in a fixed area inclusive of the boundary to the second compensation data by dispersing the second compensation data to the fixed area inclusive of the boundary; driving the display panel by using of the data which are adjusted by the first to third compensation parts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 1 to 5 are diagrams representing a panel defect area of a display panel;

FIGS. 15, 16, 17 and 18 are diagrams for explaining a frame rate control and a dithering;

FIGS. 19A to 19D are diagrams representing applying various dither patterns in accordance with a brightness characteristic in a bordering part of a panel defect area and a non-defect area of a display panel;

FIGS. 23A to 23D are diagrams representing dither patterns of a frame rate control according to another embodiment of the present invention;

DETAILED DESCRIPTION OF THE ILLUSTRATED EMBODIMENTS

Reference will now be made in detail to embodiments of the present invention, examples of which are illustrated in the accompanying drawings.

Hereinafter, with reference to FIGS. 7A to 37, embodiments of the present invention will be explained as follows. The below embodiments will be explained with respect to a liquid crystal display device in flat panel display devices.

Figure 1:
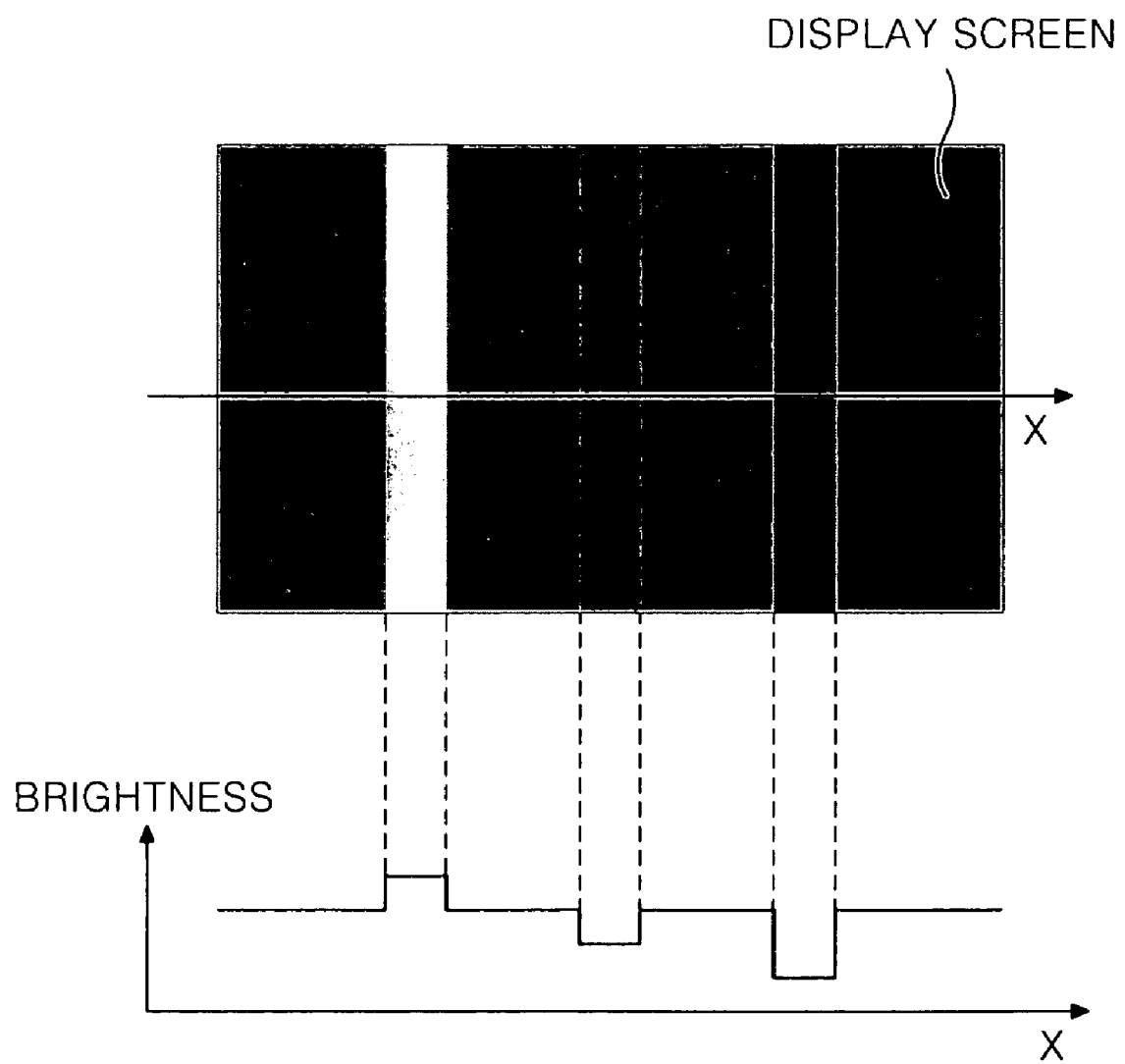
Figure 2:
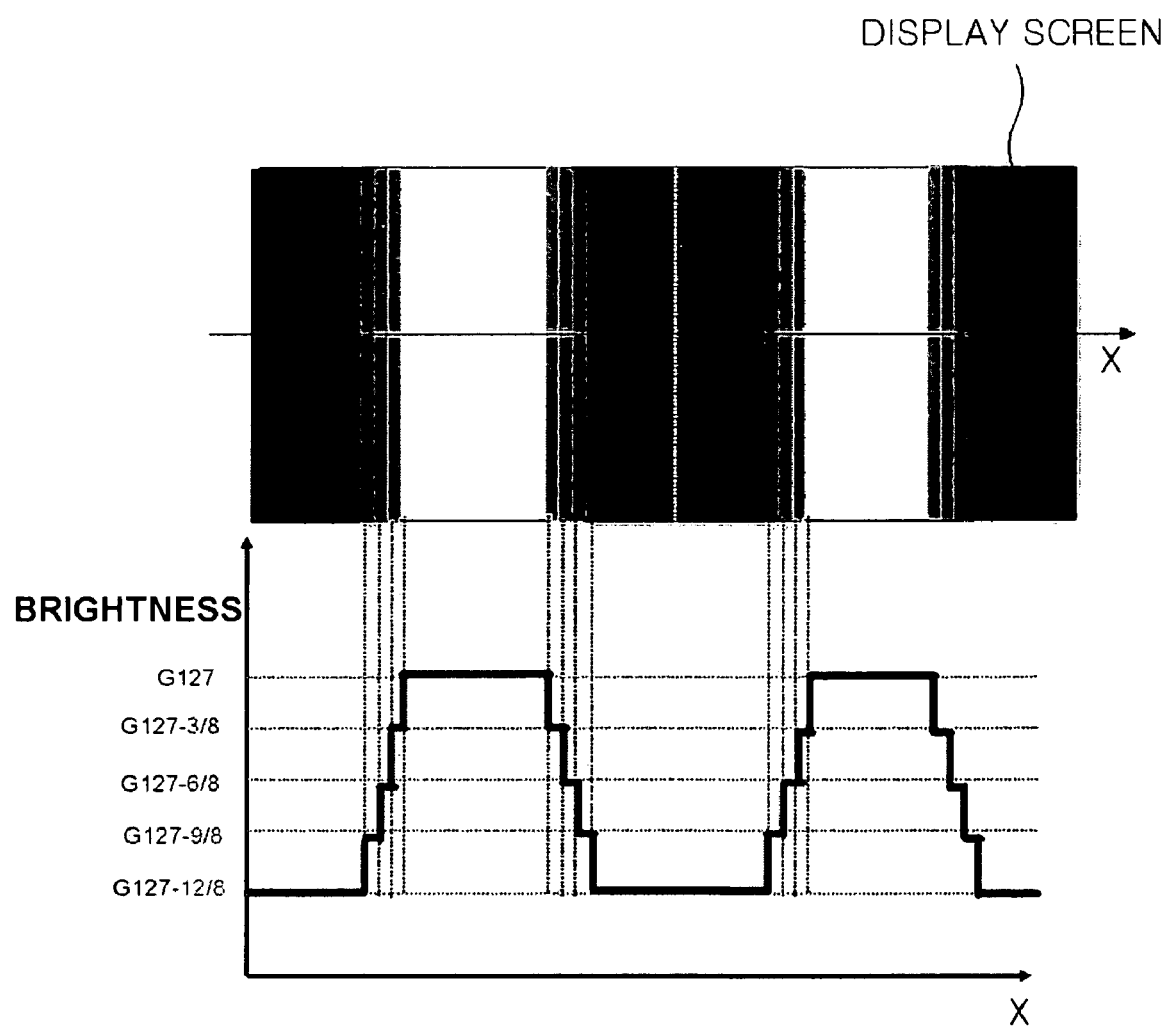
Figure 3:
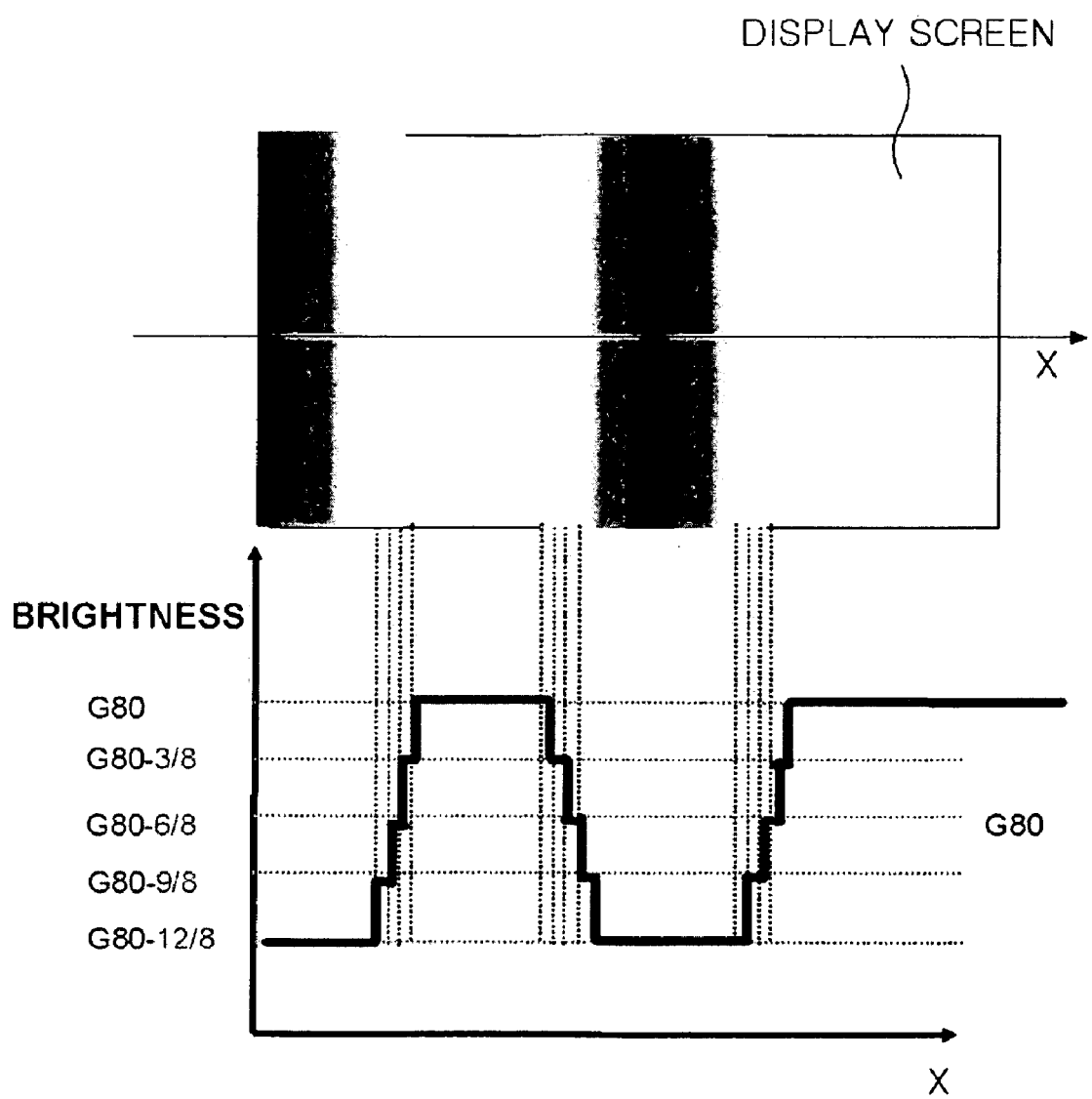
Figure 4:
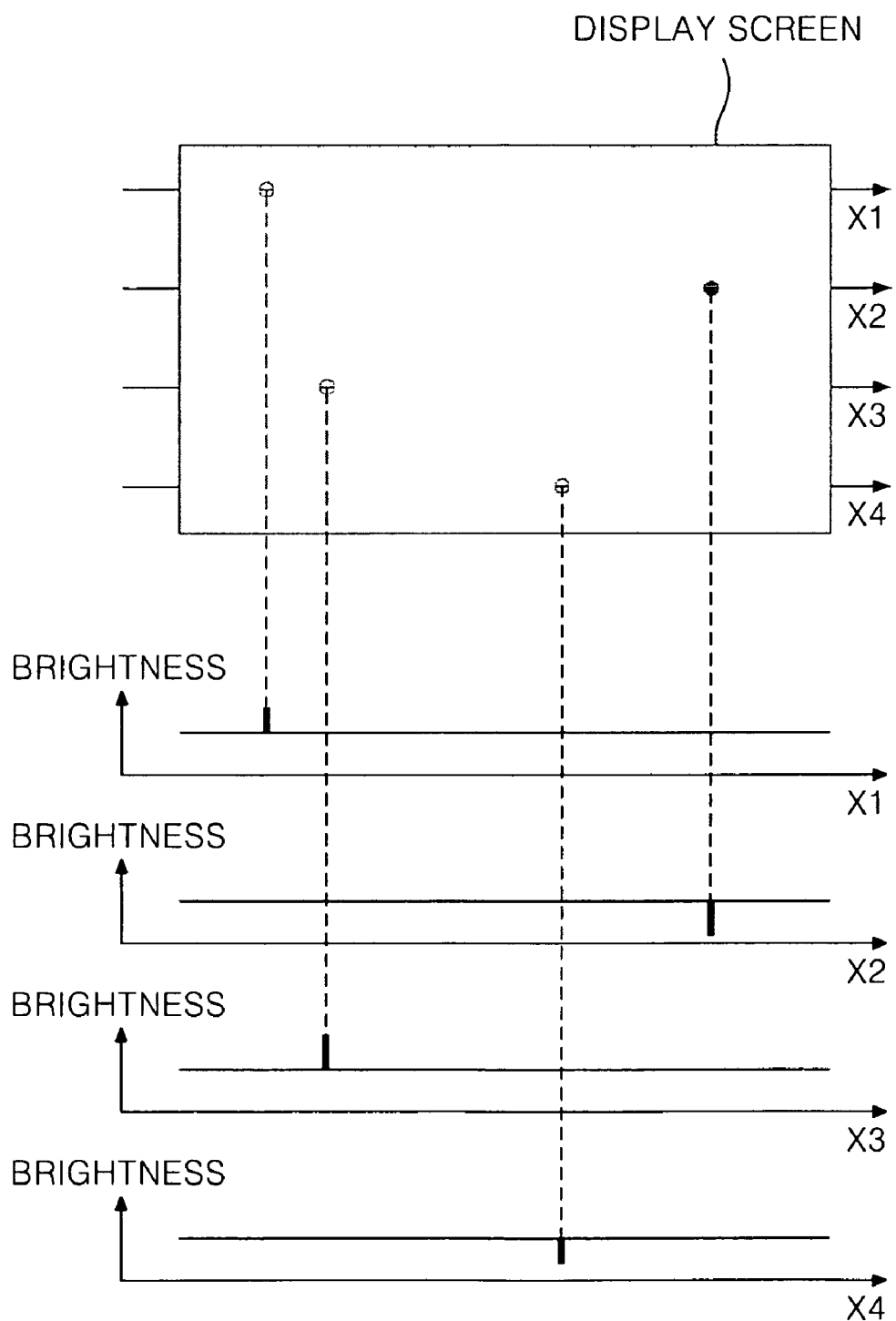
Figure 6A:
FIGS. 6A to 6C are diagrams representing the degree of perception for each gray level of a defect pixel which is made as a dark spot.
Figure 6B:
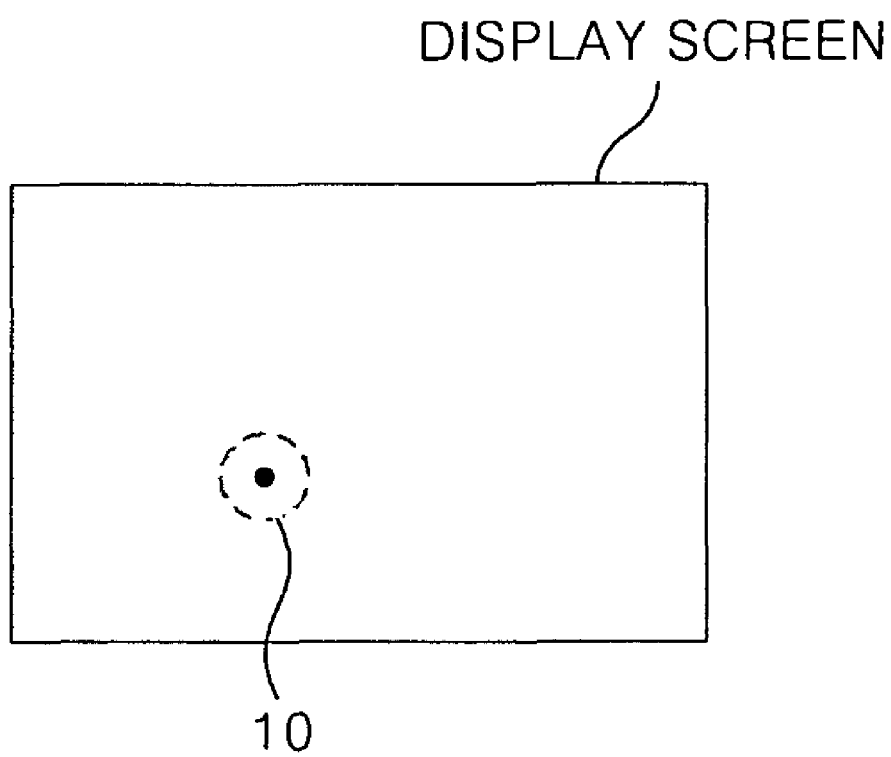
Figure 6C:
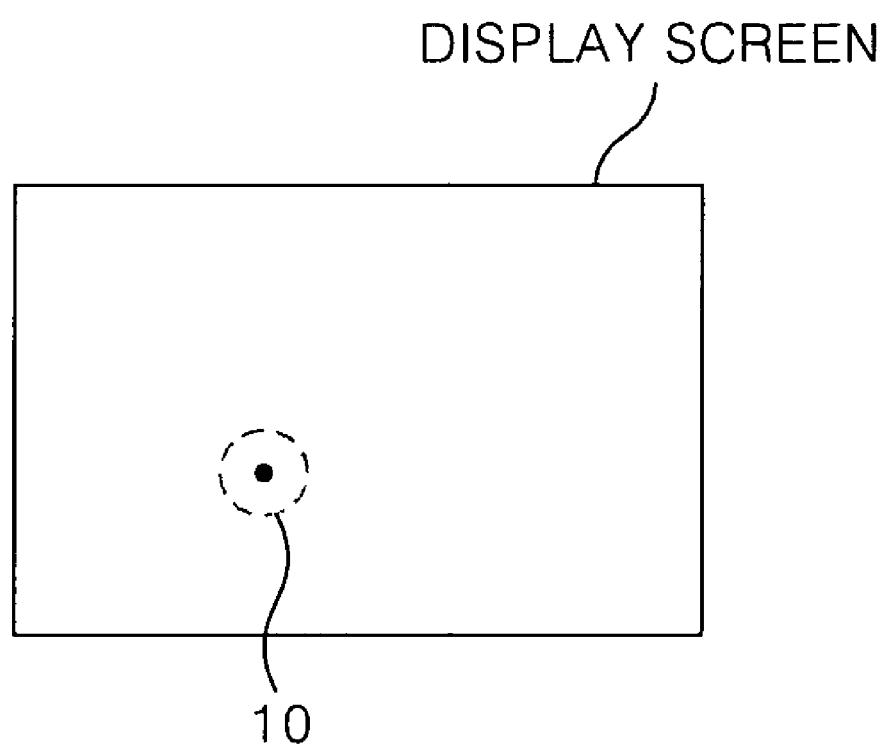
Figure 7A:
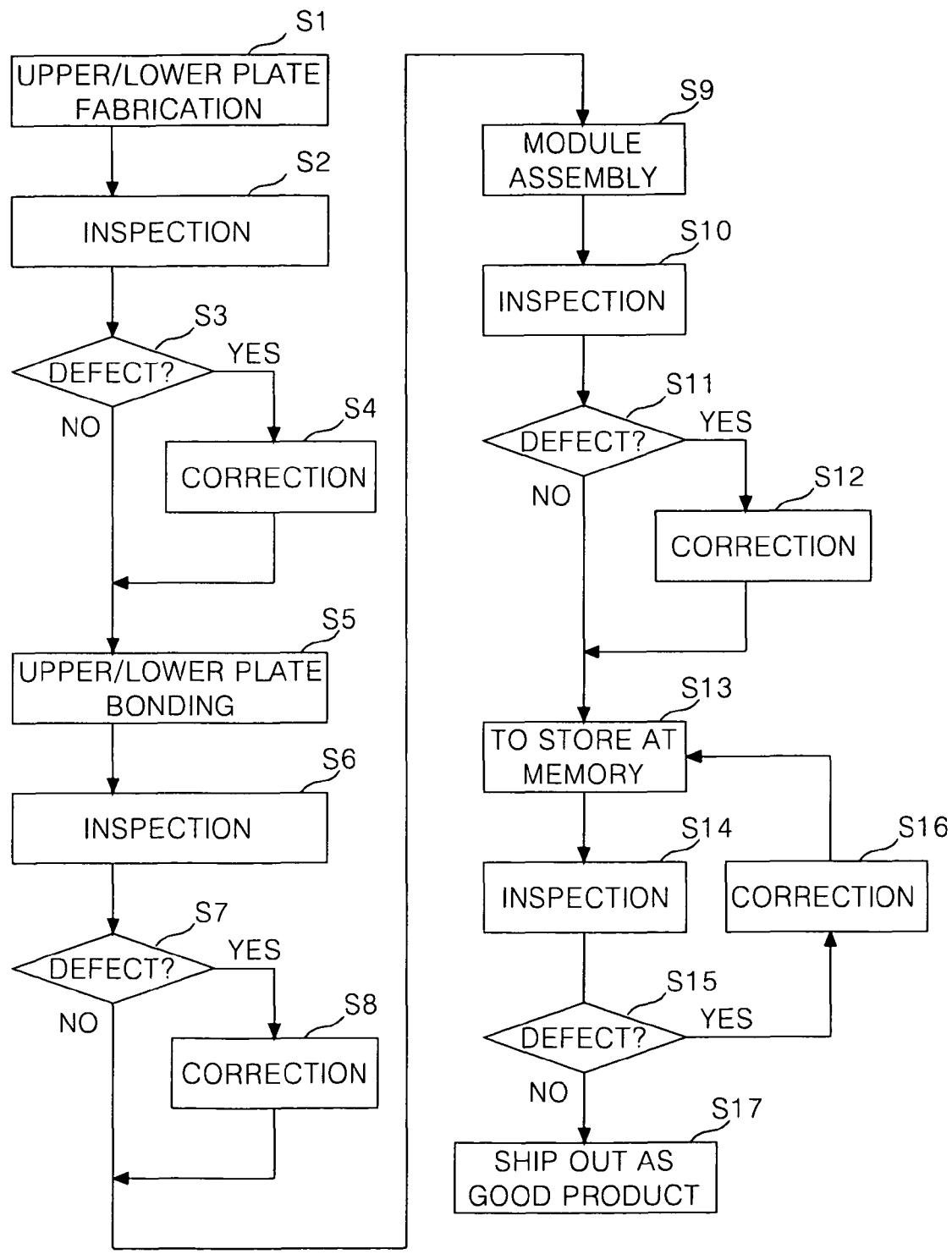
FIGS. 7A and 7B are diagrams representing a fabrication method of a flat panel display device according to the present invention.
Figure 7B:
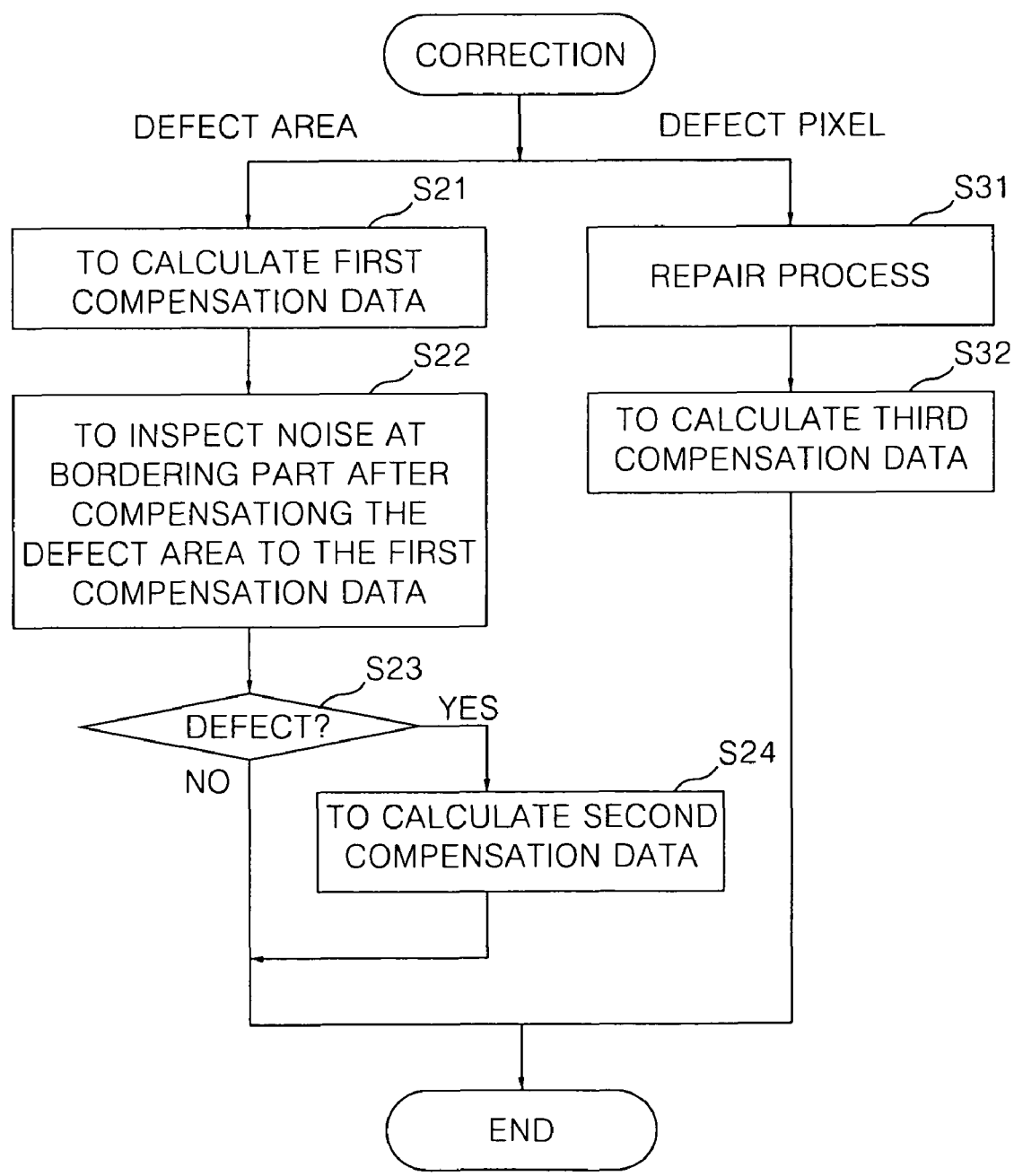

With reference to FIGS. 7A and 7B, a fabrication method of a liquid crystal display device according to an embodiment of the present invention will be explained.

Referring to FIGS. 7A and 7B, in the fabrication method of the liquid crystal display device according to the embodiment of the present invention, an upper substrate (color filter substrate) and a lower substrate (TFT array substrate) of a display panel respectively (S1) are fabricated. The fabrication step (S1) includes a substrate cleaning process, a substrate patterning process, an alignment film forming/rubbing process, etc. In the substrate cleaning process, impurities on the surfaces of the upper and lower substrates are removed with a cleaning solution. In the upper substrate patterning process, a color filter, a common electrode, a black matrix, etc. are also formed. In the lower substrate patterning process, signal lines such as a data line and a gate line are formed; a TFT is formed at the crossing part of the data line and the gate line, and a pixel electrode is formed at a pixel area provided by the crossing of the data line and the gate line. On the other hand, the lower substrate patterning process might include the process of forming an aperture pattern where a gate metal is removed from a dummy pattern or a gate line in accordance with the following repair process.

Subsequently, a fabricating method of the liquid crystal display device according to the embodiment of the present invention displays a test picture by applying test data of each gray level to the lower substrate of the display panel, and inspects a panel defect by an electrical/magnetic inspection for the picture (S2).

In case of detecting the panel defect as an inspection result of the step S2 (S3), the fabrication method of the liquid crystal display device according to the embodiment of the present invention stores location information for a location or area where the panel defect appears and a presence or absence of the panel defect at an inspection computer, and carries out correction for compensating the panel defect (S4).

Figure 8:
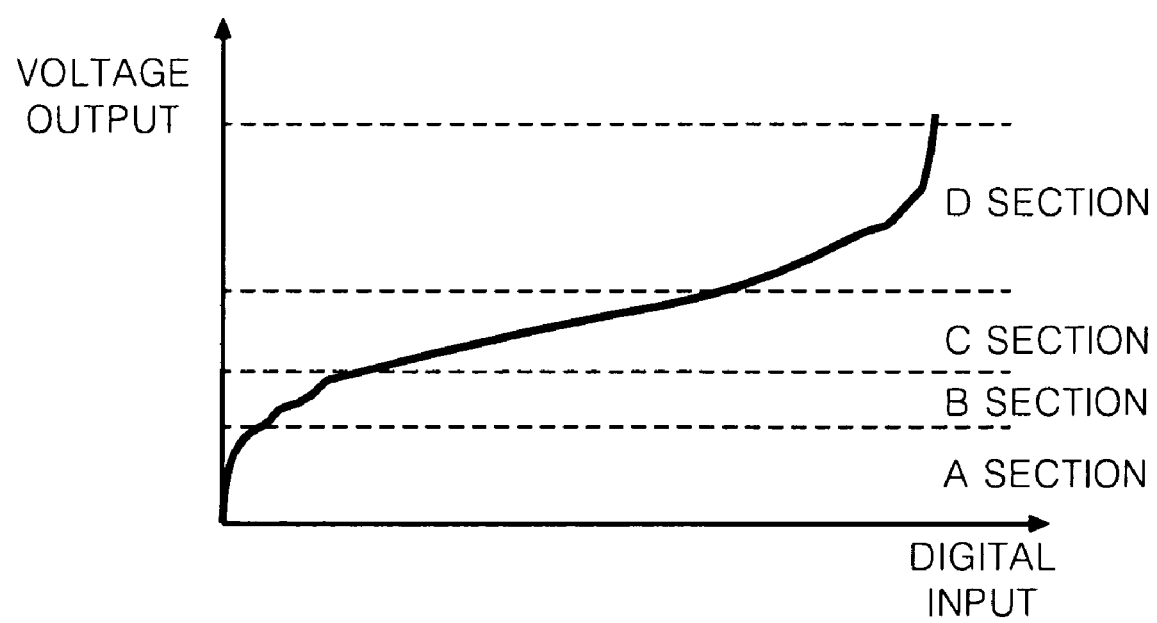
FIG. 8 is a diagram representing a gamma characteristic curve.

The fabrication method of the liquid crystal display device according to the embodiment of the present invention calculates a first compensation data for compensating the brightness or chromaticity of the panel defect area appearing differently from a non-defect area (S21). At this time, the first compensation data may be optimized for each location because the degree of brightness difference or color difference with the non-defect area is different in accordance with the location of the panel defect area on the display panel. Further, in consideration of a gamma characteristic, as in FIG. 8, the first compensation data should be optimized. Accordingly, the compensation value can be determined for each gray level in each of R, G, B pixels or can be determined for each gray level section (A, B, C, D) which include a plurality of gray levels, as illustrated in FIG. 8. For example, the compensation value is determined to be an optimized value for each location, such as '+1' at 'location 1', '−1' at 'location 2', '0' at 'location 3', and also can be determined to be an optimized value for each gray level section such as '0' at the 'gray level section A', '0' at the 'gray level section B', '1' at the 'gray level section C' and '1' at the 'gray level section D'. Accordingly, the compensation value can be made different for each gray level in the same location, and also can become different for each location in the same gray level. The compensation value like this may be determined to be the same value for each of the R, G, B data when correcting brightness and may be determined to be different for each of the R, G, B data when correcting the color difference. For example, if red is shown more prominently in a specific panel defect area than a non-defect area, the R compensation value becomes lower than the G, B compensation values.

Figure 9A:
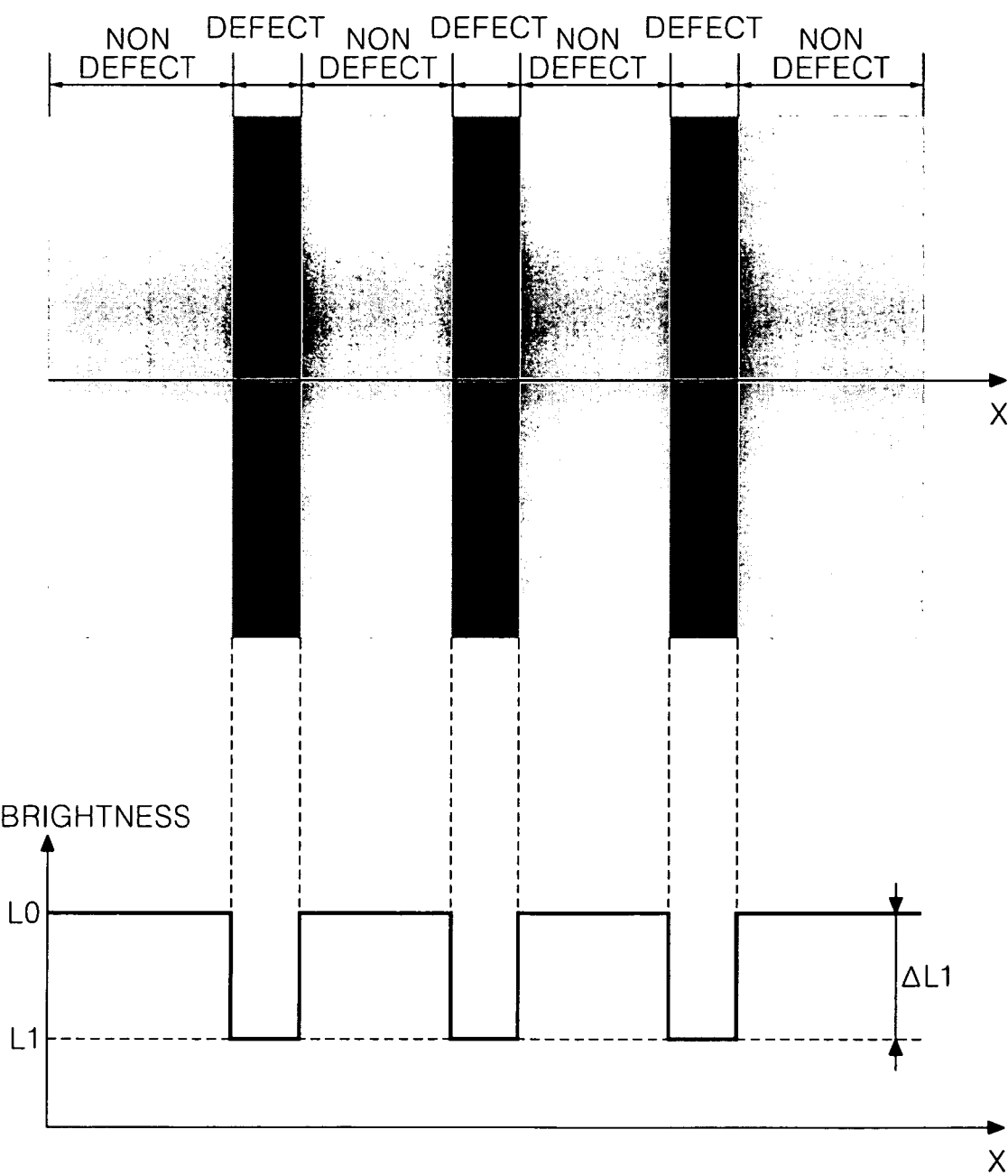
FIGS. 9A to 9E are diagrams for explaining a brightness characteristic which appears in a bordering part of a panel defect area and a non-defect area of a display panel.
Figure 9B:
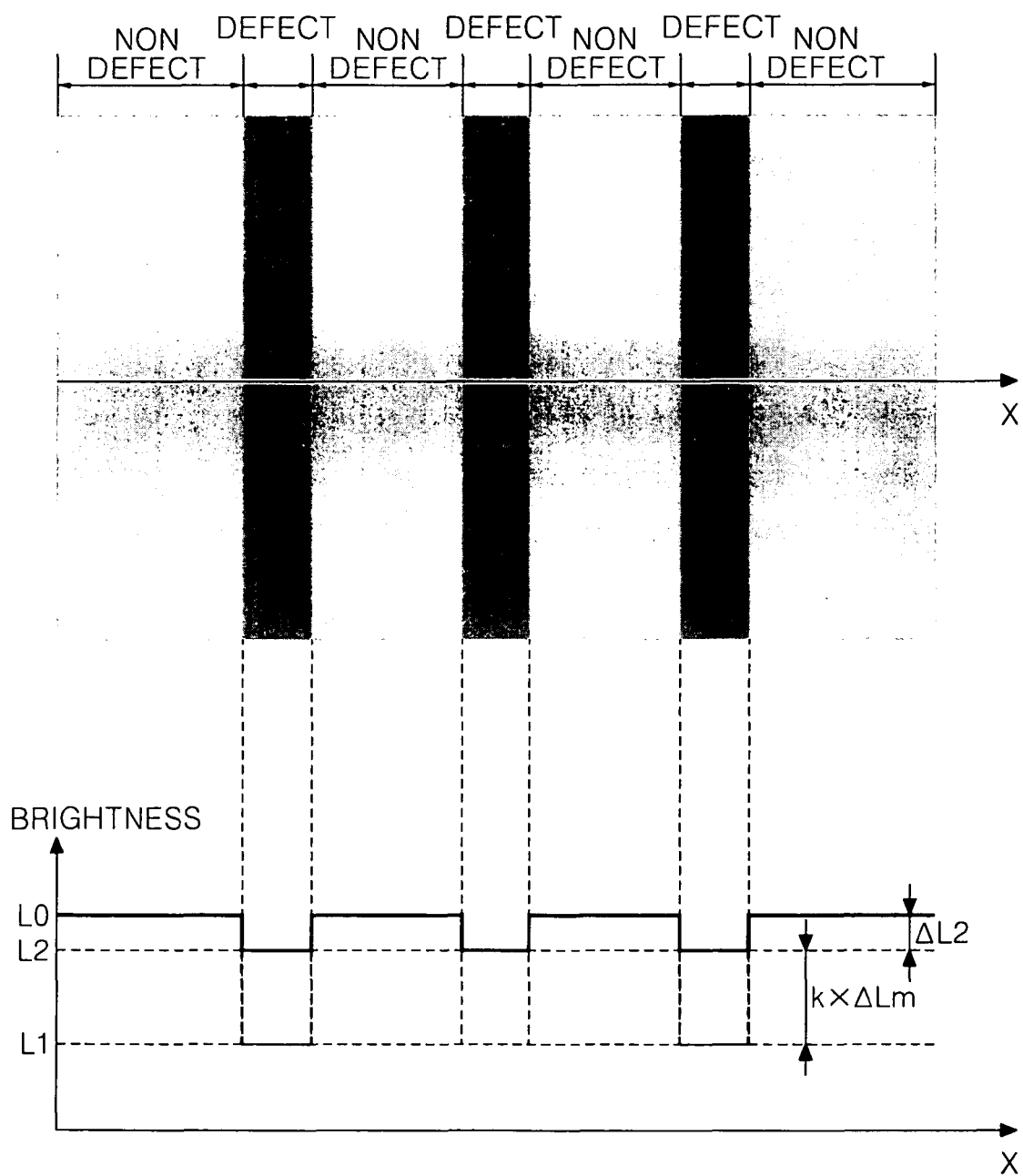
Figure 9C:
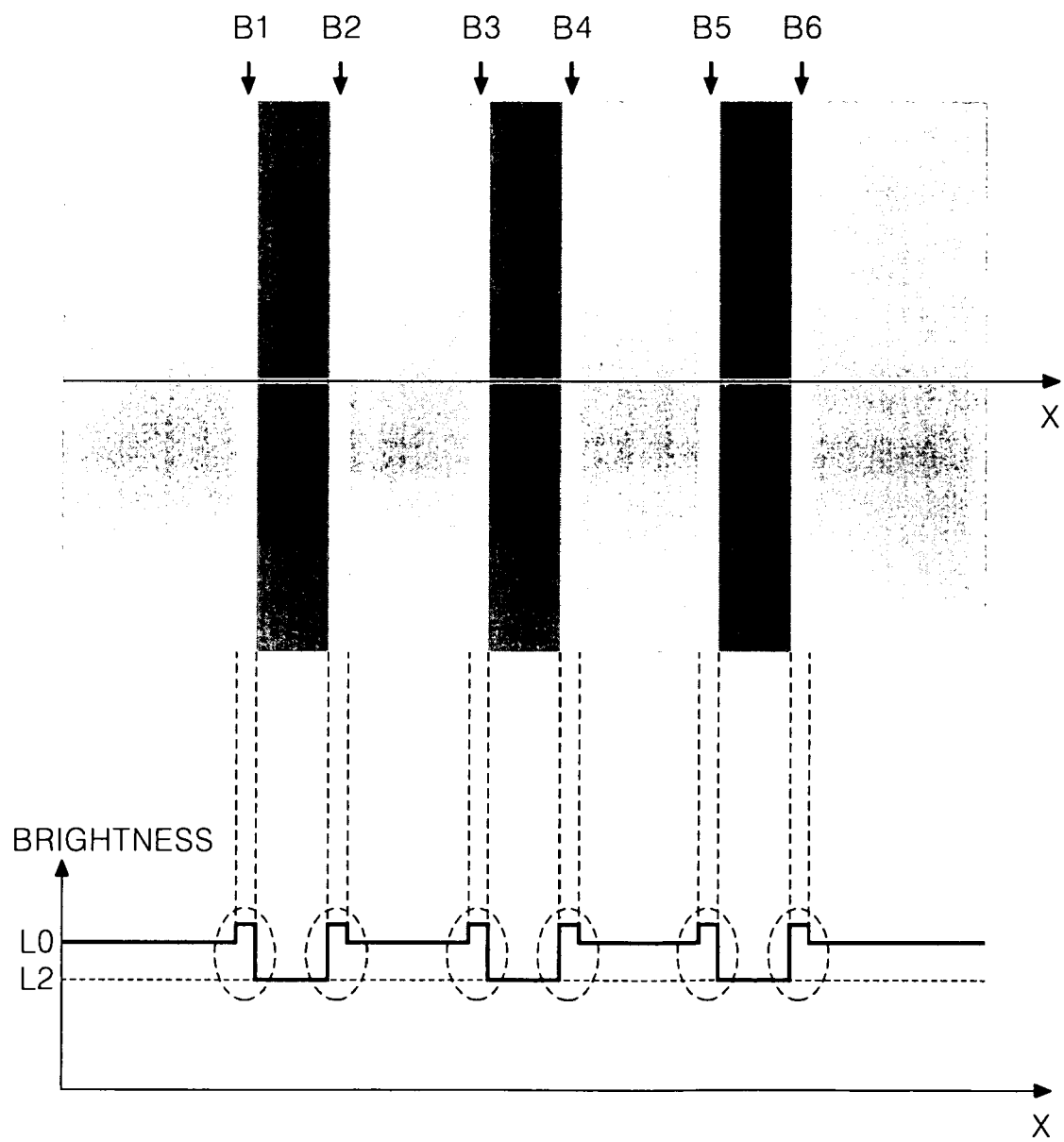
Figure 9D:
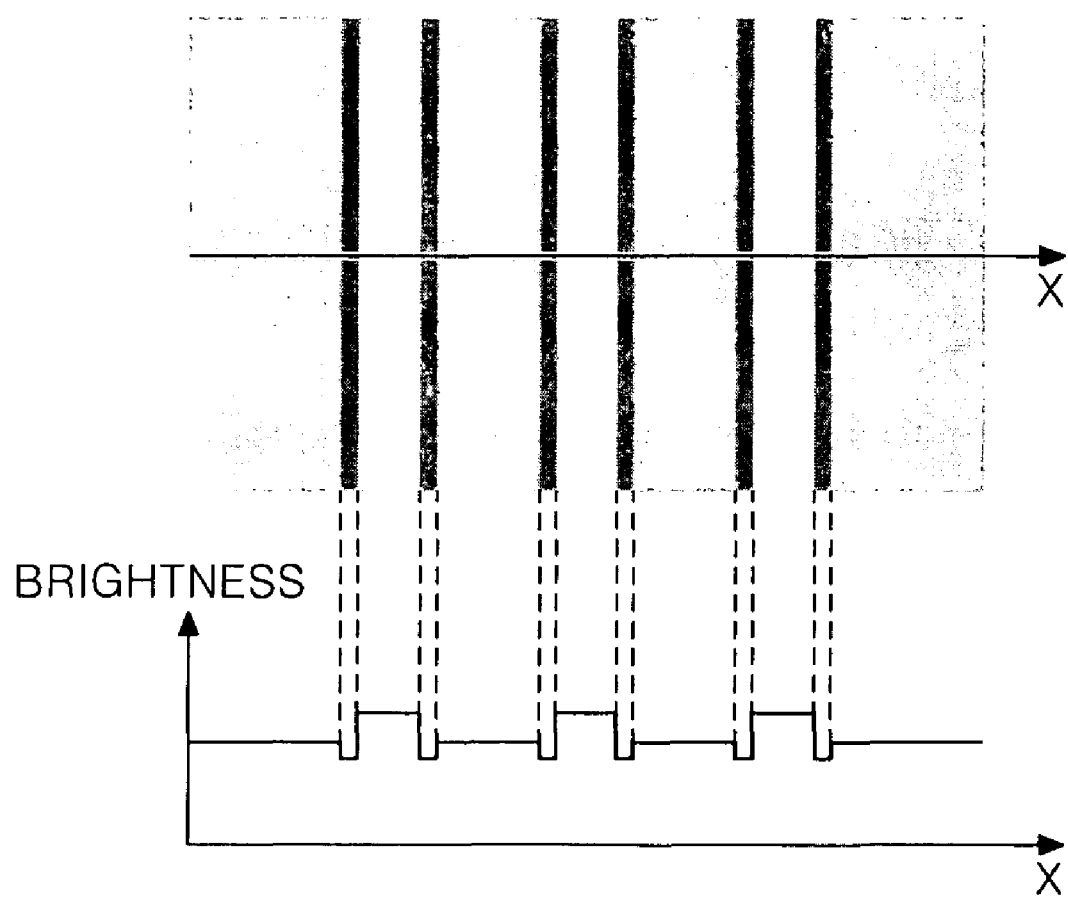
Figure 9E:
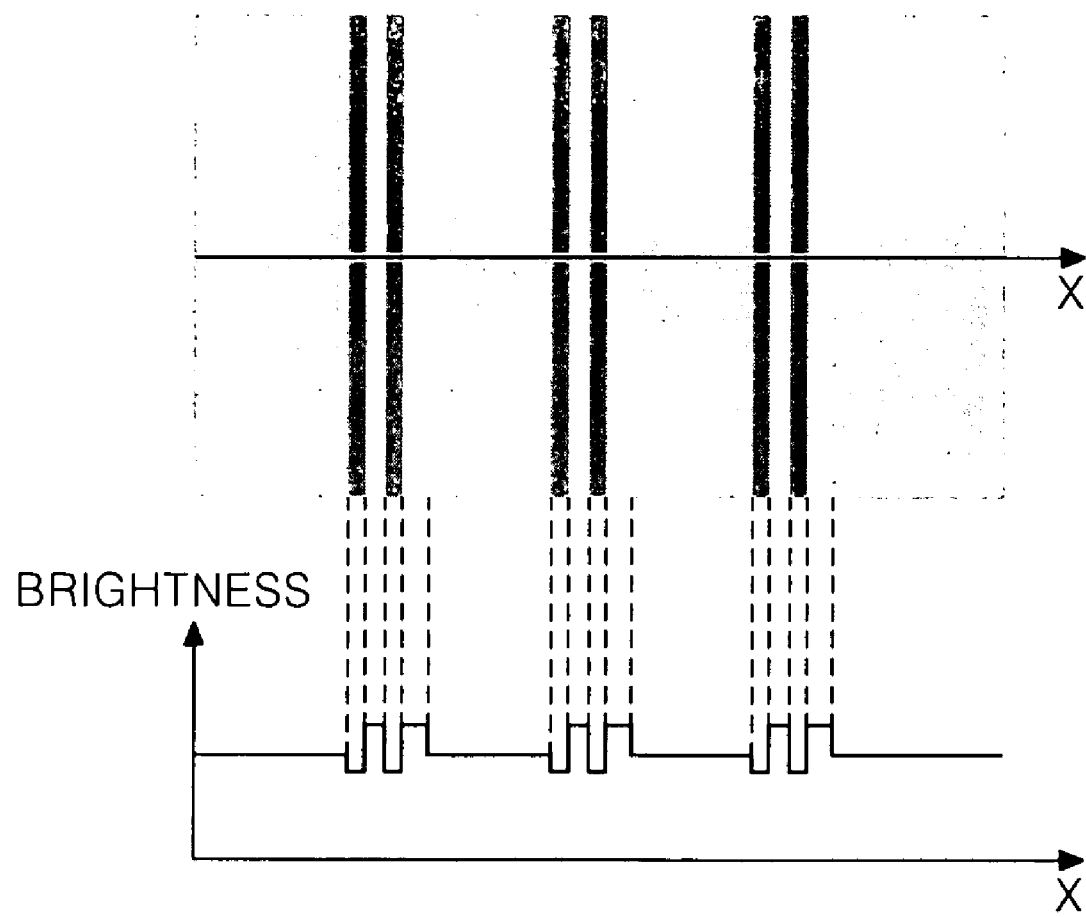

Subsequently, the fabrication method of the liquid crystal display device according to the embodiment of the present invention modulates the test data using the first compensation data determined in the step S21, and applies the modulated test data to a lower substrate to inspect noise of a bordering part by an electrical/magnetic inspection (S22). In other words, the test data to be supplied to the panel defect area are modulated using the first compensation data to correct the brightness and or chromaticity of the panel defect area, and a bordering part noise inspection is carried out for the bordering part of the non-defect area and the panel defect area where the brightness or chromaticity is corrected (S22). Herein, the 'ordering part' means a fixed area inclusive of the boundary between the panel defect area and the non-defect area and the surrounding area thereof, and the 'bordering part noise' means a brightness noise appearing in the bordering part. For example, when the brightness of the non-defect area on the display panel is L0, as shown in FIG. 9A, a panel defect area that has a brightness difference with a non-defect area by 'ΔL1' is assumed. In this case, a minimum brightness gap between gray levels that can be displayed by the liquid crystal display device or a minimum increase or decrease in the amount of the brightness through a circuit compensation by the data modulation is 'ΔLm'. The brightness of the panel defect area gets close to L0 by (k×ΔLm) (k is an arbitrary integer) by the data modulation using the first compensation data to decrease the brightness difference for the panel defect area and the non-defect area to ΔL2 (but, 0≦ΔL2≦ΔLm). Then, even though the first compensation data is determined to be almost the compensation value for the brightness of the panel defect area to approach the brightness of the non-defect area, as illustrated in FIG. 9C, the brightness may be increased or decreased abnormally, i.e., bordering noise might be generated, in the bordering part B1 to B6 of the panel defect area and the non-defect area. Accordingly, the fabrication method of the liquid crystal display device according to the present invention, in case that the bordering noise is found as the result of the bordering part inspection through the step S22 (S23), stores the location information for the area where the bordering part noise appears and the presence or absence of the bordering part noise at an inspection computer, and calculates the second compensation data for compensating the bordering part noise (S24). At this time, the second bordering data may also be optimized for each location and for each gray level in the same manner as the first compensation data. On the other hand, the bordering part noise may appear in various shapes like FIGS. 9D and 9E (other than the noise shape illustrated in FIG. 9C), and it can be included in any one of the panel defect area and the non-defect area. On the other hand, the ΔLm can have a different value for each liquid crystal display device in accordance with a data process capacity of a drive circuit or various picture process techniques of the liquid crystal display device. The ΔLm in the liquid crystal display device having the drive circuit of 6 bit process capacity and the ΔLm in the flat panel display device having the drive circuit of 8 bit process capacity may have different values, and the ΔLm value can be different in accordance with whether or not the picture process technique is applied between the flat panel display devices having the drive circuit of the same bit process capacity.

Figure 10:
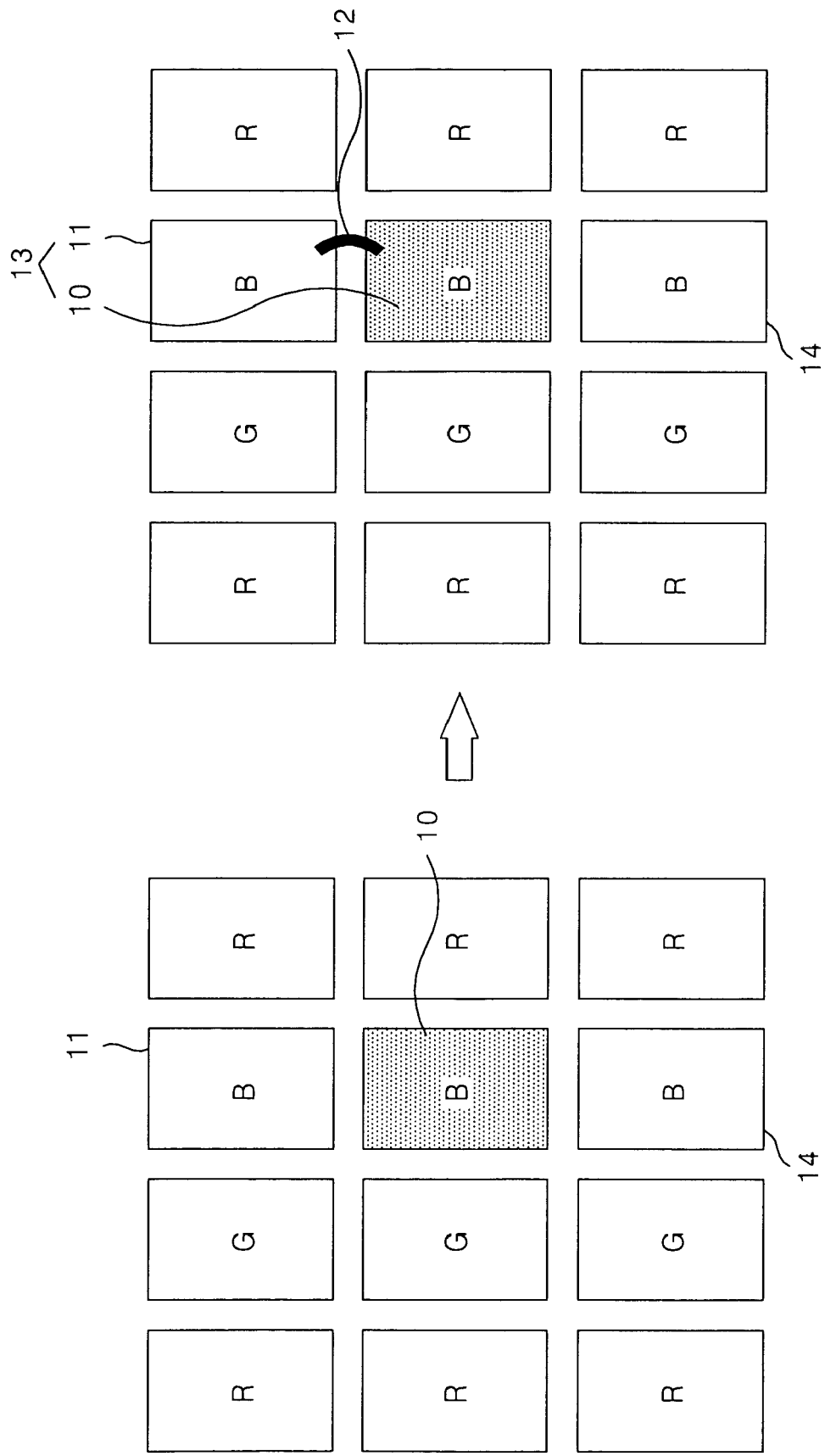
FIG. 10 is a diagram for briefly explaining a repair process according a an embodiment of the present invention.

Subsequently, the fabrication method of the liquid crystal display device according to the embodiment of the present invention electrically connects a defect pixel 10 and a normal pixel 11 through a conductive link pattern 12 to perform the repair process of forming a link pixel 13, as illustrated in FIG. 10, for the pixel defect (S31), at the same time as or in the order of the steps S21 to S24, and calculates a third compensation data for compensating a charge characteristic of the link pixel 13 (S32).

The repair process S31, as illustrated in FIG. 10, is made by a method of electrically shorting or linking the defect pixel 10 with the normal pixel 11 that is adjacent thereto and represents the same color. The repair process S31 includes a process of intercepting the path through which a data voltage is supplied to the pixel electrode of the defect pixel 10 and a process of electrically shorting or linking the normal pixel 11 and the defect pixel 10 using the conductive link pattern 12. A detailed explanation for the repair process S31 will be described later. On the other hand, the defect pixel 10 linked in the link pixel 13 where the defect pixel 10 and the normal pixel 11 are electrically connected is charged with the same data voltage when being charged with the data voltage of the linked normal pixel 11. By the way, the link pixel 13 has a different charge characteristic in comparison with a normal pixel 14 that is not linked because electric charges are supplied to the pixel electrodes included in two pixels 10, 11 through one TFT. For example, when the same data voltage is supplied to the link pixel 13 and the not-linked normal pixel 14, the link pixel 13 has the electric charges dispersed to the two pixels 10, 11, thus the amount of charged electric charge is less in comparison with the not-linked normal pixel 14. As a result, when the same data voltage is supplied to the not-linked normal pixel 14 and the link pixel 13, the link pixel 13 appears to be brighter than the not-linked normal pixel 14 in a normally white mode in which a transmittance or gray level is increased as the data voltage becomes lower. On the contrary, the link pixel 13 appears to be darker than the not-linked normal pixel 14 in a normally black mode in which a transmittance or gray level is decreased as the data voltage becomes higher. Generally, a twisted nematic mode (hereinafter, referred to as "TN mode") liquid crystal display device in which the pixel electrode and the common electrode of the liquid crystal cell are separately formed on two substrates that face each other with a liquid crystal therebetween and a vertical electric field is applied between the pixel electrode and the common electrode is typically driven in the normally white mode. On the contrary, an in-plane switching mode (hereinafter, referred to as "IPS mode") liquid crystal display device in which the pixel electrode and the common electrode of the liquid crystal cell are formed on the same substrate and a horizontal electric field is applied between the pixel electrode and the common electrode is typically driven in the normally black mode.

Subsequent to the repair process S31, the fabricating method of the liquid crystal display device according to the present invention stores the presence or absence of the link pixel 12 and the location information thereof at an inspection computer and calculates a third compensation data for compensating a charge characteristic of the link pixel 13 (S32). At this moment, the charge characteristic of the link pixel 13 is different in the degree of the brightness difference and the color difference from the non-linked normal pixel 14 in accordance with the location of the link pixel 13, thus it is desirable that the third compensation data are also optimized for each location and for each gray level in the same manner as the first and second compensation data.

Hereinafter, with reference to FIGS. 11A to 14C, various embodiments of a repair process according to the present invention will be explained.

Figure 11A:
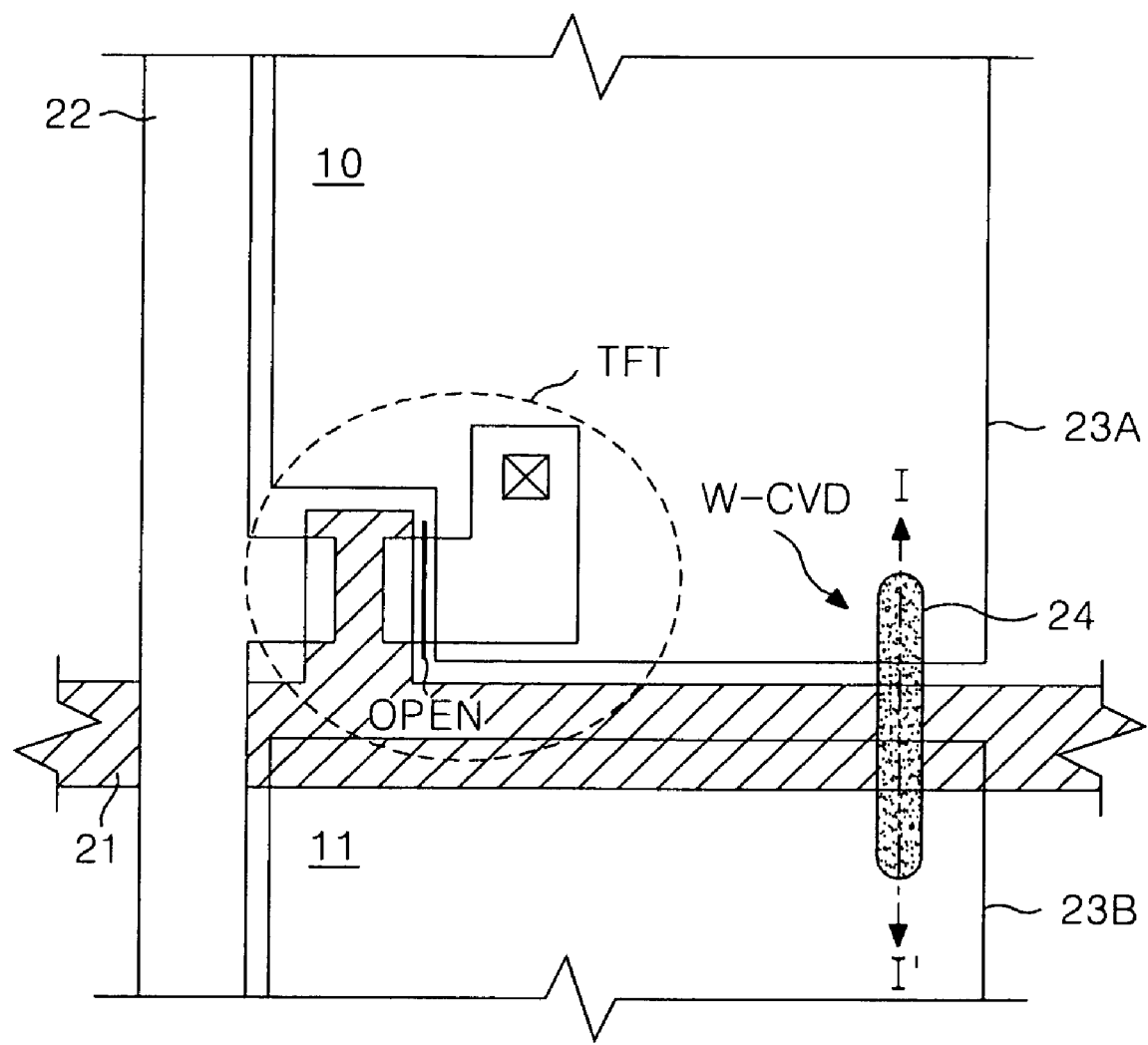
FIGS. 11A-C, 12A-C, 13A-B and 14A-C are diagrams representing various embodiments of a repair process according to the present invention.
Figure 11B:
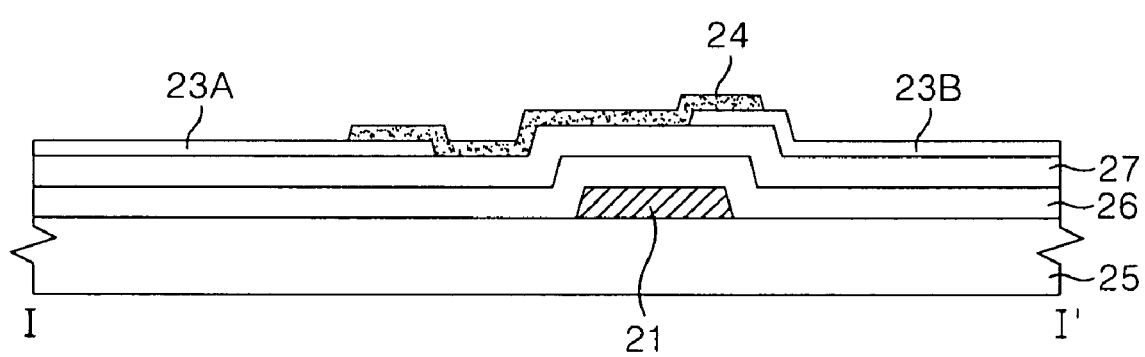
Figure 11C:
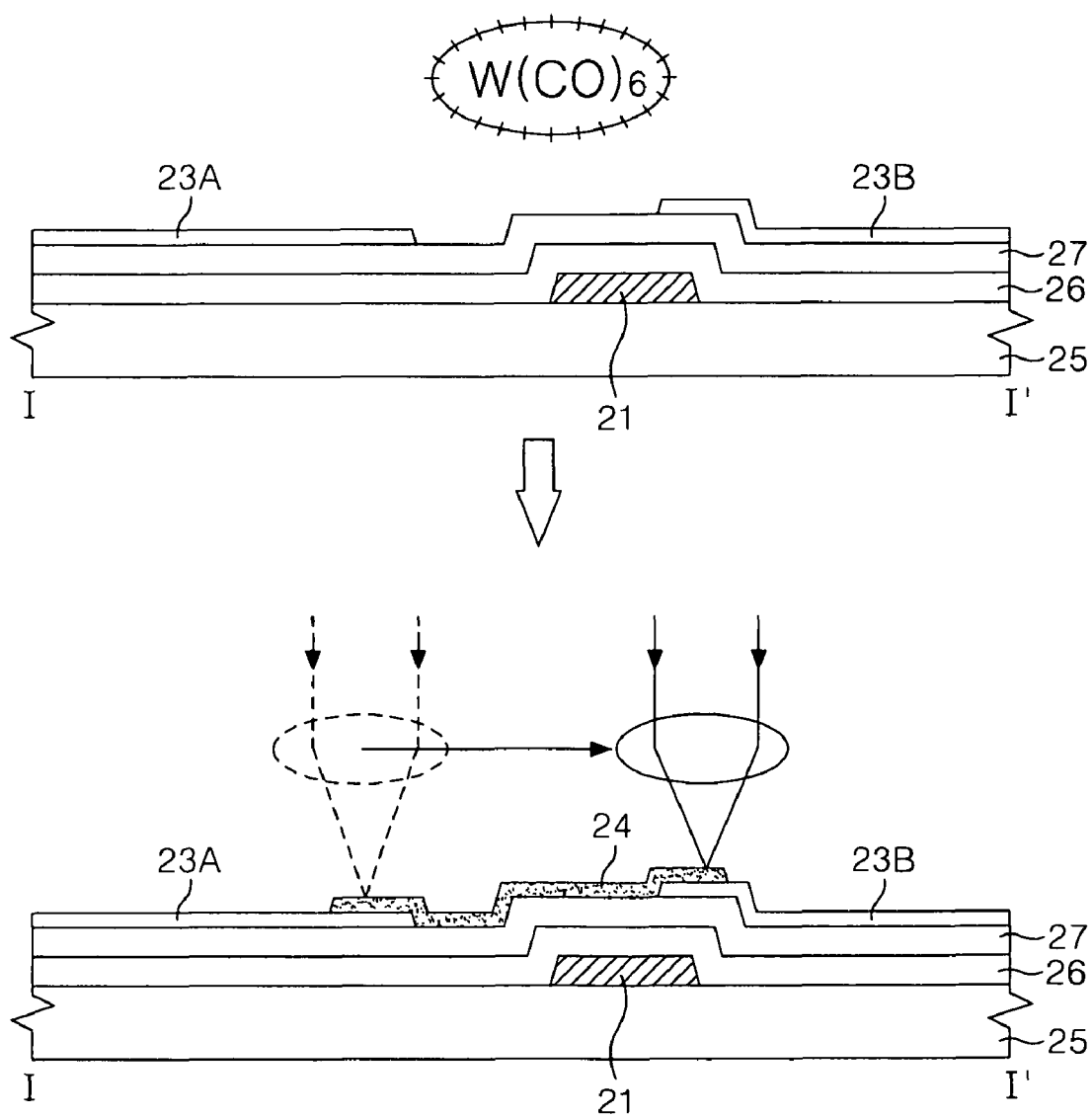

FIGS. 11A to 11C show a repair process of a liquid crystal display device of TN mode according to the first embodiment of the present invention.

Referring to FIGS. 11A and 11B, the repair process according to an embodiment the present invention directly forms a link pattern 24 on a pixel electrode 23A of the defect pixel 10 and a pixel electrode 23B of the normal pixel 11 that are adjacent to each other using W-CVD (chemical vapor deposition) process.

A gate line 21 and a data line 22 cross each other on a lower substrate 25 and a TFT formed at the crossing part. A gate electrode of the TFT is electrically gate line 21, and a source electrode is electrically connected to the data line 22. The drain electrode of the TFT is electrically connected to the pixel electrodes 23A, 23B through a contact hole.

A gate metal pattern inclusive of the gate line 21, a gate electrode of the TFT, etc. is formed on the lower substrate 25 by a gate metal deposition process of aluminum Al, aluminum neodymium AlNd, etc, a photolithography process and an etching process.

A source/drain metal pattern inclusive of a data line 22, source and drain electrodes of the TFT, etc. is formed on a gate insulating film 26 by a source/drain metal deposition process of chrome Cr, molybdenum Mo, titanium Ti, etc, the photolithography process and the etching process.

The gate insulating film 26 for electrically insulating the gate metal pattern from the source/drain metal pattern is formed of an inorganic insulating film such as silicon nitride SiNx or silicon oxide SiOx, etc. A passivation film covering the TFT, the gate line 21 and the data line 22 is formed of an inorganic insulating film or an organic insulating film.

The pixel electrodes 23A, 23B are formed on the passivation film 27 by a process of depositing a transparent conductive metal such as indium tin oxide ITO, tin oxide TO, indium zinc oxide IZO or indium tin zinc oxide ITZO, etc, the photolithography process and the etching process. A data voltage is supplied to the pixel electrodes 23A, 23B from the data line 22 through the TFT for a scanning period while the TFT is turned on.

The repair process is performed for the lower substrate before the substrate bonding/liquid crystal application process. The repair process firstly makes a current path between the source electrode of the TFT and the data line 22 or the drain electrode of the TFT and the pixel electrode 23A, the current path between the data line 22 and the pixel electrode 23A of the defect pixel 10 opened by a laser cutting process. Subsequently, the repair process directly deposits tungsten W on the pixel electrode 23A of the defect pixel 10 and the pixel electrode 23B of the normal pixel 11 of the same color, which is adjacent thereto, and the passivation film 27 between the pixel electrodes 23A, 23B to form the link pattern 24 by a W-CVD process. On the other hand, the line breaking process and the W-CVD process are interchangeable in order.

The W-CVD process condenses a laser light on any one pixel electrode between the pixel electrodes 23A, 23B under a W(CO)6 atmosphere, and the condensed laser light is moved or scanned to another pixel electrode, as in FIG. 11C. Then, tungsten W is separated from the W(CO)6 in reaction of the laser light, and the tungsten (W) is deposited on the pixel electrodes 23A, 23B and the passivation film 27 therebetween while moving to one pixel electrode 23A, the passivation film 27 and another pixel electrode 23B along the scan direction of the laser light.

Figure 12A:
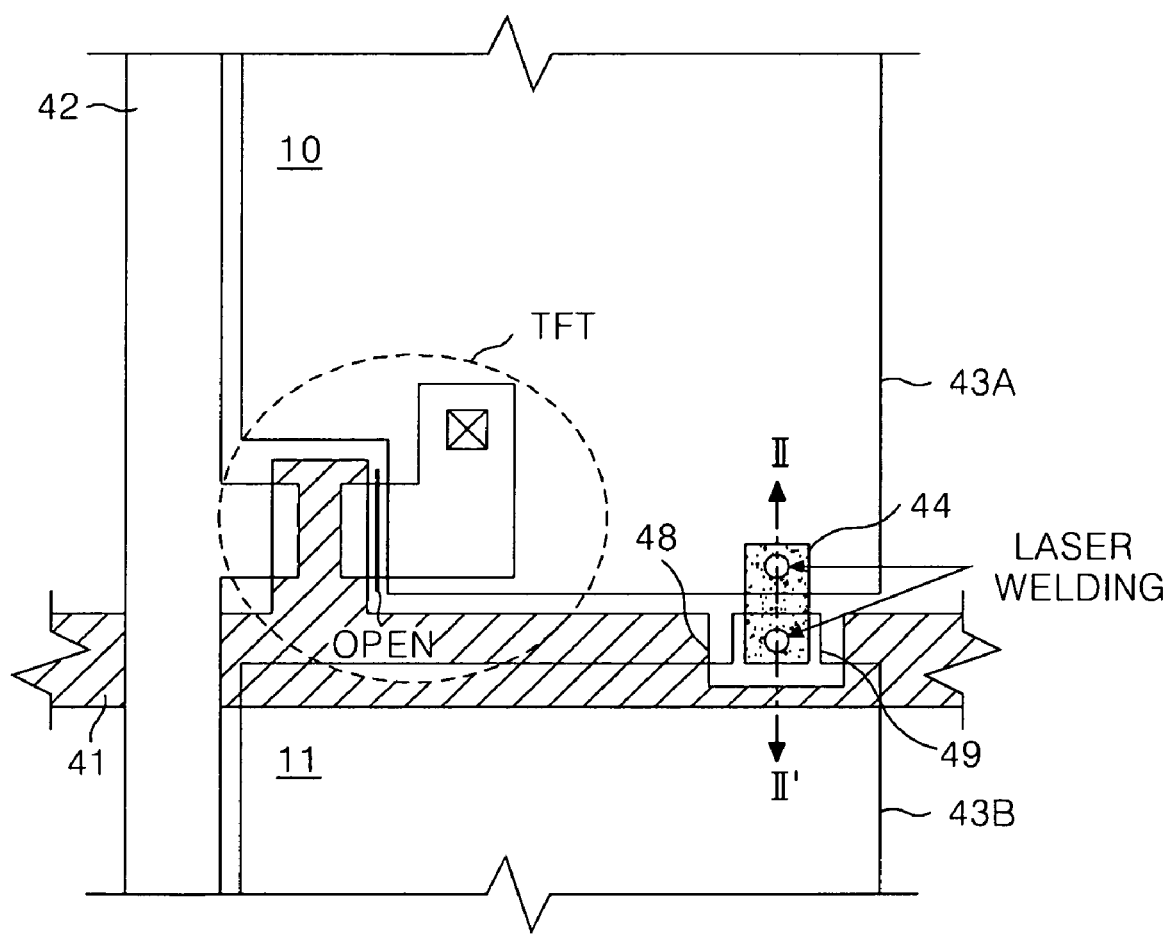
Figure 12B:
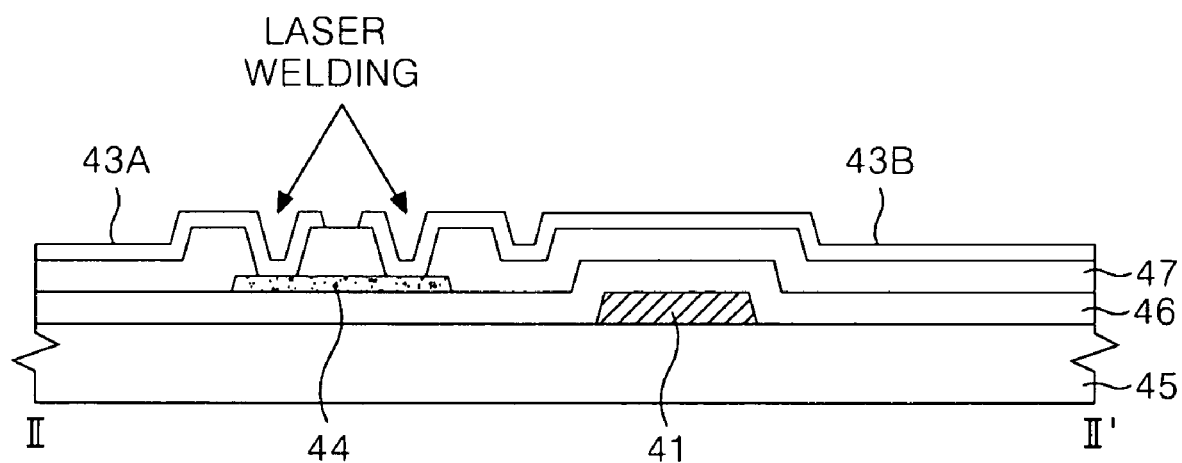
Figure 12C:
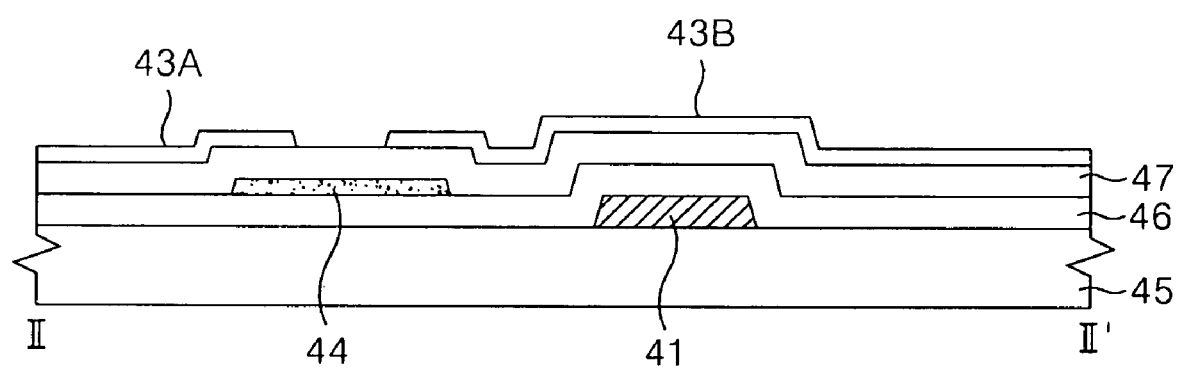

FIGS. 12A to 12C are diagrams for explaining a repair process of a liquid crystal display device of TN mode according to a second embodiment of the present invention.

Referring to FIGS. 12A and 12B, a lower substrate 45 of a liquid crystal display device according to the present invention includes a conductive dummy pattern 44 overlapped with a pixel electrode 43A of the defect pixel 10 and a pixel electrode 43B of the normal pixel 11 which is adjacent thereto with a passivation film 47 therebetween.

A gate line 41 and a data line 42 cross each other on the lower substrate 45 of the lower substrate and a TFT is formed at the crossing part. A gate electrode of the TFT is electrically connected to the gate line 41, and a source electrode is electrically connected to the data line 42. And, the drain electrode of the TFT is electrically connected to the pixel electrodes 43A, 43B through a contact hole.

A gate metal pattern inclusive of the gate line 41, a gate electrode of the TFT, etc. is formed on the lower substrate 45 by a gate metal deposition process, a photolithography process and an etching process.

The gate line 41 includes a concave pattern 48, which is separated from the dummy pattern 44 by a designated distance so as not to overlap the dummy pattern 44 and has a shape encompassing the dummy pattern 44.

A source/drain metal pattern inclusive of a data line 42, source and drain electrodes of the TFT, the dummy pattern 44, etc. is formed on a gate insulating film 46 by a source/drain metal deposition process, the photolithography process and the etching process.

The dummy pattern 44 is formed as an island pattern, which is not connected to the gate line 41, the data line 42 and the pixel electrodes 43A, 43B before the repair process. Both ends of the dummy pattern 44 overlap the pixel electrodes 43A, 43B, which are adjacent to each other vertically so as to be connected to the pixel electrodes 43A, 43B in a laser welding process.

The gate insulating film 46 electrically insulates the gate metal pattern from the source/drain metal pattern, and a passivation film 47 electrically insulates the source/drain metal pattern from the pixel electrodes 43A, 43B.

The pixel electrodes 43A, 43B are formed on the passivation film 47 by a process of depositing a transparent conductive metal, the photolithography process and the etching process. The pixel electrodes 43A, 43B include an extended part 49 from one side of the upper end. The pixel electrodes 43A, 43B are sufficiently overlapped with one end of the dummy pattern 44 by the extended part 49. A data voltage is supplied to the pixel electrodes 43A, 43B from the data line 42 through the TFT for a scanning period while the TFT is turned on.

The repair process is performed for the lower substrate before the substrate bonding/liquid crystal application process or for the panel after the substrate bonding/liquid crystal application process. The repair process firstly makes a current path between the source electrode of the TFT and the data line 42 or the drain electrode of the TFT and the pixel electrode 43A, which has opened by a laser cutting process in order to intercept the current path between the data line 42 and the pixel electrode 43A of the defect pixel 10. Subsequently, the repair process irradiates laser light to the pixel electrodes 43A, 43B, which are adjacent to both ends of the dummy pattern 44, as illustrated in FIG. 8, using a laser welding process. Then, the pixel electrodes 43A, 43B and the passivation film 47 are melted by the laser light, and as a result, the pixel electrodes 43A, 43B are connected to the dummy pattern 44. On the other hand, the order of the line breaking process and the laser welding process can be interchanged. FIG. 12C illustrated the pixel electrodes 43A, 43B and the dummy pattern 44, which are electrically separated by the passivation film 47 before the laser welding process.

Figure 13A:
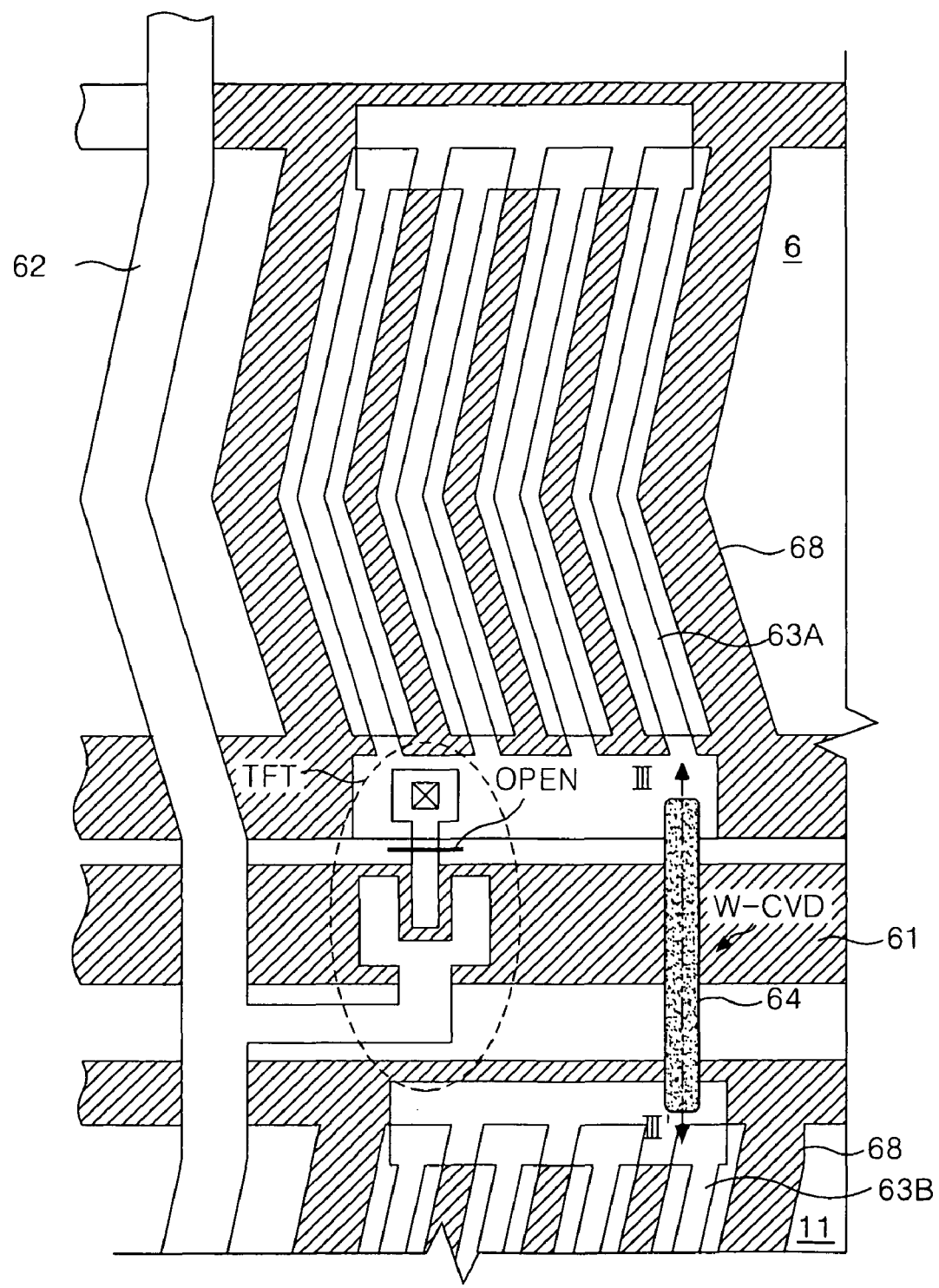
Figure 13B:
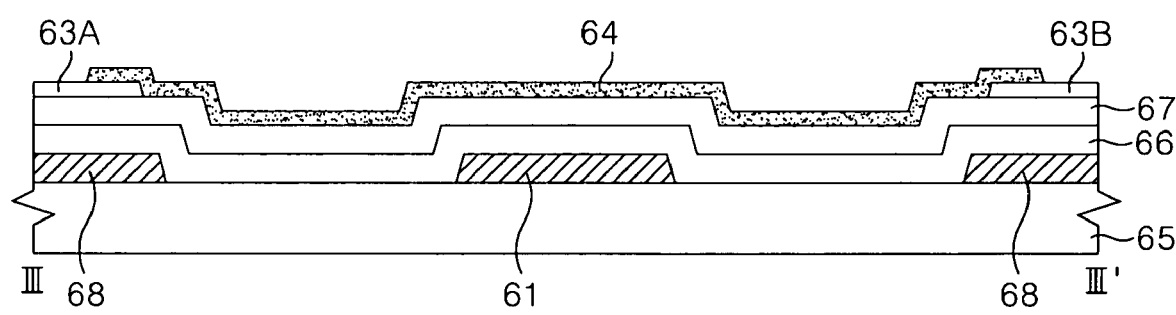

FIGS. 13A and 13B are diagrams for explaining a repair process of a liquid crystal display device of IPS mode according to a third embodiment of the present invention.

Referring to FIGS. 13A and 13B, the repair process according to the present invention directly forms a link pattern 64 on a pixel electrode 63A of the defect pixel 10 and a pixel electrode 63B of the normal pixel 11, which are adjacent to each other by using of a W-CVD (chemical vapor deposition) process.

A gate line 61 and a data line 62 cross each other on a lower substrate 65 of the lower substrate and a TFT is formed at the crossing part. A gate electrode of the TFT is electrically connected to the gate line 61, and a source electrode is electrically connected to the data line 62. The drain electrode of the TFT is electrically connected to the pixel electrodes 63A, 63B through a contact hole.

A gate metal pattern inclusive of the gate line 61, a gate electrode of the TFT, a common electrode 68, etc is formed on the lower substrate 65 by a gate metal deposition process, a photolithography process and an etching process. The common electrode 68 is connected to all liquid crystal cells to supply a common voltage Vcom to the liquid crystal cells. The horizontal electric field is applied to the liquid crystal cells by a common voltage Vcom applied to the common electrode 68 and a data voltage applied to the pixel electrodes 63A, 63B.

A source/drain metal pattern inclusive of a data line 62, source and drain electrodes of the TFT, etc is formed on a gate insulating film 66 by a source/drain metal deposition process, the photolithography process and the etching process.

The pixel electrodes 63A, 63B are formed on the passivation film 67 by a process of depositing a transparent conductive metal, the photolithography process and the etching process. A data voltage is supplied to the pixel electrodes 63A, 63B from the data line 62 through the TFT for a scanning period while the TFT is turned on.

The repair process is performed for the lower substrate before the substrate bonding/liquid crystal applicant process. The repair process firstly makes a current path between the source electrode of the TFT and the data line 62 or the drain electrode of the TFT and the pixel electrode 63A opened by a laser cutting process in order to intercept the current path between the data line 62 and the pixel electrode 63A of the defect pixel 10. Subsequently, the repair process directly deposits tungsten W on the pixel electrode 63A of the defect pixel 10 and the pixel electrode 63B of the normal pixel 11 of the same color, which is adjacent thereto, and the passivation film 67 between the pixel electrodes 63A, 63B to form the link pattern 64 by a W-CVD process. On the other hand, the line breaking process and the W-CVD process are interchangeable in order.

Figure 14A:
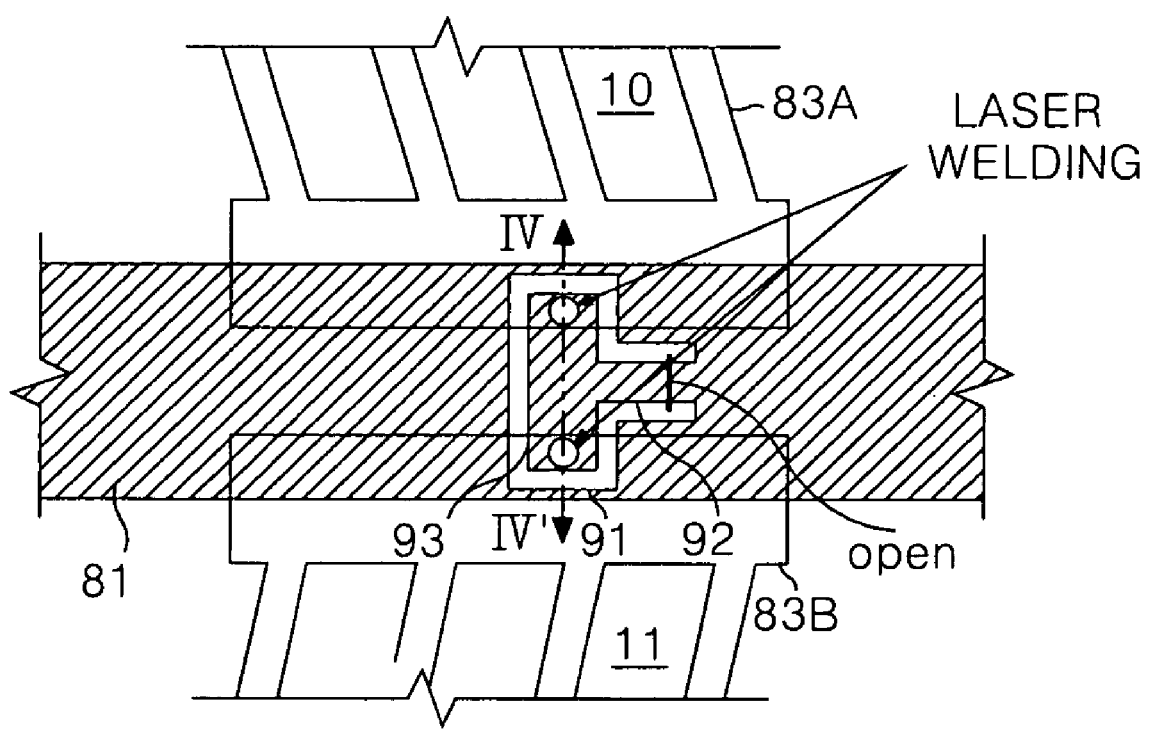
Figure 14B:
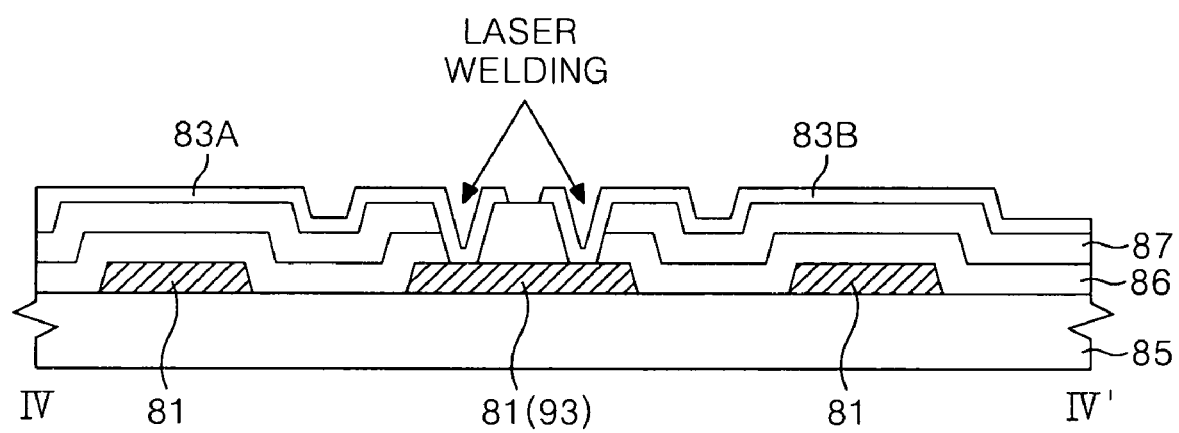
Figure 14C:
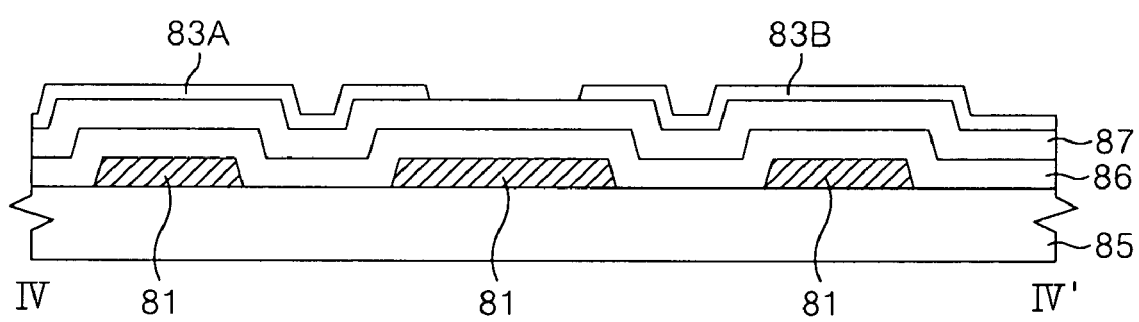

FIGS. 14A to 14C are diagrams for explaining a repair process of a liquid crystal display device of IPS mode according to a fourth embodiment of the present invention. In FIGS. 14A to 14C, a common electrode, etc for applying a horizontal electric field to the liquid crystal cells together with the data metal pattern such as the data line, etc, the TFT and the pixel electrode are omitted.

Referring to FIGS. 14A and 14B, the gate line 81 of the liquid crystal display device according to the present invention includes a neck part 92; a head part 93 which is connected to the neck part 92 and of which the area is extended; and an aperture pattern 91 removed in a 'C' shape in the vicinity of the neck part 92 and the head part 93.

A gate metal pattern inclusive of the gate line 91, a gate electrode of the TFT (not shown), a common electrode, etc is formed on the lower substrate 85 by a gate metal disposition process, a photolithography process and an etching process.

The pixel electrodes 83A, 83B are formed on the passivation film 87 by a process of depositing a transparent conductive metal, a photolithography process, and an etching process.

In the gate line 81, the neck part 91 is opened by the laser cutting process in the repair process. One side end of the head part 93 overlaps the pixel electrode 83A of the defect pixel 10 with the gate insulating film 86 and the passivation film 87, and the other side end of the head part 93 overlaps the pixel electrode 83B of the normal pixel 11 that is adjacent to the defect pixel 10 with the gate insulating film 86 and the passivation film 87 therebetween.

The repair process is performed for the lower substrate before the substrate bonding/liquid crystal application process or for the panel after the substrate bonding/liquid crystal application process. The repair process firstly makes a current path between the source electrode of the TFT and the data line or the drain electrode of the TFT and the pixel electrode 83A, which have been opened by a laser cutting process in order to intercept the current path between the data line and the pixel electrode 82A of the defect pixel, and opens the neck part 92 of the gate line 81. Subsequently, the repair process irradiates laser light to the pixel electrodes 83A, 83B which are adjacent to both ends of the head parts 93, as illustrated in FIG. 14B, using a laser welding process. Then, the pixel electrodes 83A, 83B, the passivation film 87 and the gate insulating film 86 are melted by the laser light, and as a result, the head part 93 becomes an independent pattern to be separated from the gate line 81, and the pixel electrodes 83A, 83B are connected to the head part 93. On the other hand, the order of line breaking process and the laser welding process can be interchanged. FIG. 14C shows the pixel electrodes 83A, 83B and the head part 93 which are electrically separated by the passivation film 87 and the gate insulating film 86 before the laser welding process.

The repair process according to the fourth embodiment of the present invention removes the neck part 93 in advance in the patterning process of the gate line 81 to form an independent pattern like the dummy pattern 44 of FIG. 12A, thus it is possible to omit the cutting process of the neck part 93 in the repair process.

On the other hand, one of the dummy pattern 44 of FIG. 12A, or the head part 93, the neck part 92 and the aperture pattern 91 of FIG. 14A can be formed for each pixel as in the foregoing embodiment, but in order to reduce the electrical contact characteristic of the link pixels, i.e., contact resistance, a plurality of them can be formed for each pixel.

Subsequently to the step S3 or S4, the fabricating method of the liquid crystal display device according to the embodiment of the present invention bonds the upper/lower substrate with a sealant or frit glass (S5). The step of S5 includes an alignment film forming/rubbing process and a substrate bonding/liquid crystal application process. In the alignment film forming/rubbing process, an alignment film is spread in each of the upper substrate and the lower substrate of the display panel, and the alignment film is rubbed with a rubbing cloth, etc. In the substrate bonding/liquid crystal injecting process, the upper substrate and the lower substrate may be bonded using the sealant and a liquid crystal and a spacer are injected through a liquid crystal injection hole, and then there is performed a process of sealing off the liquid crystal injection hole. The substrate bonding may occur after the liquid crystal has been applied to one of the substrates.

Subsequently, the fabricating method of the liquid crystal display device according to the present invention applies the test data of each gray level to the display panel after a substrate bonding/liquid crystal application process, displays a test picture, and inspects the panel defect by the electrical/magnetic inspection and/or the bare eye inspection for the picture (S6). Herein, the bare eye inspection includes an inspection using optical equipment such as camera, etc.

In case that the panel defect is detected as a result of the inspection of the step S6 (S7), the fabricating method of the liquid crystal display device according to the embodiment of the present invention stores a location information of the presence or absence of the panel defect and for the location or area where the panel defect appears, at an inspection computer, and correction is carried out for compensating the panel defect (S8). The step S8 is the same as the above described step S4 except for the W-CVD process among the embodiments of the above-described repair process.

Subsequently to the step S7 or S8, the fabricating method of the liquid crystal display device according to the embodiment of the present invention mounts a drive circuit on the display panel after the substrate bonding/liquid crystal application process, and puts the display panel on which the drive circuit is mounted, a backlight, etc on a case to perform a module assembly process of the display panel (S9). In the mounting process of the drive circuit, an output terminal of a tape carrier package (hereinafter, referred to as "TCP") on which the integrated circuits such as a gate drive IC, a data drive IC, etc are mounted is connected to a pad part of the substrate, and an input terminal of the TCP is connected to a printed circuit board (hereinafter, referred to as "PCB") on which a timing controller is mounted. A memory in which the compensation data are to be stored and a compensation circuit that modulates the data that are to be supplied to the display panel using the data stored at the memory are mounted on the PCB. The memory includes a non-volatile memory such as EEPROM (electrically erasable programmable read only memory) where the data can be renewed or erased.

On the other hand, it is possible to embed the compensation circuit in the timing controller by making one chip with the timing controller, and the drive integrated circuits can be directly mounted on the substrate by a chip-on-glass COG method other than a tape automated bonding TAB method using the tape carrier package.

Subsequently, the fabricating method of the liquid crystal display device according to the embodiment of the present invention displays the test picture by applying the test data of each gray level, and inspects the panel defect by the electrical/magnetic inspection and/or a bare eye inspection for the picture (S10). Herein, the bare eye inspection includes an inspection using the optical equipment such as camera, etc.

In case of detecting the panel defect as an inspection result of the step S10 (S11), the fabrication method of the liquid crystal display device according to the embodiment of the present invention stores a location information for a location or area where the panel defect appears and a presence or absence of the panel defect at an inspection computer, and carries out correction for compensating the panel defect (S12). The step S12 is the same as the above-described step S4 except for the W-CVD process among the embodiments of the above-described repair process.

Subsequently, the fabricating method of the liquid crystal display device according to the present invention stores the location data and compensation data of the panel defect determined by the described inspection and correction step at the EEPROM (S13). Herein, the inspection computer supplies the location data and the compensation data at the EEPROM by using of a ROM recorder. At this moment, the ROM recorder can transmit the location data and the compensation data to the EEPROM through a user connector. The compensation data are transmitted in series through the user connector and serial clock, power supply, ground power source, etc are transmitted to the EEPROM through the user connector.

On the other hand, EDID ROM (extended display identification data ROM) instead of EEPROM can be used as the memory where the location data and the compensation data are stored for modulating the data for the panel defect. The location data and the compensation data are stored at a storage space that is separate from the storage space where the monitor information data are stored. In case of storing the compensation data at the EDDI ROM instead of the EEPROM, the ROM recorder transmits the compensation data through a DDC (data display channel). Accordingly, in case of using the EDID ROM, the EEPROM and the user connector can be removed, thus an additional development cost can be reduced. Hereinafter, it will be explained assuming that the memory where the location data and the compensation data are stored is the EEPROM. Of course, in the below embodiments, the EEPROM and the user connector can be replaced with the EDID ROM and the DDC. On the other hand, not only the EEPROM and the EDID ROM, but also the other kinds of non volatile memory where the data can be renewed and erased can be used as the memory for storing the location data and the compensation data.

Subsequently, the fabrication method of the liquid crystal display device according to the embodiment of the present invention modulates the test data using the first to third compensation data which are stored at the EEPROM, and applies the modulated test data to the display panel, thereby inspecting the panel defect by the electrical/magnetic inspection and/or a bare eye inspection for the picture (S14). Herein, the bare eye inspection includes an inspection using the optical equipment such as camera, etc.

If the panel defect that exceeds a good product reference tolerance value is found as a result if the inspection at the step of S14 (S15), correction is carried out (S16). The subject matter for correction includes the panel defect that is not detected in the inspection step and the panel defect that is not recovered by the non-optimization of the compensation value calculated in the compensation step. For example, in case that compensation data are not optimized, the compensation data are re-calculated to renew the compensation data stored at the EEPROM, and in case of detecting the defect pixel newly, the repair process for this is carried out to form the link pixel to calculate the compensation data for this, hereby storing at the EEPROM. At this moment, the W-CVD process is excluded in the repair process. On the other hand, in the liquid crystal display device, there is a case in which a bright line appears on the display screen because light from the backlight is unevenly incident to the whole of the incident surface of the liquid crystal display panel. Even in the bright line caused by such a backlight, it is possible to recover the panel defect by the data modulation using the compensation data in the same manner as the above-described panel defect.

If a panel defect is not found as the inspection result in the step of S14 (S15 [example]), that is to say, if the degree of the picture quality defect is found to be below the good product reference tolerance value, the liquid crystal display device is judged to be a good product to be shipped out (S17).

On the other hand, in the above-described inspection steps and correction steps, it is possible to simplify the process or to omit designated steps for the rational process such as simplification of the fabrication process.

Hereinafter, a picture quality controlling method of a liquid crystal display device according to the embodiment of the present invention will be explained.

The picture quality controlling method of the liquid crystal display device according to the present invention includes a compensation step of controlling the data to be displayed in the liquid crystal display panel, and a step of driving the liquid crystal display panel with the controlled data. Herein, the compensation step includes a first compensation step of adjusting or changing the data to be displayed in the panel defect area as the first compensation data by any one of the dispersion methods of spatially and temporally dispersing the first compensation data for the panel defect area; a second compensation step of adjusting or changing the data to be displayed in the bordering part to the second compensation data by dispersing the second compensation data to the bordering part; and a third compensation step of adjusting or changing the data to be displayed in the link pixel to the third compensation data.

Hereinafter, the picture quality controlling method according to the present invention will be explained through the following embodiments in detail.

The first embodiment for the first compensation step according to the present invention disperses the first compensation data to a plurality of frames using the frame rate control (hereinafter, referred to as 'FRC') method, and increases the data to be supplied to the panel defect area to a first mura compensation data that are dispersed to the frames. Herein, the FRC is an image control method using an integration effect of a visual sense, and the frame rate control method is a picture quality controlling method of temporally arranging the pixels that represent different hues or gray levels to express the hue or gray level therebetween, and the temporal arrangement of the pixels is made by the unit of a frame period. The frame period is also known as a field period and is a display period of one screen when the data are applied to all the pixels of one screen, and the frame period is standardized to be 1/60 seconds in case of an NTSC system and 1/50 seconds in case of a PAL system.

Another embodiment for the first compensation step according to the present invention disperses the first compensation data to a plurality of adjacent pixels using the dithering method, and increases the data to be supplied to the panel defect area to a first compensation data that are dispersed to the pixels. Herein, the dithering is an image control method using a visual integration effect, and the dithering method is a picture quality controlling method of spatially arranging the pixels that represent different hues or gray levels to express the hue or gray level therebetween.

Another embodiment for the first compensation step according to the present invention disperses the first compensation data to a plurality of frames using the FRC and disperses the compensation value to a plurality of adjacent pixels using the dithering method, and increases the data to be supplied to the panel defect area to a first compensation data that are dispersed to the frames and the pixels.

Figure 15:
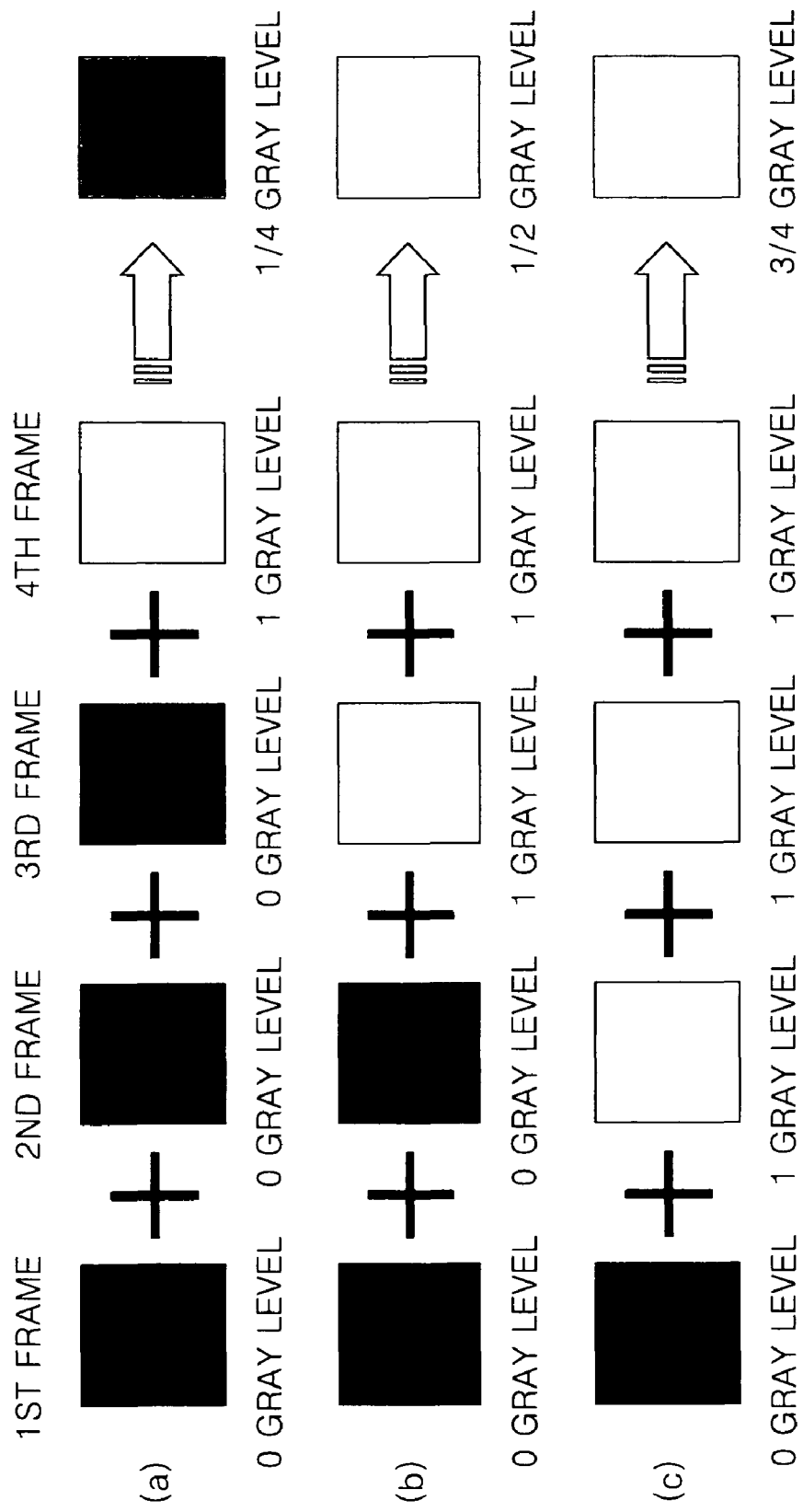

The FRC and dithering methods will be explained in reference to FIGS. 15 to 17.

In order to express a middle gray level of a minute brightness such as 1/4 gray level, 1/2 gray level, 3/4 gray level, etc, the FRC method adds '1' to the digital data corresponding to any one pixel for one frame period among four frame periods, and an observer perceives the gray level '+1/4' of the digital data in the pixel, as illustrated in FIG. 15(a). If '1' is added to each of the digital data corresponding to any one pixel for two frame period among four frame periods, as illustrated in FIG. 15(b), the observer perceives the gray level '+1/2' of the digital data in the pixel. If '1' is added to each of the digital data corresponding to any one pixel for one frame period among four frame periods, as illustrated in FIG. 15(c), the observer perceives the gray level '+3/4' of the digital data in the pixel.

The dithering, when assuming a dither pattern Pw inclusive of four pixels P1 to P4 arranged in 2×2 matrix, as in FIG. 16(a), adds '1' to the digital data corresponding to one pixel among four pixels within the dither pattern Pw, and an observer perceives the gray level '+1/4' of the digital data in the dither pattern Pw. If '1' is added to each of the digital data corresponding to two pixels among four pixels within the dither pattern Pw, as in FIG. 16(b), the observer perceives the gray level '+1/2' of the digital data in the dither pattern Pw. If '1' is added to each of the digital data corresponding to three pixels among four pixels within the dither pattern Pw, as in FIG. 16(c), the observer perceives the gray level '+3/4' of the digital data in the dither pattern Pw.

Figure 17:
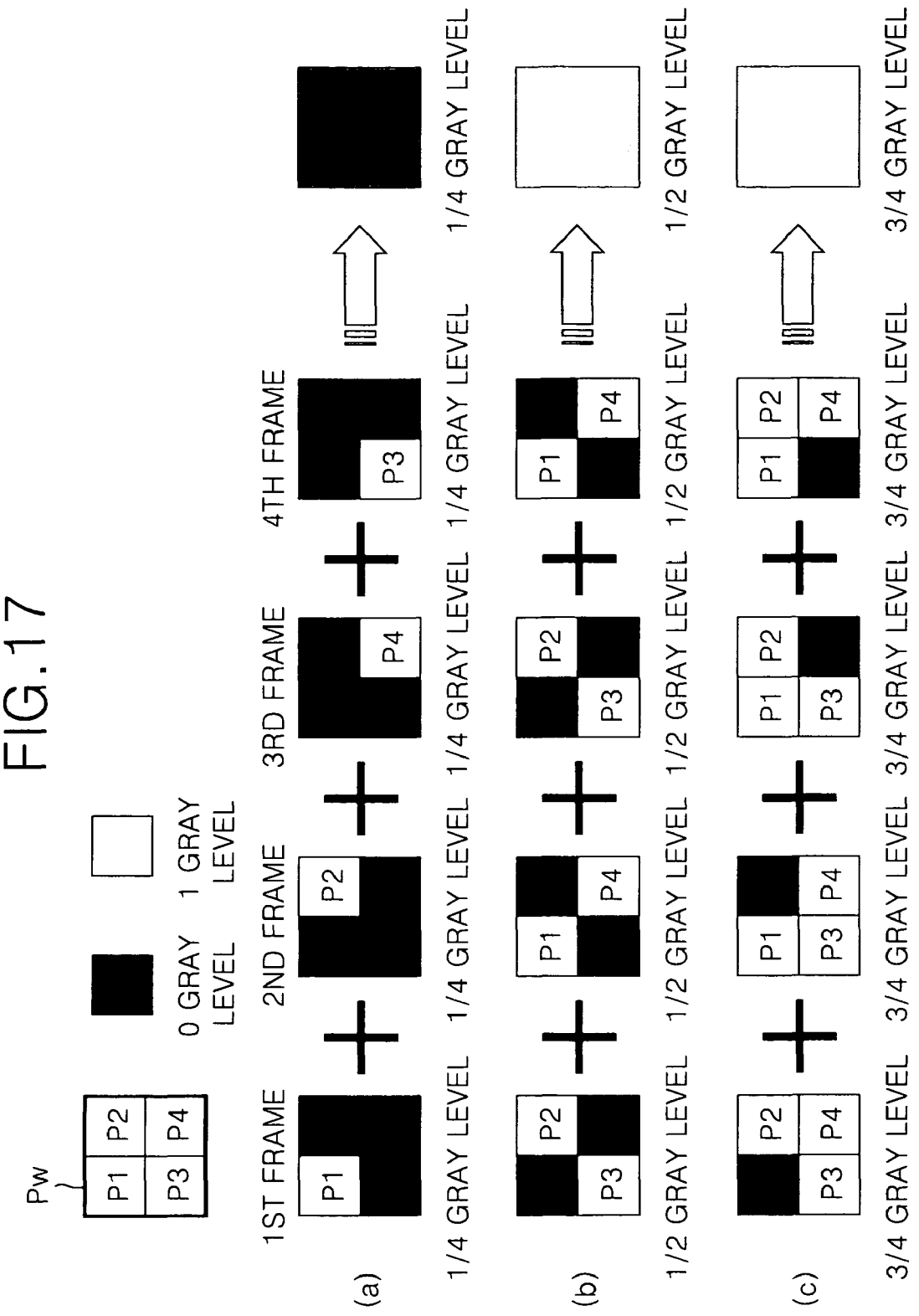

FIG. 17 represents the FRC method using the dither pattern Pw. As in FIG. 17(a), if 1/4 dither pattern Pw is repeated for four frames, the observer perceives 1/4 gray level in the dither pattern. And, if 1/2 dither pattern Pw is repeated for four frames, the observer perceives 1/2 gray level in the dither pattern, as in FIG. 17(b), and if 3/4 dither pattern Pw is repeated for four frames, the observer perceives 3/4 gray level in the dither pattern, as in FIG. 17(c). As in FIG. 17, if the location of the compensation pixel is changed in the dither pattern of the same compensation value, flickers which can be generated in the FRC as in FIG. 15 and the problem of resolution deterioration which can be generated in the dithering as in FIG. 16 can be resolved.

Figure 18:
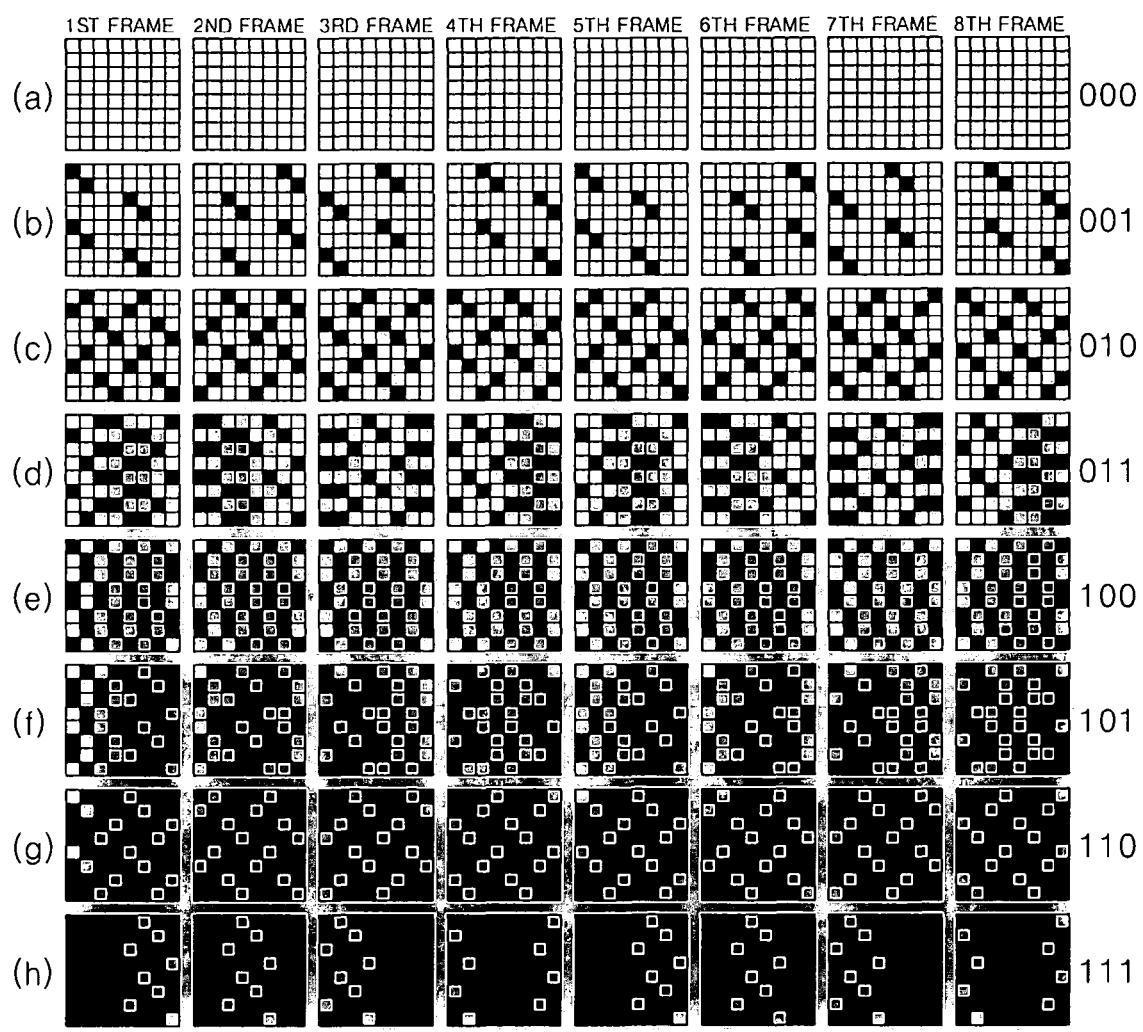

In the FRC, the number of frames, the number of compensation pixels of the dither pattern Pw and the number of the dither patterns Pw can be variously adjusted. As an example, FIG. 18 represents a method of performing the FRC and dithering by determining the 64 pixels arranged in a 8×8 matrix as the dither pattern for the dithering and determining 8 frames as a unit frame for the FRC.

For example, in case that the first compensation data for each location and for each gray level for the panel defect area are determined as in TABLE 1, if the data to be supplied to 'location 1' is '01000000(64)' corresponding to 'gray level section 2', the compensation data of '011(3)' is usingd for performing the FRC and dithering with the dither pattern as in FIG. 18(d) to modulate the data to be supplied to the 'location 1', and if the data to be supplied to 'location 4' is '10000000 (128)' corresponding to 'gray level section 3', the compensation data of '110(6)' is usingd for performing the FRC and dithering with the dither pattern as in FIG. 18(g) to modulate the data to be supplied to the 'location 4'.

TABLE 1

| | | | | | |
|---|---|---|---|---|---|
| Gray Level Section 4 | 10111111(191)~11111010(250) | 101(5) | 110(6) | 011(3) | 111(7) |
| Gray Level Section 1 | 00000000(0)~00110010(50) | 010(2) | 011(3) | 010(2) | 100(4) |
| Gray Level Section 2 | 00110011(51)~00111000(112) | 011(3) | 100(4) | 010(2) | 101(5) |
| Gray Level Section 3 | 01110001(113)~10111110(190) | 100(4) | 101(5) | 011(3) | 110(6) |

The above-described embodiments for the first compensation step according to the present invention compensates the brightness or chromaticity of the panel defect area through the picture quality controlling method such as the FRC and/or dithering that can express the hue or gray level that is more sub-divided than the hue or gray level expression capacity of the display device, thereby making it possible to realize more natural and high picture quality.

Figure 19C:
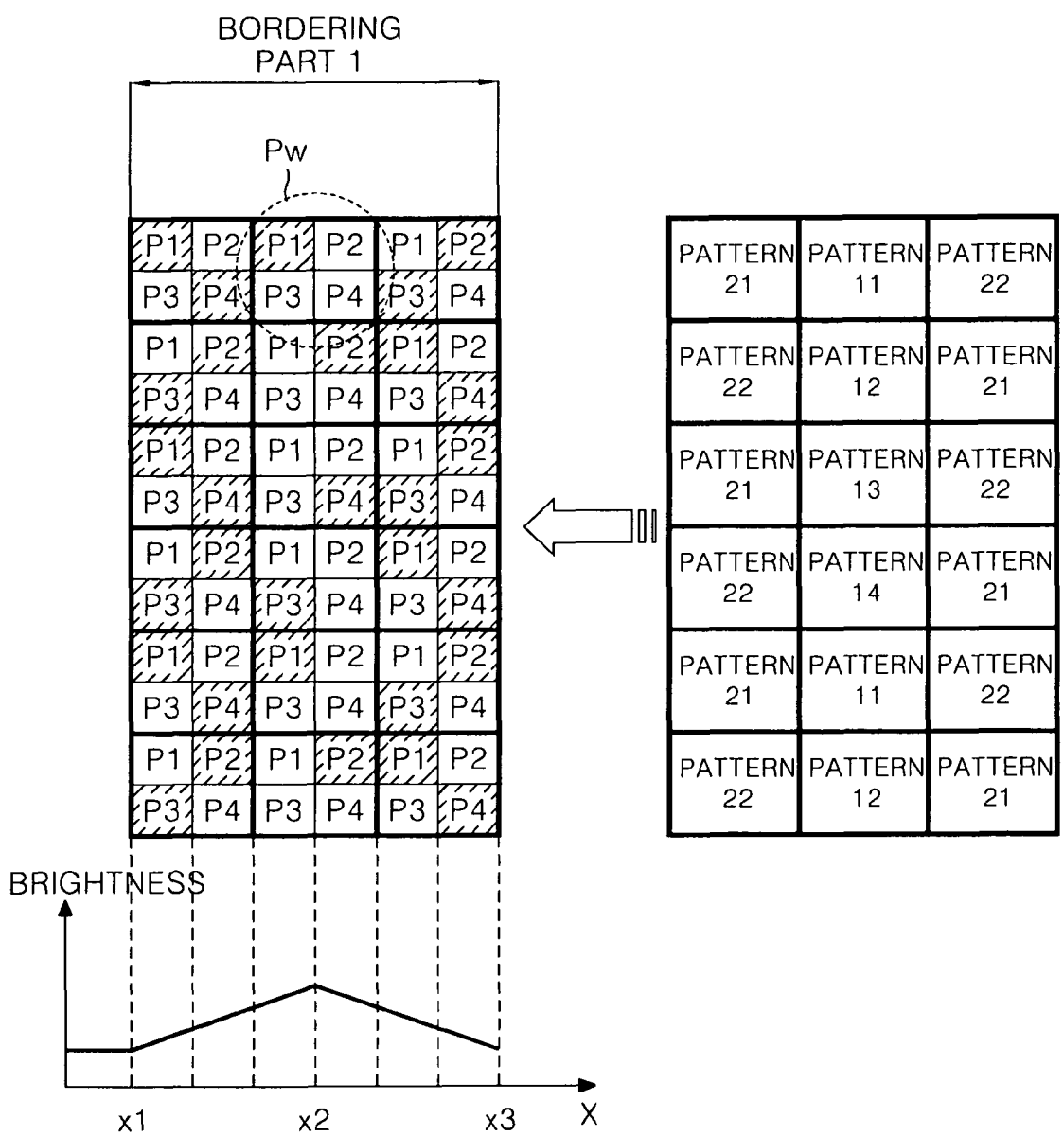

Subsequently, an embodiment for the second compensation step according to the present invention determines the dither pattern inclusive of the pixels in the bordering part, and disperses the second compensation data to the dither pattern where the pixels, in which the second compensation data dispersed between the dither patterns adjacent in the vertical or horizontal directions, are differently designated, thereby increasing or decreasing the data to be supplied to the bordering part to the dispersed second compensation data. For example, it is assumed that there are a bordering part 1 and a border part 2, which are located at both ends of the panel defect area in the display panel, as in FIG. 19A. In the bordering part 1, the highest brightness difference is illustrated in a positive direction at x2 and there is the bordering part noise of an aspect that the brightness difference is decreased in the x1 and x3 direction at the x2. In the bordering part 2, the highest brightness difference is illustrated in a negative direction at x4 and there is the bordering part noise of an aspect that the brightness difference is increased in the x4 and x6 direction at the x5. Herein, it is assumed that the brightness is fixed in the direction vertical to the X axis in the bordering part 1 and the bordering part 2. In this case, the second compensation step of the present invention applies the dither pattern that is larger in the brightness compensation degree than the dither pattern that is adjacent to the x1 and x3 for the dither pattern which is adjacent to the x2, and applies the dither pattern that is larger in the brightness compensation degree than the dither pattern that is adjacent to the x4 and x6 for the dither pattern which is adjacent to the x5. On the other hand, there are various patterns that are different from each other in the location that designates the pixel to which the brightness compensation is applied, even though the brightness compensation degree is the same for one dither pattern. For example, as illustrated in FIG. 19B, the pattern 11 to pattern 14 of (a) are the dither patterns for the brightness increase or decrease by as much as k×ΔLm/4 in the dither pattern Pw inclusive of four pixels arranged in 2×2 matrix, the pattern 21 to pattern 22 of (b) are the dither patterns for the brightness increase or decrease by as much as k×ΔLm/2, the pattern 31 to pattern 34 of (c) are the dither patterns for the brightness increase or decrease by as much as 3 k×ΔLm/4. The k and ΔLm have been mentioned earlier. But, if the same pattern is regularly applied to the dither patterns arranged in parallel, the brightness between the dither patterns might be remarkably changed. To prevent this, the second compensation step according to the present invention applies the dither pattern that is different between the horizontally or vertical adjacent dither patterns Pw for the dither patterns Pw that are vertically arranged in parallel. FIG. 19C represents an example that the dither pattern is applied by the above-mentioned method to the dither patterns Pw located at the x1 to x3 in the bordering part 1. Referring to FIG. 19C, the pattern 21 and pattern 22 is applied to the pattern that is different between the vertically adjacent dither pattern Pw at the x2, where the brightness noise is the highest, and the pattern 11 to pattern 14 of which the brightness compensation degree is lower than the pattern 21 and the pattern 22 are applied to the pattern which is different between the vertically adjacent dither pattern Pw at the x1 and x3. At this moment, the compensation should be made in a direction where the brightness is decreased at the x1 to x3. To this end, it is possible to use a method of dispersing the second compensation data having a negative compensation value to a designated dither pattern to add to the data that are to be supplied to the bordering part, or a method of dispersing the second compensation data having a positive compensation value to a designated dither pattern to add to the data which are to be supplied to the bordering part. Subsequently, FIG. 19D represents an example that the dither pattern is applied by the above-mentioned method to the dither patterns Pw located at the x4 to x6 in the bordering part 2. Referring to FIG. 19C, the pattern 21 and pattern 22 is applied to the pattern that is different between the vertically adjacent dither pattern Pw at the x5, where the brightness noise is the highest, and the pattern 11 to pattern 14, of which the brightness compensation degree is lower than the pattern 21 and the pattern 22 are applied to the pattern that is different between the vertically adjacent dither pattern Pw at the x4 and x6. At this moment, the compensation should be made in a direction where the brightness is increased at the x4 to x6. To this end, it is possible to use a method of dispersing the second compensation data having a positive compensation value to a designated dither pattern to add to the data that are to be supplied to the bordering part, or a method of dispersing the second compensation data having a negative compensation value to a designated dither pattern to add to the data that are to be supplied to the bordering part. In the embodiment of the second compensation step, it is explained assuming the dither pattern Pw inclusive of four pixels that are arranged in 2×2 matrix, but the dither pattern designating the pixels to which the data are to be dispersed and the number of pixels that form the dither pattern Pw can be variously adjusted. On the other hand, in the second compensation step, in addition to the above-described FRC method, it is possible to apply a dither pattern that is different for each frame for the unit frame period of the dither pattern Pw. For example, in case of having four frames as the unit, the pattern 11 to pattern 14 are sequentially applied to each of the dither patterns Pw for each frame at the x1 and x3. The second compensation step can minutely adjust the brightness with the sub-divided gray level expression, and it is possible to prevent the brightness jump causingd by the regular dither pattern application, thus it is possible to compensate picture quality more naturally. On the other hand, it is proper that the compensation method of the second compensation step can be applied in the first compensation step or the compensation method of the first compensation step can be applied in the second compensation step.

Figure 20A:
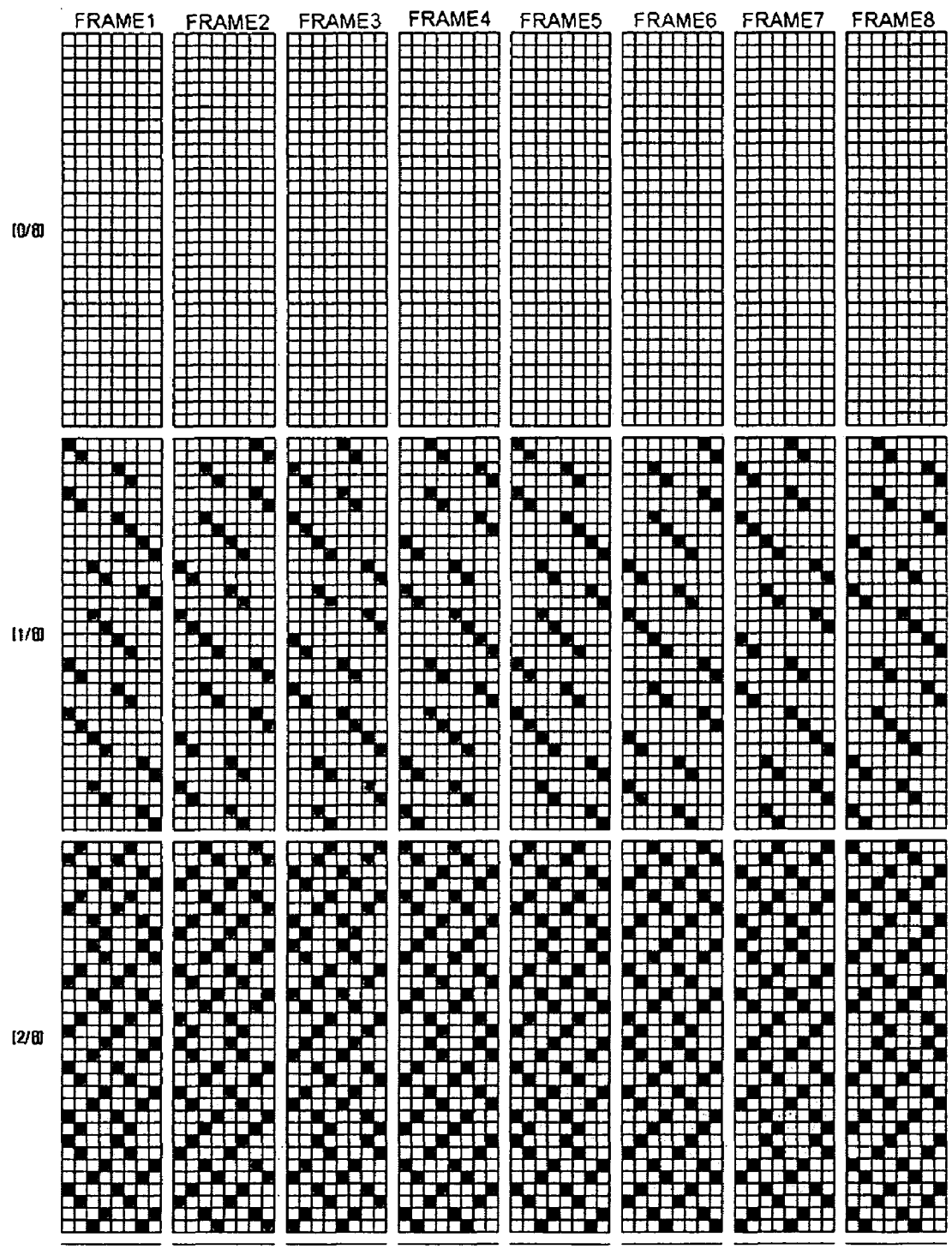
FIGS. 20A to 20C are diagrams representing the dither patterns of the frame rate control according to another embodiment of the present invention.
Figure 20B:
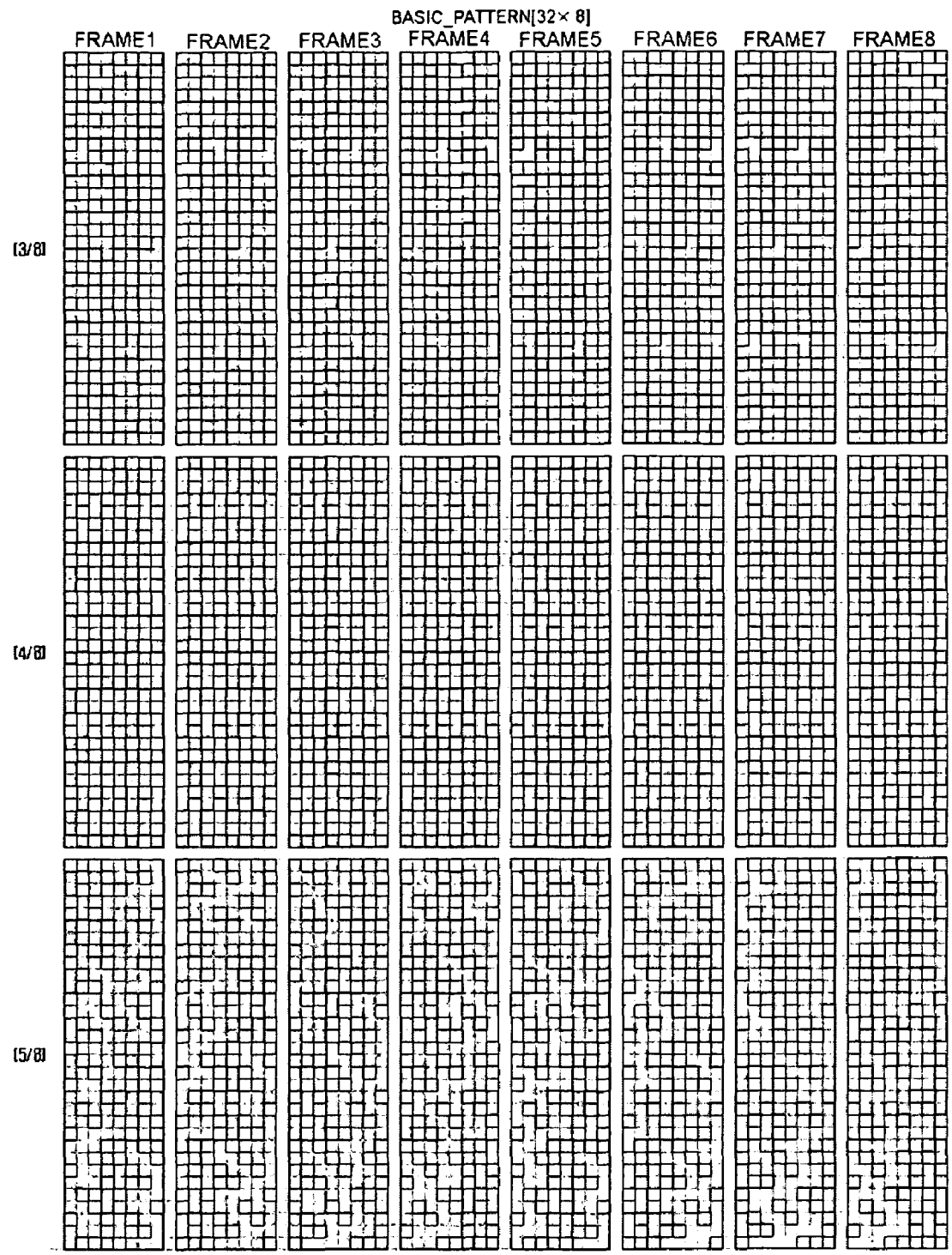
Figure 20C:
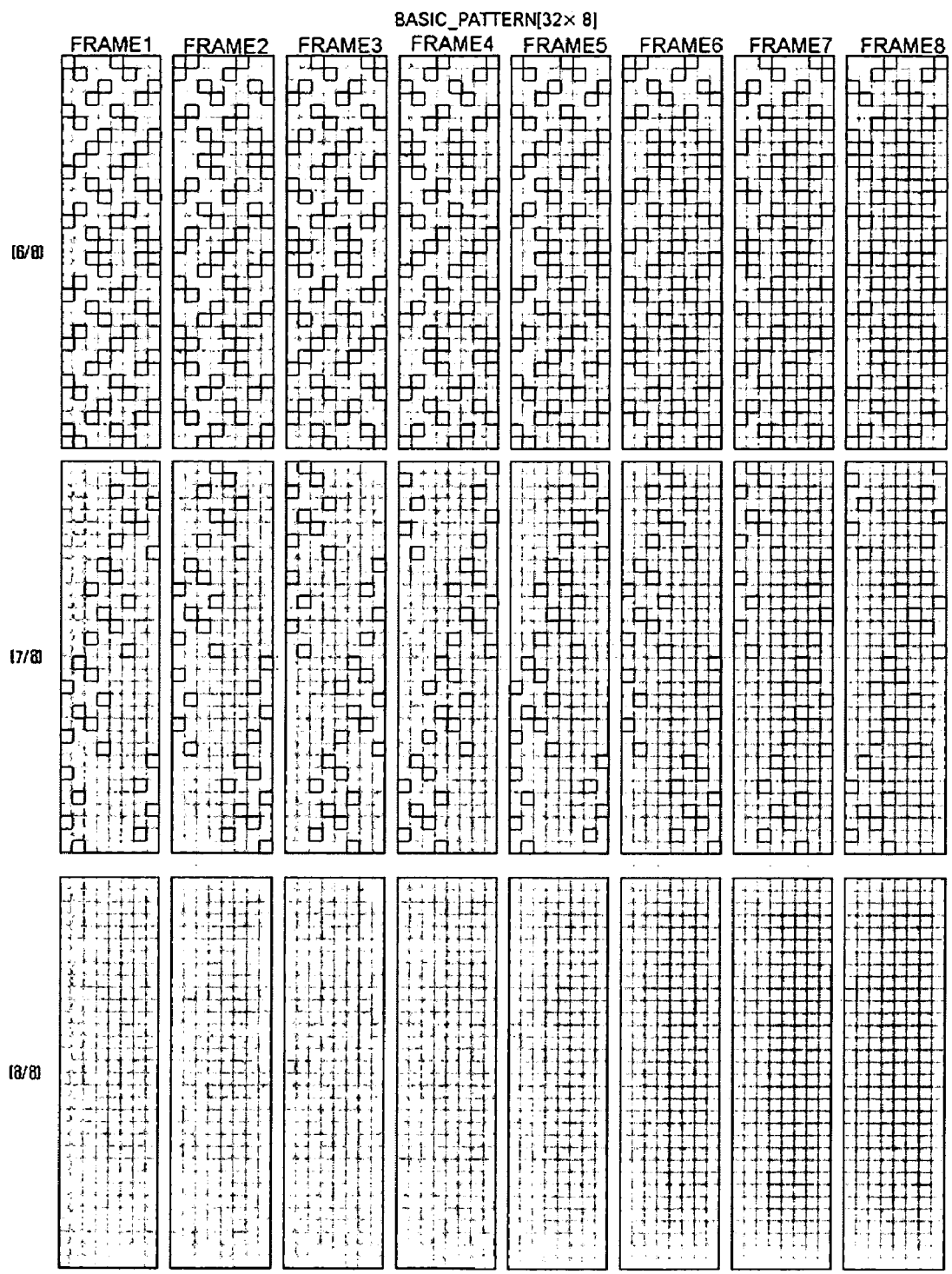

FIGS. 20A to 20C represent examples of the dither patterns where there is no brightness jump between dither patterns of which the compensation values are different and that are adjacent.

Referring to FIGS. 20A to 20C, the dithering pattern usingd in the FRC of present invention has the size of 8 (pixel)×32 (pixel) and adds or subtracts the compensation values ⅛, ⅜, ⅜, ⅝, ⅝, ⅝, ⅞, 1 to or from the input digital video data. The red in each dither pattern is pixels to which '1' is added or from which '1' is subtracted, and the gray is pixels to which '0' is added or from which '0' is subtracted. The size 8×32 of the dither pattern is determined so that the observer almost does not perceive the repeat period even though the same patterns are repeated through many experiments, and there appears no boundary between the dither patterns which express the different compensation values. Accordingly, the dither patterns of the present invention can be applied to the dither patterns of which the size is larger than the size of 8×32, e.g., the dither patterns of sizes 16×32, 24×32, 32×32, 16×40, 16×44, etc.

Each of the dither patterns includes four sub-dither patterns where the compensation value is the same and the locations of the compensation pixels to which the compensation value is added or from which the compensation value is subtracted are different. For example, the dither pattern of the compensation value ⅛ includes the first sub-dither pattern of the compensation value ⅛ as in FIG. 21A, the second sub-dither pattern of the compensation value ⅛ as in FIG. 21B, the third sub-dither pattern of the compensation value ⅛ as in FIG. 21C, and the fourth sub-dither pattern of the compensation value ⅛ as in FIG. 21D.

Figure 21A:
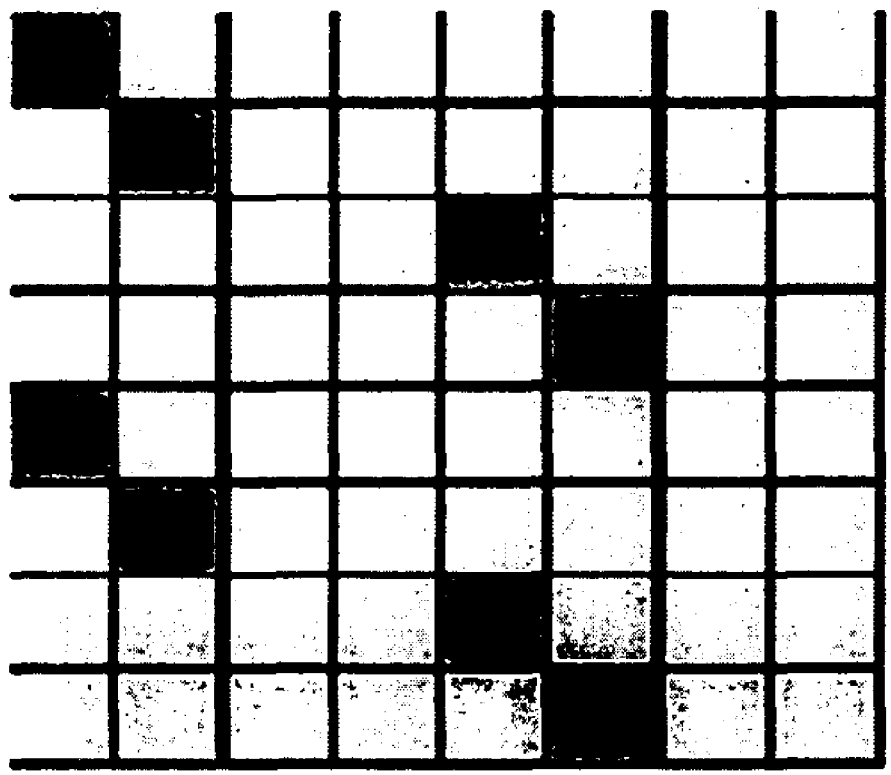
FIGS. 21A to 21D are diagrams representing sub dither patterns arranged within a ⅛ dither pattern shown in FIG. 20A.
Figure 21B:
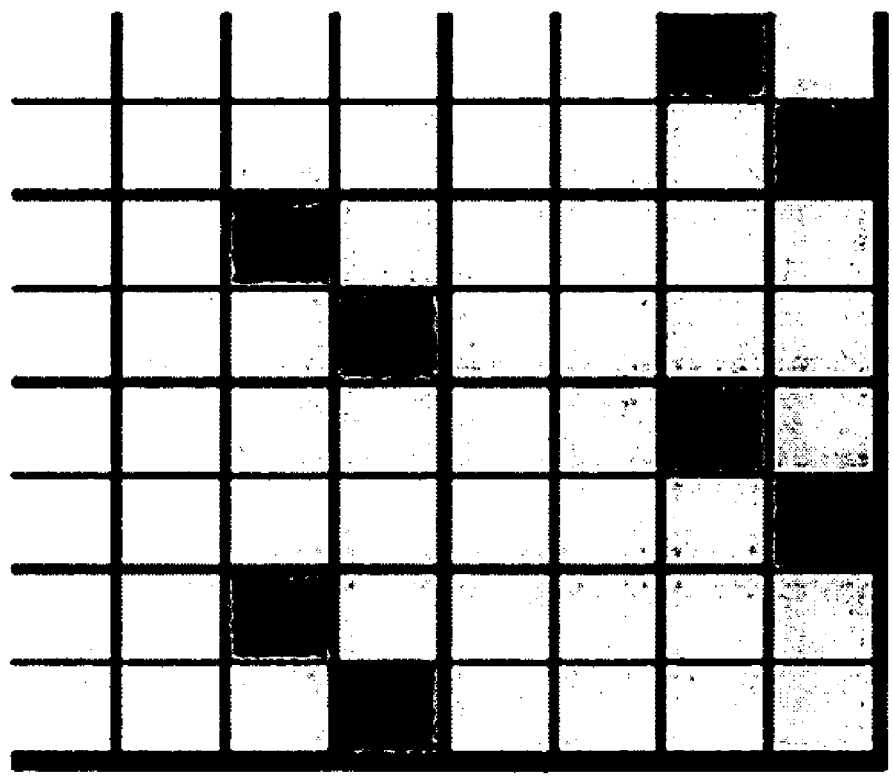
Figure 21C:
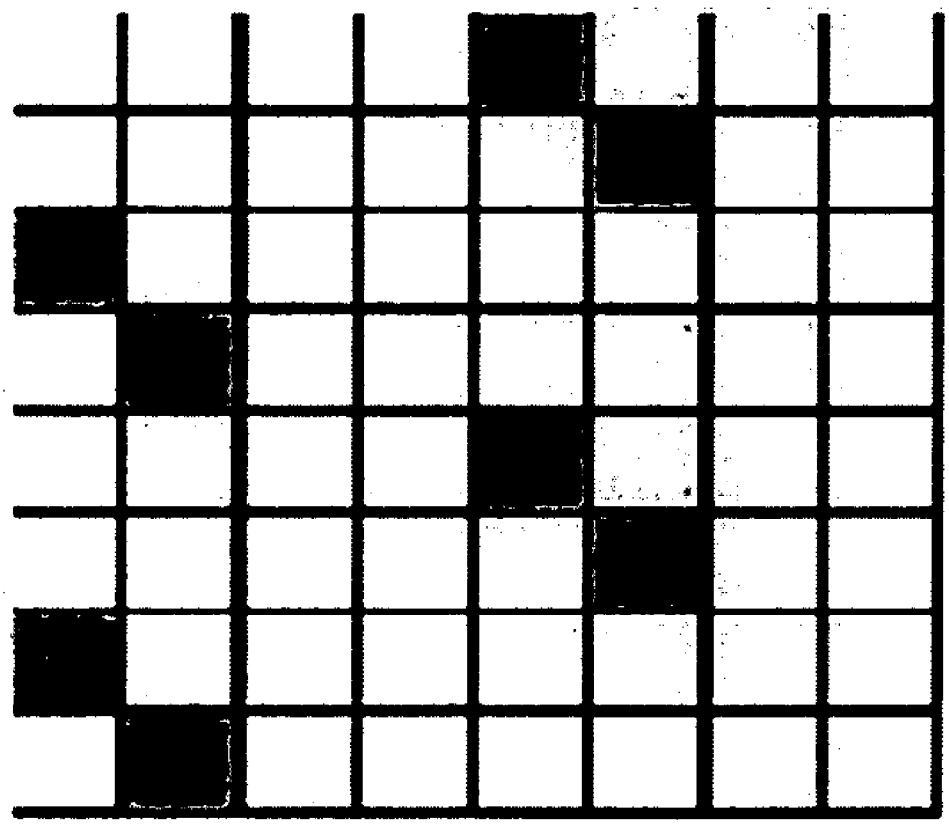
Figure 21D:
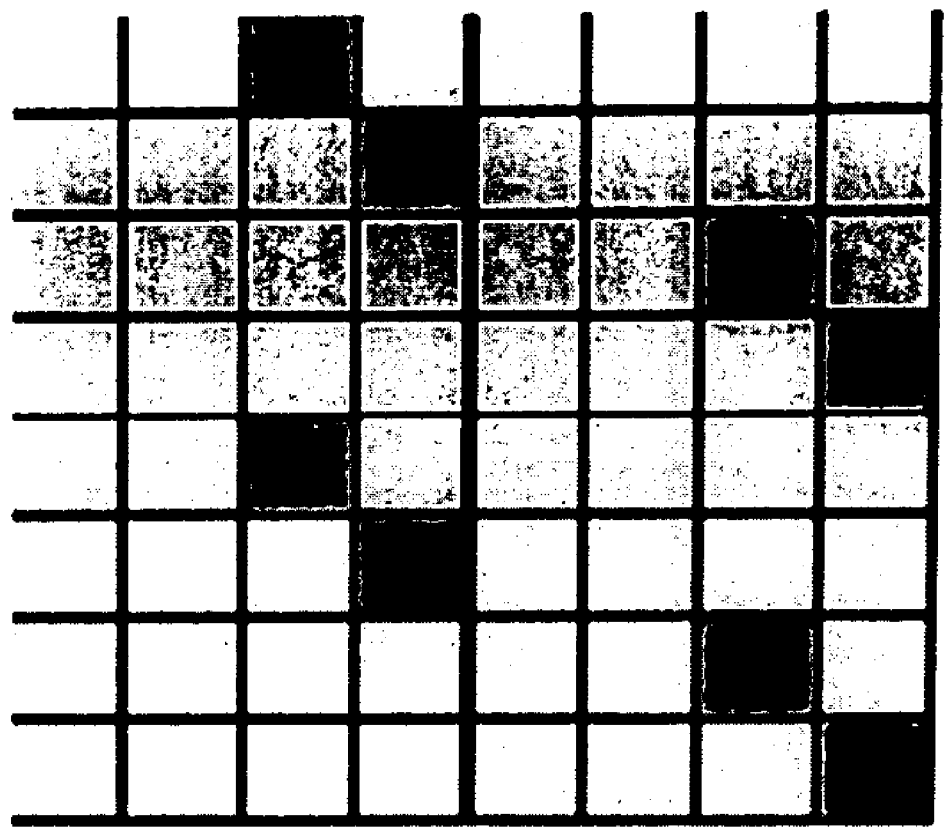

Assuming that 'x' is a horizontal direction where the order is increased from the left to the right, 'y' is a vertical direction where the order is increased from the top to the bottom by one, and the pixels to which the compensation value '1' is added to or from which the compensation value '1' is subtracted from in the first sub dither pattern are P[1, 1], P[1, 5], P[2, 2], P[2, 6], P[5, 3], P[5, 7], P[6, 4], P[6, 8], as in FIG. 21A. The pixels to which the compensation value '1' is added to or from which the compensation value '1' is subtracted from in the second sub dither pattern are P[3, 3], P[3, 7], P[4, 4], P[4, 8], P[7, 1], P[7, 5], P[8, 2], P[8, 6], as in FIG. 21B. The pixels to which the compensation value '1' is added to or from which the compensation value '1' is subtracted from in the third sub dither pattern are P[1, 3], P[1, 7], P[2, 4], P[2, 8], P[5, 1], P[5, 5], P[6, 2], P[6, 6], as in FIG. 21C. And, the pixels to which the compensation value '1' is added to or from which the compensation value '1' is subtracted from in the fourth sub dither pattern are P[3, 1], P[3, 5], P[4, 2], P[4, 6], P[7, 3], P[7, 7], P[8, 4], P[8, 8], as in FIG. 21D.

The dither pattern of the compensation value ⅛ has the first sub dither pattern, the second sub dither pattern, the third sub dither pattern, and the fourth sub dither pattern disposed from the top to the bottom in the first frame period, and the locations of the pixels to which the compensation value is added or from which the compensation value is subtracted in each of the sub dither patterns are shifted in left and right directions and in top and bottom directions so that the pattern of the pixels to which the compensation value is added or from which the compensation value is subtracted in the top and bottom and in the left and right is not repeated in the same manner. The arrangement of the sub dither patterns becomes different for each frame period, as illustrated in FIG. 21A. That is to say, the dither pattern of the compensation value ⅛ has the second sub dither pattern, the third sub dither pattern, the fourth sub dither pattern, and the first sub dither pattern disposed from the top to the bottom in the second frame period, and the locations of the pixels to which the compensation value is added or from which the compensation value is subtracted in each of the sub dither patterns are shifted in left and right directions and in top and bottom directions. The dither pattern of the compensation value ⅛ has the third sub dither pattern, the fourth sub dither pattern, the first sub dither pattern, and the second sub dither pattern disposed from the top to the bottom in the third frame period, and the locations of the pixels to which the compensation value is added or from which the compensation value is subtracted in each of the sub dither patterns are shifted in left and right directions and in top and bottom directions. The dither pattern of the compensation value ⅛ has the fourth sub dither pattern, the first sub dither pattern, the second sub dither pattern, and the third sub dither pattern disposed from the top to the bottom in the second frame period, and the locations of the pixels to which the compensation value is added or from which the compensation value is subtracted in the sub dither patterns are shifted in left and right directions and in top and bottom directions. The dither pattern of the compensation value ⅛ is repeated the first to fourth frame periods for the fifth to sixth frame periods.

In the same manner as the dither pattern of the compensation value ⅛, as illustrated in FIGS. 20A to 20C, a ⅔ dither pattern, a ⅜ dither pattern, a ⅘ dither pattern, a ⅝ dither pattern, a ⅚ dither pattern, and a ⅞ dither pattern include 'J' number of sub dither patterns having different patterns of the pixels to which the compensation value 'I' is added and from which the compensation value 'I' is subtracted when the compensation value is 'I' and the number of sub dither patterns is 'J'. In the dither patterns, the arrangement of the sub dither patterns is different in each of the J number of frames, and the dither pattern where the number of compensation pixel and the location are the same for each 'J+1' number of frame periods.

Figure 22:
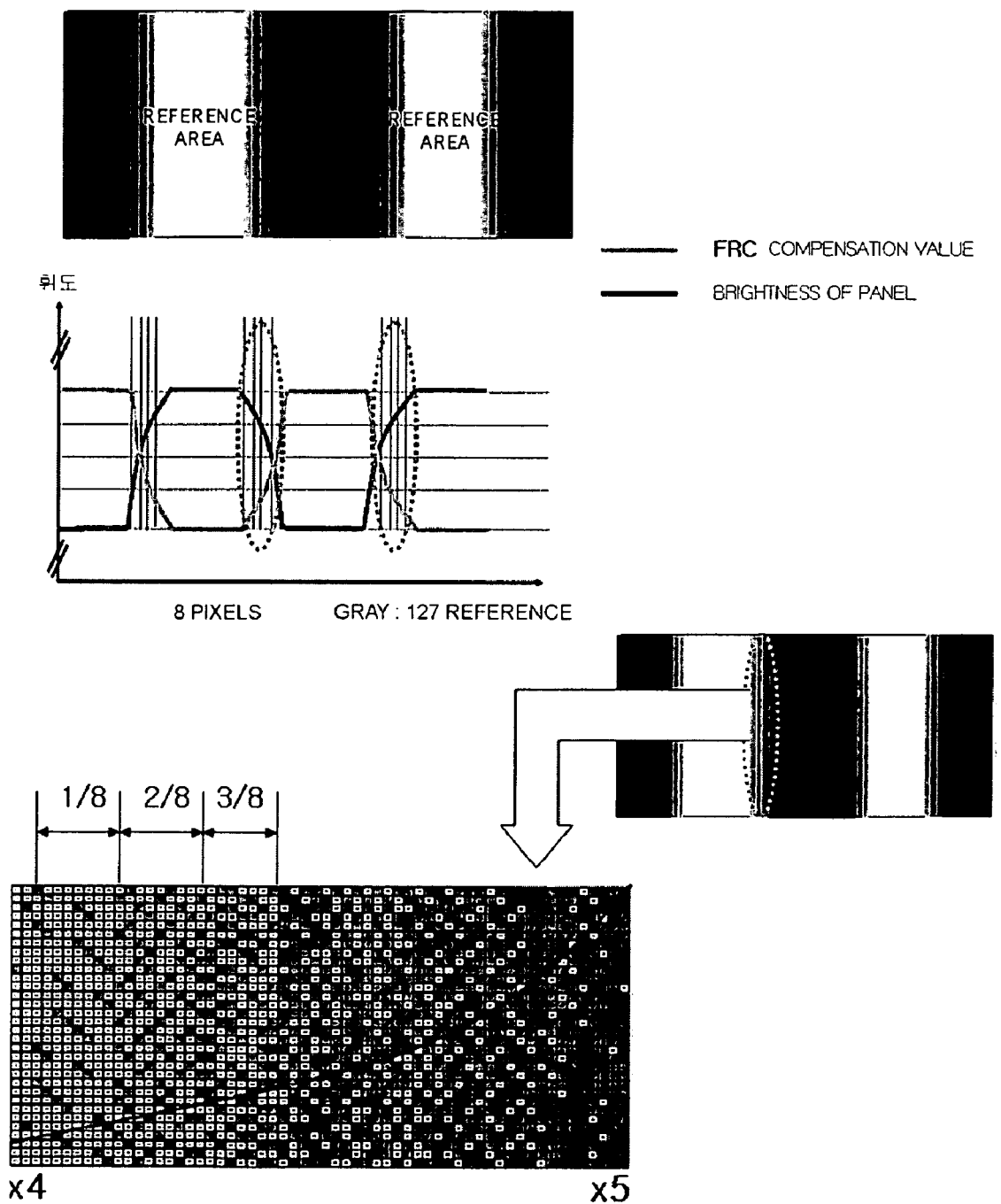
FIG. 22 is a diagram representing an example of a dither pattern mapped to a bordering part 'x4-x5' shown in FIG. 19A.
Figure 23A:
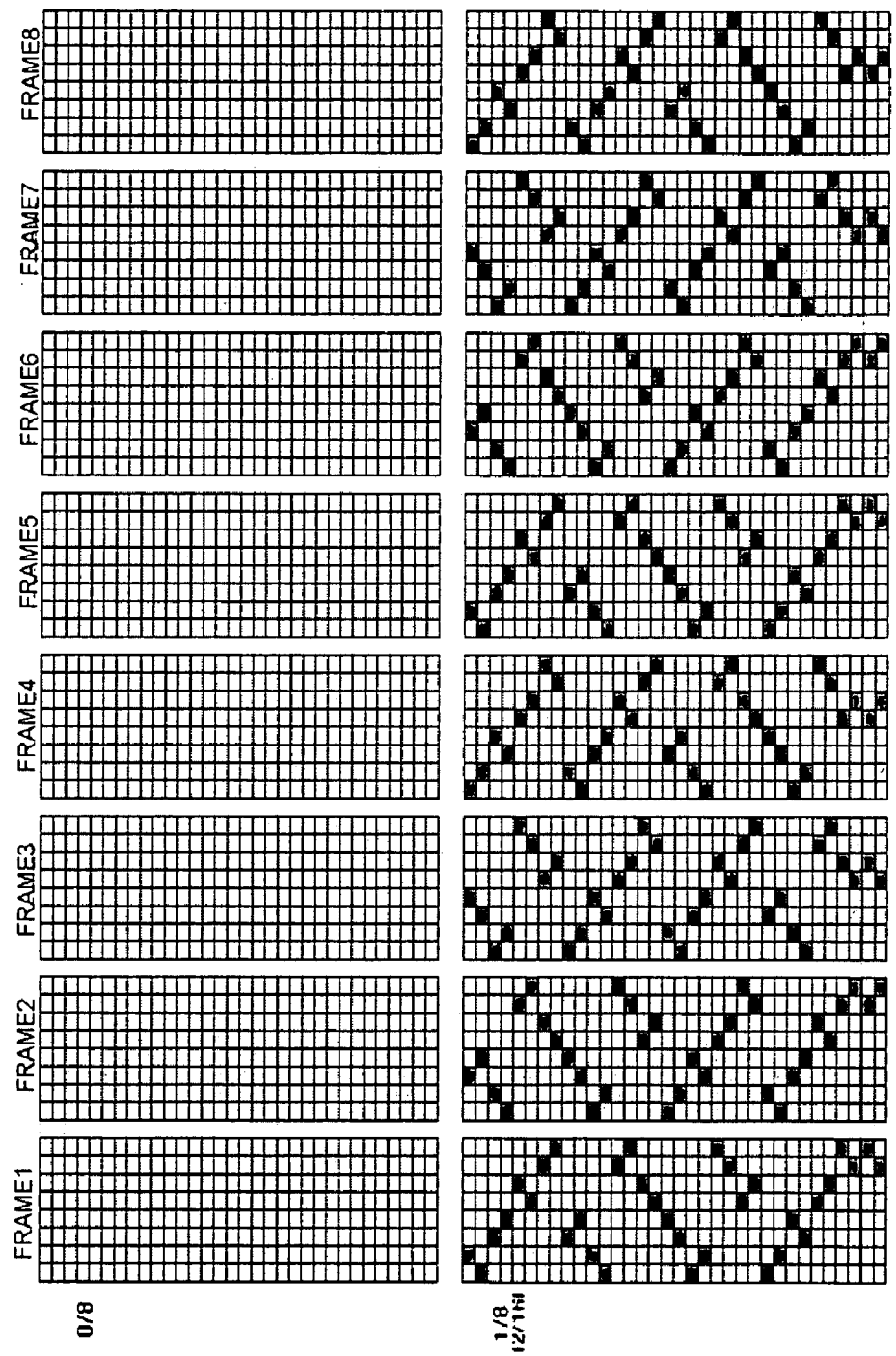

FIG. 22 represents one example of the dither patterns which are mapped to the bordering part between x4-x5 where the brightness is decreased as it goes from the bordering part 2 of the panel defect area and the non-defect area to the non-defect area in FIG. 19A using the dither patterns of FIGS. 20A to 20C in the first frame period.

For example, the dither patterns mapped as in FIG. 22 add the compensation value to the digital video data that are to be displayed in the bordering part between x4-x5 to compensate the brightness of the bordering part equally to the non-defect area. As can be known in the brightness curve of blue in FIG. 22, the FRC of the present invention has a different compensation value and the brightness change is not generated rapidly in the boundary between the adjacent dither patterns.

FIGS. 23A to 23D represent dither patterns of the FRC according to another embodiment of the present invention. The dither pattern has the size of 8×32 and adds or subtracts the compensation values ⅛, ⅔, ⅜, ⅘, ⅝, ⅚, ⅞, 1 to or from the input digital video data in accordance with the number of the pixels to which the compensation value is applied. The red in each dither pattern is pixels to which '1' is added or from which '1' is subtracted, and the gray is pixels to which '0' is added or from which '0' is subtracted. The dither pattern of the compensation value '1' is the dither pattern where the compensation value '1' is compensated to each of the pixels included in the dither pattern of the same size 8×32 and is omitted in the drawing. The dither patterns are designed in the same design condition as the design condition of the foregoing dither patterns of FIGS. 20A to 20C. That is to say, the dither pattern of the compensation value 'I' includes 'J' number of sub dither patterns where the compensation value is 'I' and the patterns of the pixels to which the compensation value 'I' is added and from which the compensation value 'I' is subtracted are different. And, in the dither patterns, the arrangement of the sub dither patterns is different in each of the J number of frames and the dither patterns of the same compensation value are shown for each (J+1) number of frame periods.

The embodiment for the third compensation step according to the present invention increases or decreases the data, which are to be supplied to the link pixel, to the third compensation data to compensate the charge characteristic (e.g., capacitance) of the link pixel. For example, in case that the third compensation data, which are optimized for each location and for each gray level for the link pixel are determined as shown in TABLE 2 below, the third compensation step, if the data to be supplied to the 'location 1' is '01000000(64)' corresponding to the 'gray level section 1', adds '00000100(4)' to '01000000(64)' so as to modulate the data, which are to be supplied to the 'location 1', to '01000100(68)', and adds '00000110(6)' to '10000000(128)' so as to modulate the digital video data, which are to be supplied to the 'location 2', to '10000110(134)' if the data to be supplied to the 'location 2' is '10000000(128)' corresponding to the 'gray level section 3'.

TABLE 2

| Classification | Gray level area | Location 1 | Location 2 |
| --- | --- | --- | --- |
| Gray Level Section 1 | 00000000(0)~00110010(50) | 00000100(4) | 00000010(2) |
| Gray Level Section 2 | 00110011(51)~00111000(112) | 00000110(6) | 00000100(4) |
| Gray Level Section 3 | 01110001(113)~10111110(190) | 00001000(8) | 00000110(6) |

In case that the link pixel is included in the panel defect area or the bordering part, it is desirable to calculate the third compensation data in consideration of the compensation value of the first and second compensation data. For example, it is assumed that there are the link pixel 1 included in the panel defect area or the bordering part and the link pixel 2 included in the non-defect area except the bordering part, and the two link pixel are all required to be compensated by as much as '+3' becauseing the link pixel 1 and the link pixel 2 are all have the same charge characteristic. In this case, the third compensation data to compensate '+3' will be enough to be determined for the link pixel 2, but in case of the link pixel 1, if the first or second compensation data have already compensated by '+1', it is desirable to determine the third compensation data, which will compensate by '+2', for the link pixel 1.

As described above, the third compensation step modulates the data, which are to be displayed in the link pixel to which the normal pixel adjacent to the defect pixel is linked, to the third compensation data which compensate the charge characteristic (e.g., capacitance) of the link pixel, thereby making it possible to lower the perception degree of the defect pixel.

Figure 24:
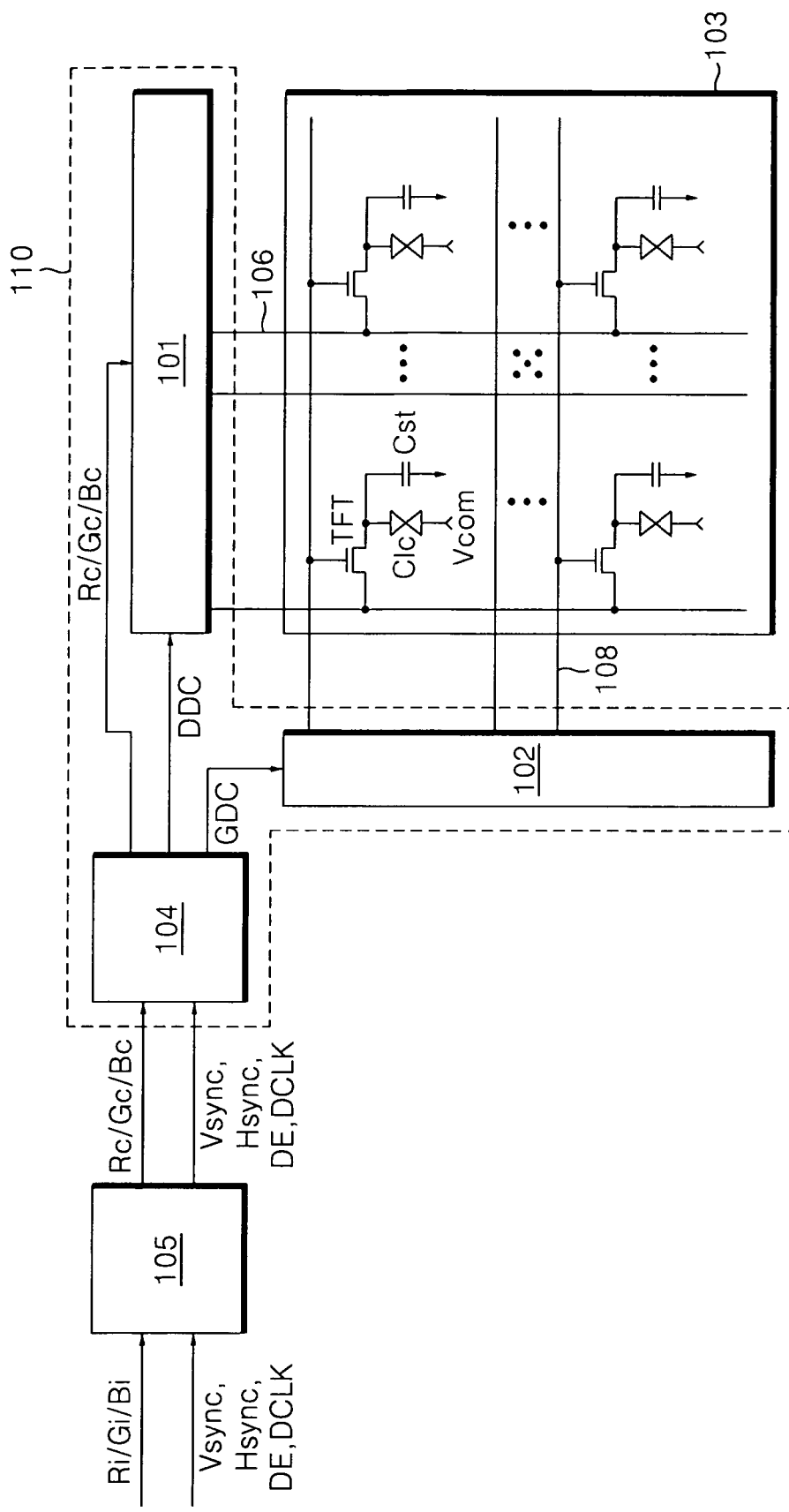
FIG. 24 is a diagram representing a flat panel display device according to the present invention.

As described above, in order to realize the picture quality controlling method according to the embodiment of the present invention, the liquid crystal display device according to the embodiment of the present invention includes a compensation circuit 105 which receives the data, as shown in FIG. 24, to modulate this and supplies to the driver 110 that drives the liquid crystal display panel 103.

Referring to FIG. 24, the liquid crystal display device according to the embodiment of the present invention includes a display panel 103 where data lines 106 cross gate lines 108 and a TFT for driving a liquid crystal cell Clc is formed at each of the crossing parts thereof; a compensation circuit 105 for modulating the input data Ri/Gi/Bi, which are to be supplied to the panel defect location of the display panel 103, to generate the corrected digital video data Rc/Gc/Bc; a data drive circuit 101 for supplying the corrected digital video data Rc/Gc/Bc to the data lines 106; a gate drive circuit 102 for supplying a scan signal to the gate lines 108; and a timing controller 104 for controlling the data drive circuit 101 and the gate drive circuit 102.

The display panel 103 has liquid crystal molecules between two substrates, i.e., TFT substrate and color filter substrate. The data lines 106 and the gate lines 108 formed on the TFT substrate cross each other. The TFT formed at the crossing part of the data lines 106 and the gate lines 108 supplies the data voltage supplied through the data line 106 to the pixel electrode of the liquid crystal cell Clc in response to the scan signal from the gate line 108. A black matrix, a color filter and a common electrode (not shown) are formed on the color filter substrate. On the other hand, the common electrode formed in the color filter substrate can be formed on the TFT substrate in accordance with an electric field application method. Polarizers having polarizing axes perpendicular to each other are respectively adhered to the TFT substrate and the color filter substrate.

The compensation circuit 105 receives the input digital video data Ri/Gi/Bi from a system interface to modulate the input data Ri/Gi/Bi which are to be supplied to the panel defect area, the bordering part and the link pixel, thereby generating the corrected digital video data Rc/Gc/Bc. And, the compensation circuit 105 supplies the data Ri/Gi/Bi, which are to be displayed in the non-defect area, to the timing controller 104 without modulating the data.

The timing controller 104 supplies the digital video data Rc/Gc/Bc, which are supplied through the compensation circuit 105, to the data drive circuit 101 in accordance with the dot clock DCLK and generates a gate control signal GDC for controlling the gate drive circuit 102 and a data control signal DDC for controlling the data drive circuit 101 by using of a vertical/horizontal synchronization signal Vsync, Hsync, a data enable signal DE and a dot clock DCLK.

The data drive circuit 101 converts the corrected digital video data Rc/Gc/Bc, which are supplied from the timing controller 104 as a digital signal, into the analog gamma compensation voltage (data voltage) to supply to the data lines 106.

The gate drive circuit 102 sequentially supplies a scan signal, which selects the horizontal line to which the data voltage is to be supplied, to the gate lines 108. The data voltage from the data lines 106 is synchronized with the scan signal to be supplied to the liquid crystal cells Clc of one horizontal line.

Hereinafter, in reference to FIGS. 25 to 37, a detailed description on the compensation part 105 will be made.

Figure 25:
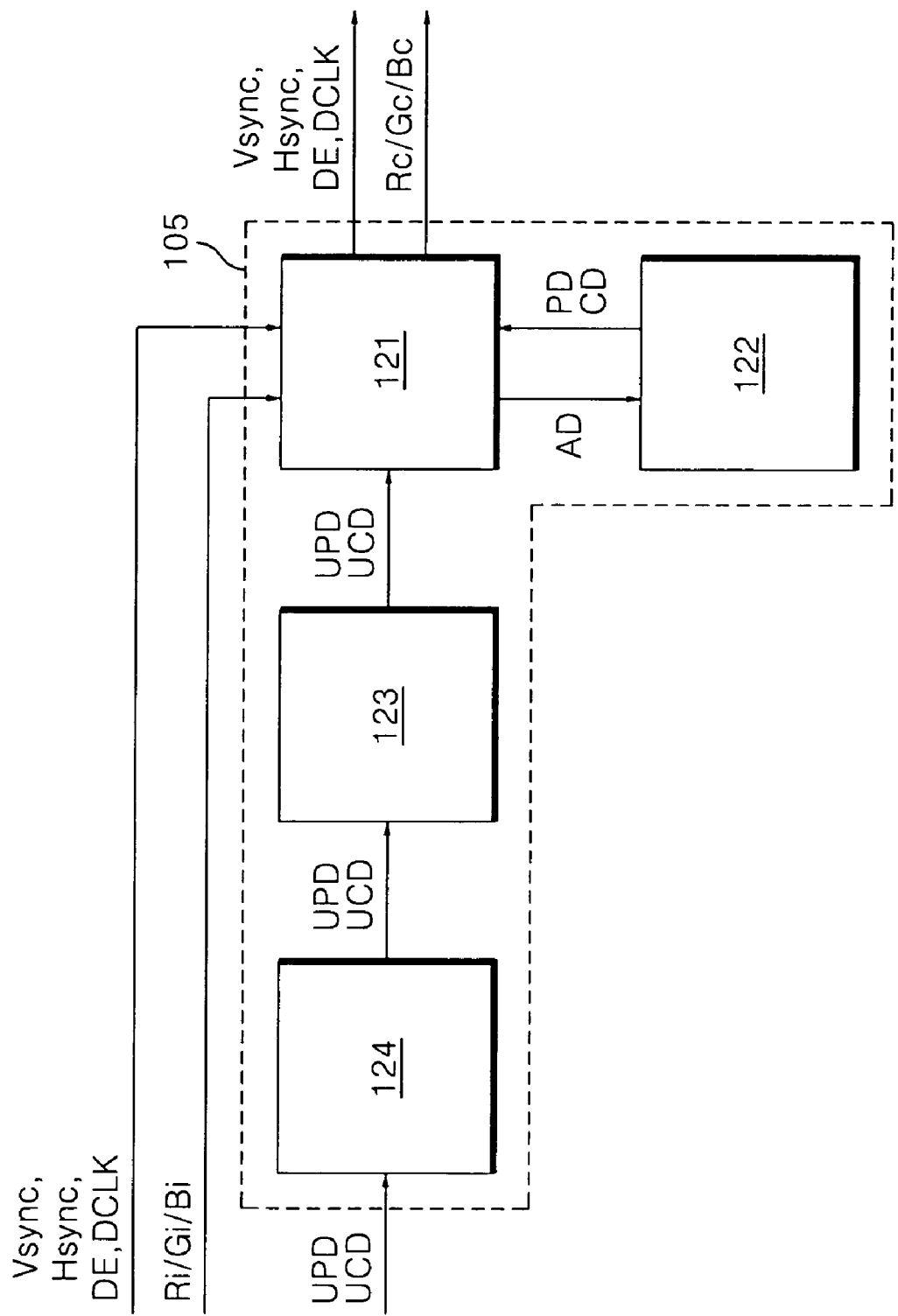
FIG. 25 is a diagram representing a compensation circuit illustrated in FIG. 24.

Referring to FIG. 25, the compensation circuit 105 includes an EEPROM 122 which stores the location data PD and the compensation data CD of the panel defect area, the bordering part and the defect pixel; a compensation part 121 for generating the corrected digital video data Rc,Gc,Bc by modulating the input data Ri/Gi/Bi supplied from an external system by using of the location data PD and the compensation data CD which are stored at the EEPROM 122; an interface circuit 124 for communicating between the compensation circuit 105 and the external system; and a register 123 for temporarily storing the data that are to be stored at the EEPROM 122 through the interface circuit 124.

The EEPROM 122 stores the location data PD which indicates the location of each of the panel defect area, the bordering part and the link pixel and the compensation data CD for each of the panel defect area, the bordering part and the link pixel. The EEPROM 122 can renew the location data PD and the compensation data CD by an electrical signal applied from the external system. That is to say, the EEPROM 122 can store the data, which are inputted from a ROM recorder connected the interface circuit 124 through the user connector, and modifies the stored data.

The interface circuit 124 is a configuration for a communication between the compensation circuit 105 and the external system, and the interface circuit 124 is designed according to the communication standard protocol such as I2C, etc. The external system can read or modify the data stored at the EEPROM 122 through the interface circuit 124. That is to say, the compensation data CD and the location data PD stored at the EEPROM 122 are required to be renewed for reasons such as change in process, difference between application model, etc, and a user supplies the location data UPD and the compensation data UCD, which are desired to be renewed, from the external system so that it is possible to modify the data stored at the EEPROM 122.

The location data UPD and the compensation data UCD transmitted through the interface circuit 124 are temporarily stored at the register 123 in order to renew the location data PD and the compensation data CD stored at the EEPROM 122.

Figure 26:
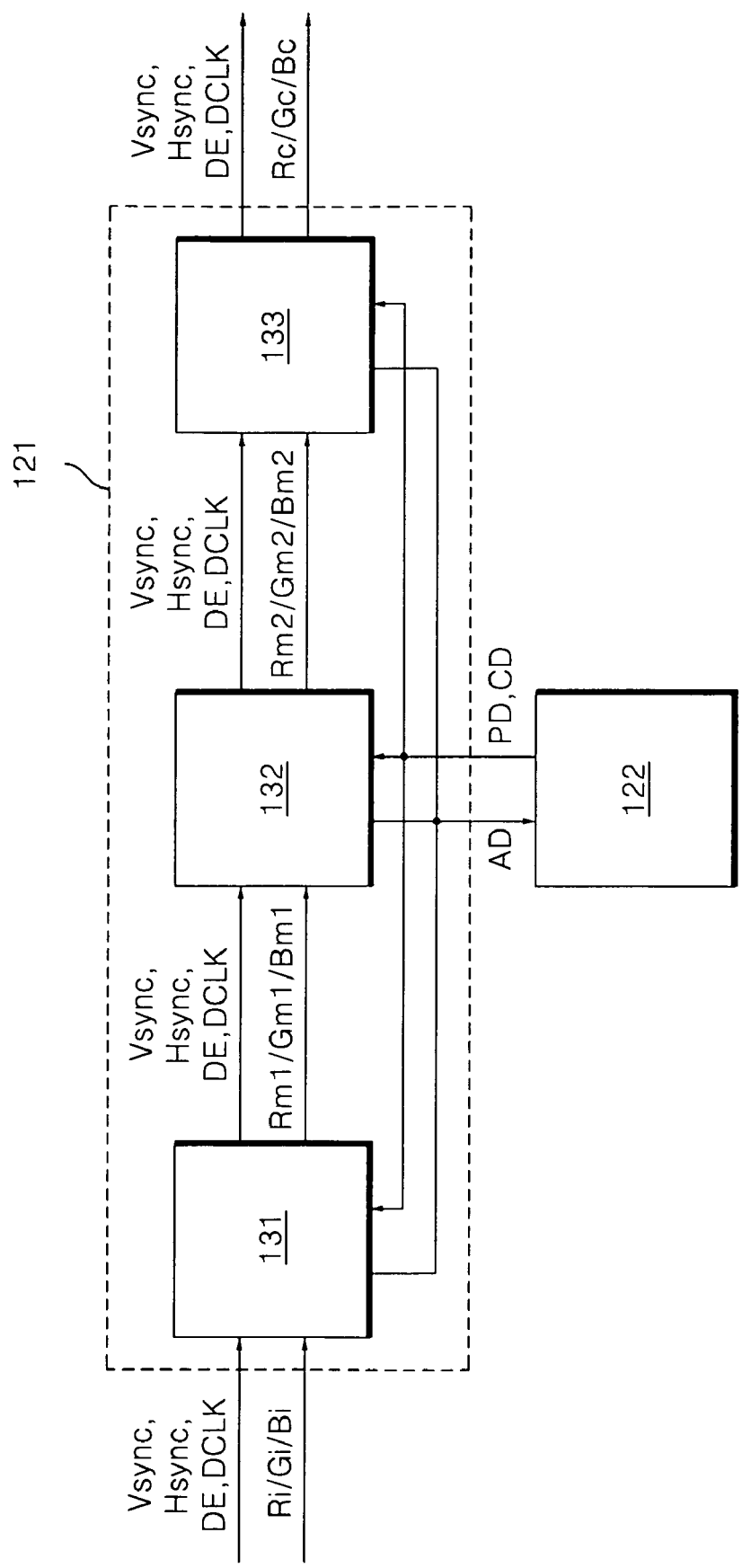
FIG. 26 is a diagram representing a compensation part illustrated in FIG. 25.

The compensation part 121 modulates the data, which are to be supplied to the panel defect area, the bordering part and the link pixel, using the location data PD and the compensation data CD which are stored at the EEPROM 122. The compensation part 121, as illustrated in FIG. 26, includes a first compensation part 131 that modulates the data that are to be supplied to the panel defect area using the first compensation data; a second compensation part 132 that modulates the data that are to be supplied to the bordering part by using the second compensation data; and a third compensation part 133 that modulates the data that are to be supplied to the link pixel by using of the third compensation data.

FIGS. 27 to 32 represent embodiments for a first compensation part 131A.

Figure 27:
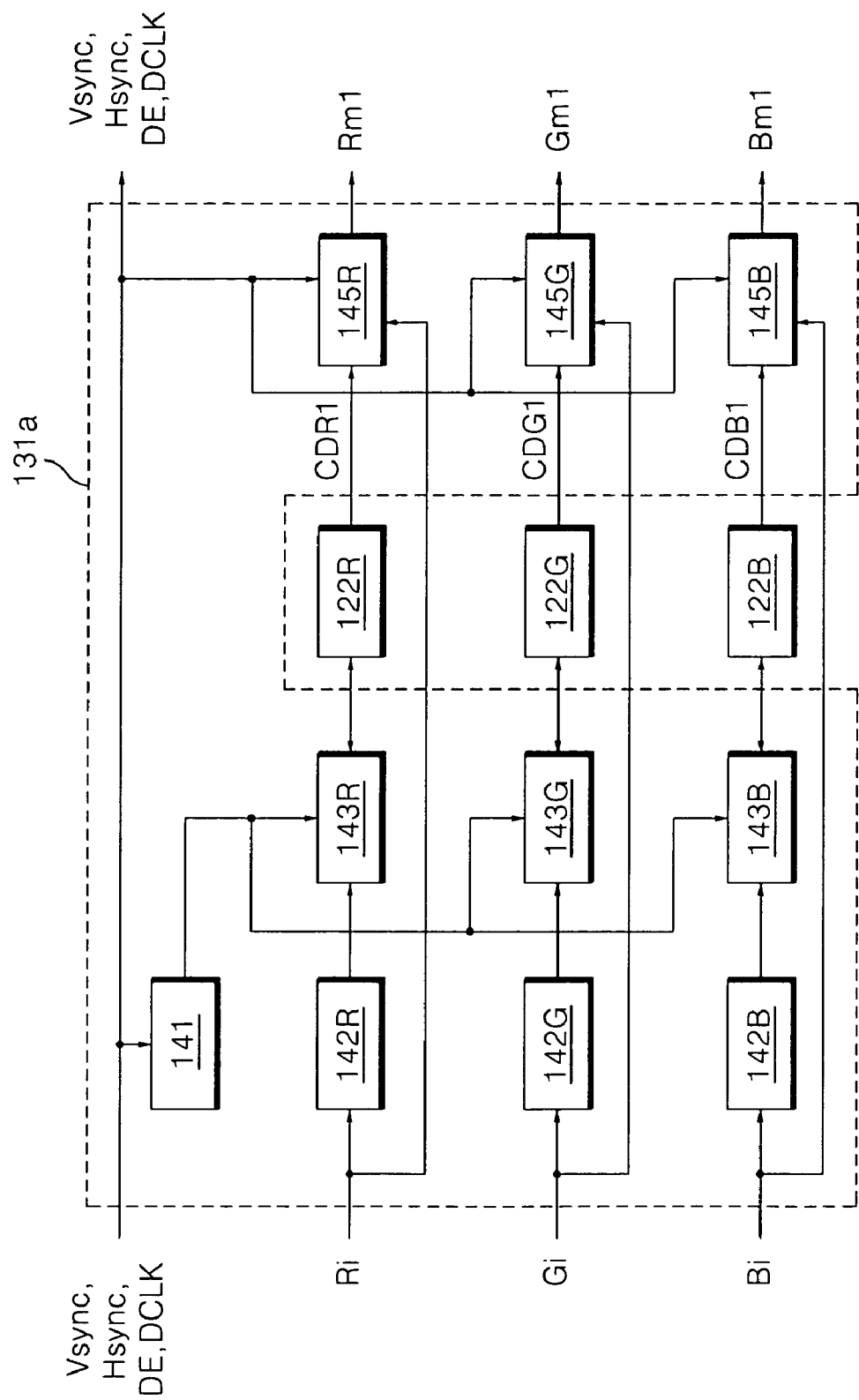
FIGS. 27 to 37 are diagrams representing various embodiments of first to third compensation parts illustrated in FIG. 26.
Figure 28:
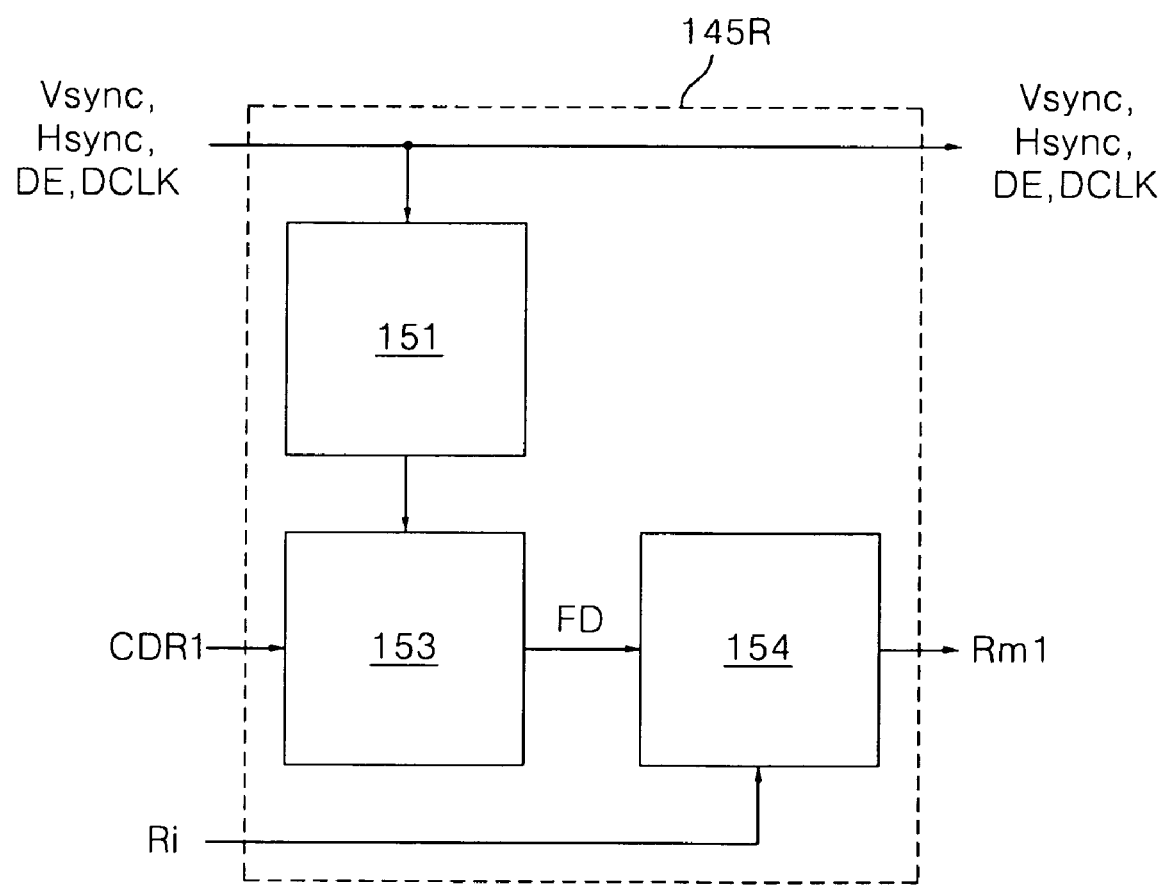

Referring to FIG. 27, the first compensation part 131A modulates the digital video data Ri/Gi/Bi, which are to be displayed in the panel defect area, by the FRC method using first compensation data CDR1, CDG1, CDB1 stored at the EEPROM 122R, 122G, 122B. The first compensation part 131A includes a location judging part 141, a gray level judging part 142R, 142G, 142B, an address generating part 143R, 143G, 143B, and an FRC controller 145R, 145G, 145B.

The location judging part 141 judges a display location of the data Ri/Gi/Bi using a vertical/horizontal synchronization signal Vsync, Hsync, a data enable signal DE and a dot clock DCLK, and supplies the information for the display location of the data Ri/Gi/Bi to the address generating part 143R, 143G, 143B.

The gray level judging part 142R, 142G, 142B analyzes a gray level section inclusive of a gray level of the data Ri/Gi/Bi or a gray level of the input data Ri/Gi/Bi, and supplies the information for this to the address generating part 143R, 143G, 143B.

The address generating part 143R, 143G, 143B generates a read address for reading the first compensation data CDR1, CDG1, CDB1 of the EEPROM 122R, 122G, 122B from the location data of the panel defect area stored at the EEPROM 122R, 122G, 122B, the location judging result of the location judging part 141, and the gray level judging result of the gray level judging part 142R, 142G, 142B, and supplies the read address to the EEPROM 122R, 122G, 122B. The first compensation data CDR1, CDG1, CDB1 outputted from the EEPROM 122R, 122G, 122B are supplied to the FRC controller 145R, 145G, 145B in accordance with the read address.

The FRC controller 145R, 145G, 145B disperses the first compensation data CDR1, CDG1, CDB1 from the EEPROM 122R, 122G, 122B for a plurality of frame periods, and adds or subtracts the compensation data to or from the data Ri/Gi/Bi, which are to be displayed in the panel defect area. The FRC controller 145R, 145G, 145B includes a first FRC controller 145R for correcting the red data, a second FRC controller 145G for correcting the green data, and a third FRC controller 145B for correcting the blue data.

The first FRC controller 145R includes a compensation value judging part 153, a frame number sensing part 151 and a calculating part 154.

The compensation value judging part 153 judges the R compensation value and generates the FRC data FD with the value divided by the number of frames. The compensation value judging part 153 is programmed for the FRC data FD to be automatically outputted in accordance with the first R compensation data CDR1. For example, the compensation value judging part 153 is pre-programmed so that the compensation value for a 0 gray level is recognized if the first R compensation data CDR1 expressed as a binary data is '00', a ¼ gray level if it is '01', a ½ gray level if it is '10', and a ¾ gray level if it is '11'. And, in case of having four frames as a unit frame for controlling the FRC as in FIG. 15, the compensation value judging part 153 generates the FRC data FD in one frame to be added so that 1 gray level is added to any one frame among the first to fourth frames and generates the FRC data FD of '0' in the remaining 3 frames, as in FIG. 15(a), if the first R compensation data CDR1 of '01' is supplied.

The frame number sensing part 151 senses the frame number by using of any one of vertical/horizontal synchronization signals Vsync, Hsync, a dot clock DCLK and a data enable signal DE. For example, the frame number sensing part 151 counts the vertical synchronization signal Vsync to sense the frame number.

The calculating part 154 increases or decreases the R input data Ri to be supplied to the panel defect area to the FRC data FD, thereby generating a first R intermediate correction data Rm1.

On the other hand, the R input data Ri to be corrected and the first R compensation data CDR1 are supplied to the first FRC controller 145R through the different data transmission lines, or the R input data Ri to be corrected can be combined with the first R compensation data CDR1 to be supplied in the same line. For example, if the R input data to be corrected is '01000000' of 8 bits and the first R compensation data CDR1 is '011' of 3 bits, the '01000000' and '011' can be supplied to the first FRC controller 145 through the different data transmission lines respectively or they can be combined to an 11 bit data of '01000000011' to be supplied to the first FRC controller 145R. If the R input data Ri to be corrected and the first R compensation data CDR1 are combined to the 11 bit data to be supplied to the first FRC controller 145R, the first FRC controller 145R recognizes the upper 8 bits in the 11 bit data as the R input data Ri to be corrected, and the lower 3 bits as the first R compensation data CDR1. On the other hand, as one example of a method of forming the data of '01000000011' into which the '01000000' and '011' are combined, there is a method that a dummy bit '000' is added to the lowest bit of '01000000' to convert them into '01000000000' and '011' is added to generate the data of '01000000011'.

The second and third FRC controllers 145G, 145B substantially have the same circuit configuration as the first FRC controller 145R. Accordingly, a detail description for the second and third FRC controllers 145G, 145B will be omitted.

The first compensation part 131A can minutely adjust the data to be displayed in the panel defect area and the bordering part as the compensation value which is sub-divided into 1021 gray levels for each of the R, G, B when the R, G, B data are 8 bits and the temporal period of the FRC is four frame periods.

Figure 29:
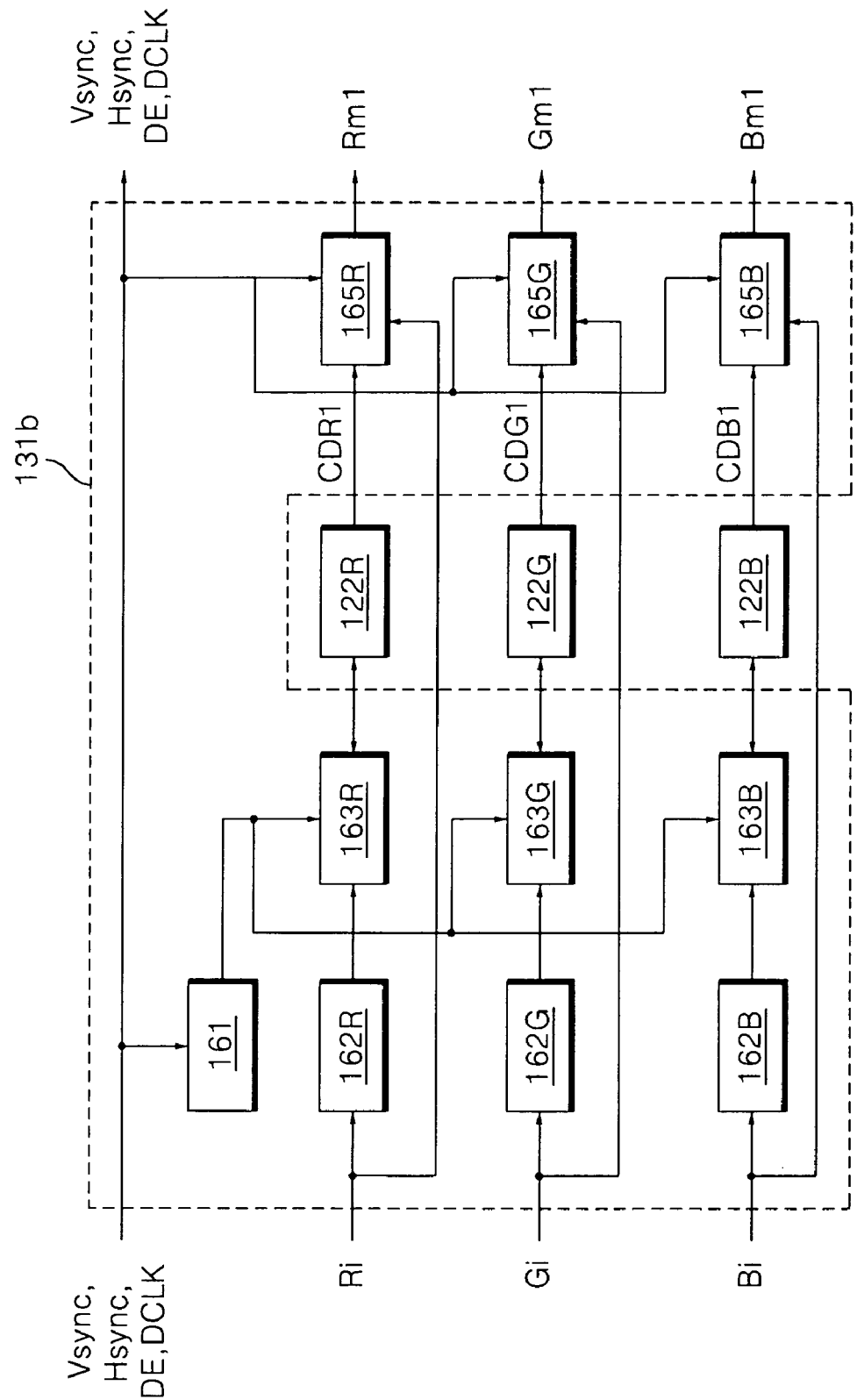

Referring to FIG. 29, a first compensation part 131B according to a second embodiment of the present invention modulates the digital video data Ri/Gi/Bi, which are to be displayed in the panel defect area, by the dithering method by using of first compensation data CDR1, CDG1, CDB1 stored at the EEPROM 122R, 122G, 122B. The first compensation part 131B includes a location judging part 161, a gray level judging part 162R, 162G, 162B, an address generating part 163R, 163G, 163B, and a dithering controller 165R, 165G, 165B.

The location judging part 161 judges a display location of the input data Ri/Gi/Bi by using of vertical/horizontal synchronization signals Vsync, Hsync, a data enable signal DE and a dot clock DCLK.

The gray level judging part 162R, 162G, 162B analyzes a gray level section inclusive of a gray level of the data Ri/Gi/Bi or a gray level of the input data Ri/Gi/Bi.

The address generating part 163R, 163G, 163B generates a read address for reading the first compensation data CDR1, CDG1, CDB1 of the EEPROM 122R, 122G, 122B from the location data of the panel defect area stored at the EEPROM 122R, 122G, 122B, the location judging result of the location judging part 161, and the gray level judging result of the gray level judging part 162R, 162G, 162B, and supplies the read address to the EEPROM 122R, 122G, 122B. The first compensation data CDR1, CDG1, CDB1 outputted from the EEPROM 122R, 122G, 122B are supplied to the dithering controller 165R, 165G, 165B in accordance with the read address.

The dithering controller 165R, 165G, 165B disperses the first compensation data CDR1, CDG1, CDB1 from the EEPROM 122R, 122G, 122B to each pixel within a dither pattern having a plurality of pixels, and increases or decreases the input data Ri/Gi/Bi to be displayed in the panel defect area to the dispersed first compensation data CDR1, CDG1, CDB1. The dithering controller 165R, 165G, 165B includes a first dithering controller 165R for correcting red data, a second dithering controller 165G for correcting green data and a third dithering controller 165B for correcting blue data.

Figure 30:
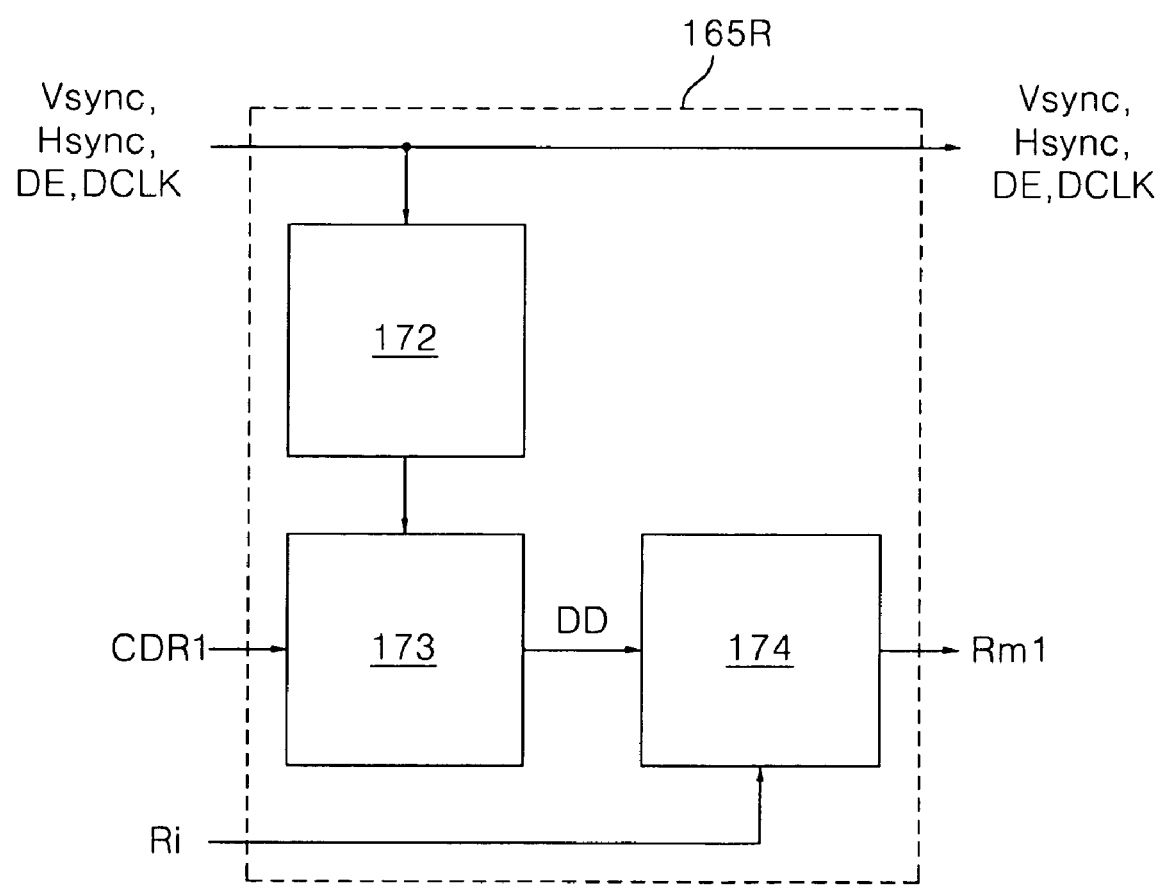
Figure 31:
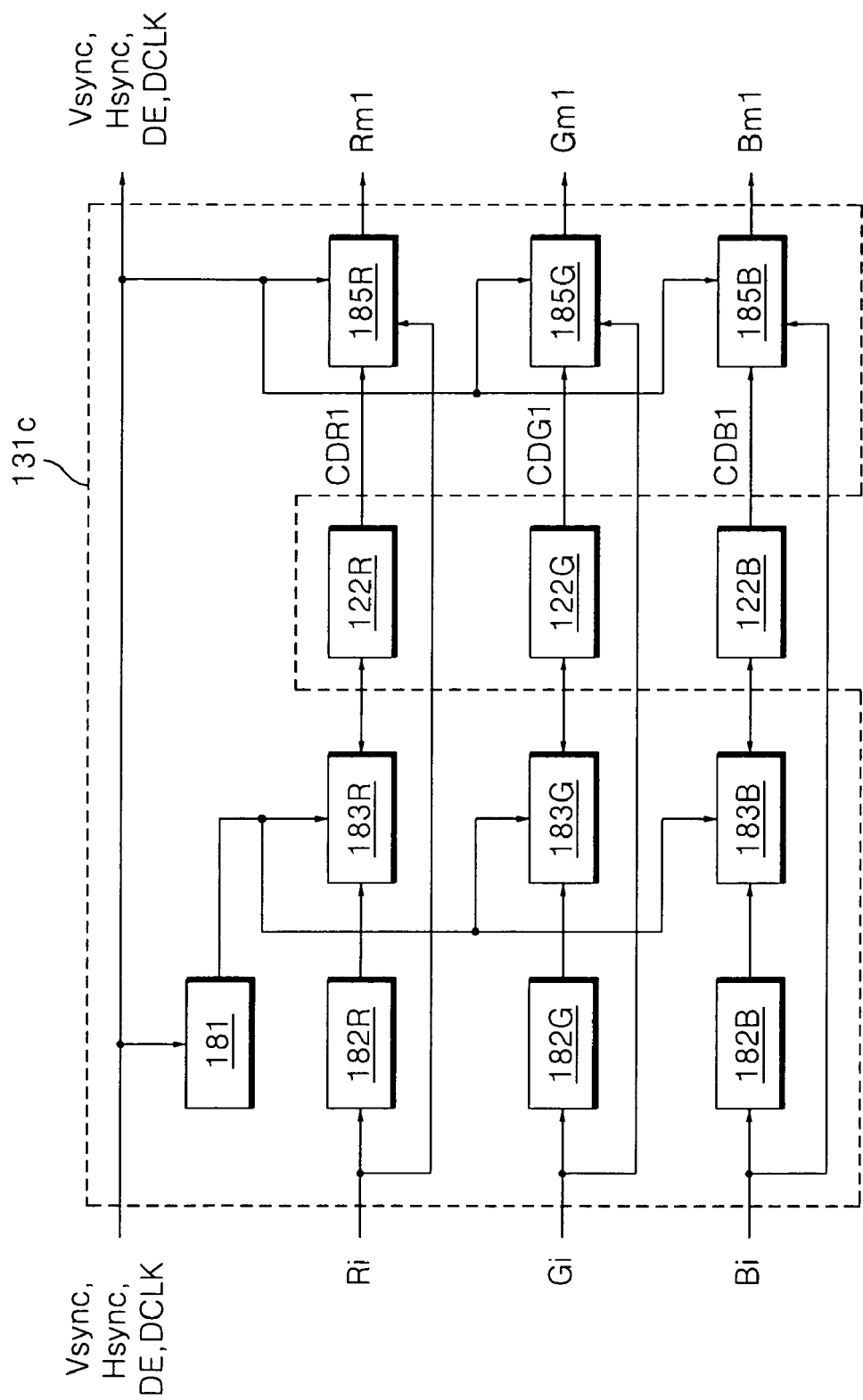

Referring to FIG. 30, the first dithering controller 165R includes a compensation value judging part 173, a pixel location sensing part 172 and a calculating part 174.

The compensation value judging part 173 judges the R compensation value and generated dither data DD to the compensation value which is to be dispersed to the pixels included in the dither pattern. The compensation value judging part 173 is programmed to automatically output the dithering data DD in accordance with the first R compensation data CDR1. For example, the compensation value judging part 173 is pre-programmed so that the compensation value for a 0 gray level is recognized if the first R compensation data CDR1 expressed as a binary data is '00', a ¼ gray level if it is '01', a ½ gray level if it is '10', and a ¾ gray level if it is '11'. In case of performing the dithering for the dither pattern inclusive of 4 pixels, as in FIG. 16, the compensation value judging part 173 generates '1' as the dithering data DD in one pixel location within the dither pattern and generates '0' as the dithering data DD at the remaining 3 pixel locations, as in FIG. 16($a$), if the first R compensation data CDR1 of '01' is supplied. At this moment, the compensation value judging part 173 determines a plurality of dither patterns where the location of the pixel to which the first R compensation data CDR1 is dispersed can be differently designated within the dither data.

The pixel location sensing part 172 senses the pixel location by using of any one of vertical/horizontal synchronization signals Vsync, Hsync, a dot clock DCLK and a data enable signal DE. For example, the pixel location sensing part 171 counts the horizontal synchronization signal Hsync and the dot clock DCLK to sense the pixel location.

The calculating part 174 increases or decreases the input data Ri/Gi/Bi to the dithering data DD, thereby generating a first R intermediate correction data Rm1.

On the other hand, the R input data Ri to be corrected and the first R compensation data CDR1 are supplied to the first dithering controller 165R through the different data transmission lines, or the R input data Ri to be corrected can be combined with the first R compensation data CDR1 to be supplied in the same line. For example, if the R input data to be corrected is '01000000' of 8 bits and the input data Ri, Gi, Bi, which are to be supplied to the panel defect area, are modulated by the FRC and dithering methods. The first compensation part 131C includes a location judging part 181, a gray level judging part 182R, 182G, 182B, an address generator 183R, 183G, 183B and an FRC/dithering controller 185R, 185G, 185B.

The location judging part 181 judges a display location of the data Ri/Gi/Bi on the liquid crystal display panel 103 by using of a vertical/horizontal synchronization signal Vsync, Hsync, a data enable signal DE and a dot clock DCLK.

The gray level judging part 182R, 182G, 182B analyzes a gray level section inclusive of a gray level of the data Ri/Gi/Bi or a gray level of the input data Ri/Gi/Bi.

The address generating part 183R, 183G, 183B generates a read address for reading the first compensation data CDR1, CDG1, CDB1 of the EEPROM 122R, 122G, 122B from the location data of the panel defect area stored at the EEPROM 122R, 122G, 122B, the location judging result of the location judging part 181, and the gray level judging result of the gray level judging part 182R, 182G, 182B, and supplies the read address to the EEPROM 122R, 122G, 122B. The first compensation data CDR1, CDG1, CDB1 outputted from the EEPROM 122R, 122G, 122B are supplied to the FRC/dithering controller 185R, 185G, 185B in accordance with the read address.

The FRC/dithering controller 185R, 185G, 185B disperses the first compensation data CDR1, CDG1, CDB1 from the EEPROM 122R, 122G, 122B to the pixels within the foregoing dither patterns and to a plurality of frame periods, and increases or decreases the data Ri/Gi/Bi, which are to be displayed in the panel defect area, to the dispersed first compensation data CDR1, CDG1, CDB1. The FRC/dithering controller 185R, 185G, 185B includes a first FRC/dithering controller 185R for correcting red data, a second FRC/dithering controller 185G for correcting green data, a third FRC/dithering controller 185B for correcting blue data.

Figure 32:
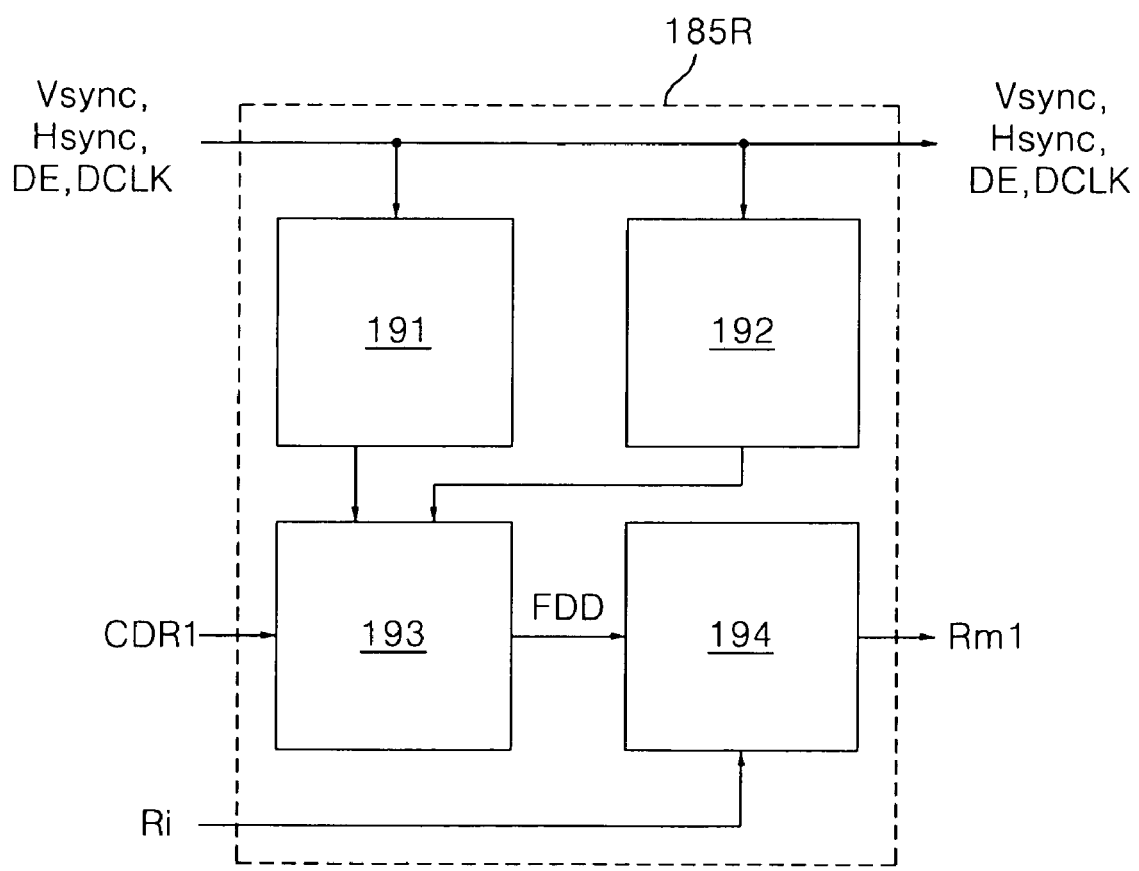

Referring to FIG. 32, the first FRC/dithering controller 183R includes a compensation value judging part 193, a frame number sensing part 191, a pixel location detector 192 and a calculating part 194.

The compensation value judging part 193 judges the R compensation value and generates the FRC/dithering data FDD to the value, which is to be dispersed for a plurality of frame periods and the pixels included in the dither pattern. The compensation value judging part 193 is programmed for the FRC/dithering data FDD to be automatically outputted in accordance with the first R compensation data CDR1. For example, the compensation value judging part 193 is pre-programmed so that the compensation value for a 0 gray level is recognized if the first R compensation data CDR1 expressed as a binary data is '00', a ¼ gray level if it is '01', a ½ gray level if it is '10', and a ¾ gray level if it is '11'. And, in case of carrying out the FRC and dithering having a unit frame inclusive of four frames as an FRC unit and the dither pattern inclusive of four pixels as a dithering unit, as in FIG. 17, '1' is generated as the FRC/dithering data FDD at one pixel location within the dither pattern for four frame periods and '0' is generated as the FRC/dithering data FDD at the remaining three pixel locations, but the location of pixel where '1' is generated is changed fore each frame, as in FIG. 17($a$), if the first R compensation data CDR1 of '01' is supplied. At this moment, the compensation value judging part 193 can determine a plurality of FRC patterns which differently designates the frame to which the first R compensation data CDR1 is to be dispersed and a plurality of dither patterns which differently designates the location of the pixel to which the first R compensation data CDR1 is dispersed within the dither data.

The frame number sensing part 191 senses the frame number using any one of vertical/horizontal synchronization signals Vsync, Hsync, a dot clock DCLK and a data enable signal DE. For example, the frame number sensing part 191 counts the vertical synchronization signal Vsync to sense the frame number.

The pixel location sensing part 192 senses the pixel location by using of any one of vertical/horizontal synchronization signals Vsync, Hsync, a dot clock DCLK and a data enable signal DE. For example, the pixel location sensing part 192 counts the horizontal synchronization signal Hsync and the dot clock DCLK to sense the pixel location.

The calculating part 194 increases or decreases the R input data Ri to the FRC/dithering data FDD, thereby generating a first R intermediate correction data Rm1.

On the other hand, the R input data Ri to be corrected and the first R compensation data CDR1 are supplied to the first FRC controller 183R through the different data transmission lines, or the R input data Ri to be corrected can be combined with the first R compensation data CDR1 to be supplied in the same line. For example, if the R input data to be corrected is '01000000' of 8 bits and the first R compensation data CDR1 is '011' of 3 bits, the '01000000' and '011' can be supplied to the FRC/dithering controller 183 through the different transmission lines respectively or they can be combined to an 11 bit data of '01000000011' to be supplied to the FRC/dithering controller 183. If the R input data Ri to be corrected and the first R compensation data CDR1 are combined to the 11 bit data to be supplied to the FRC/dithering controller 183, the FRC/dithering controller 183 recognizes the upper 8 bits in the 11 bit data as the R input data Ri to be corrected, and the lower 3 bits as the first R compensation data CDR1 to perform the FRC and dithering control. On the other hand, as one example of a method of forming the data of '01000000011' into which the '01000000' and '011' are combined, there is a method that a dummy bit '000' is added to the lowest bit of '01000000' to convert them into '01000000000' and '011' is added to generate the data of '01000000011'.

The second and third dithering controllers 185G, 185B substantially have the same circuit configuration as the first FRC controller 185R. Accordingly, a detail description for the second and third dithering controller 185G, 185B will be omitted.

As described above, the first compensation part 131C according to the third embodiment of the present invention can minutely adjust the data, which are to be displayed in the panel defect area, with the compensation value, which is sub-divided into 1021 gray levels almost without flickers and resolution deterioration for each of the R, G, B when assuming that the R, G, B data are each 8 bits, 4 frames are usingd as the unit frame of the FRC, the dither pattern for dithering is made of 4 pixels, and the compensation value is temporally and spatially dispersed.

Figure 33:
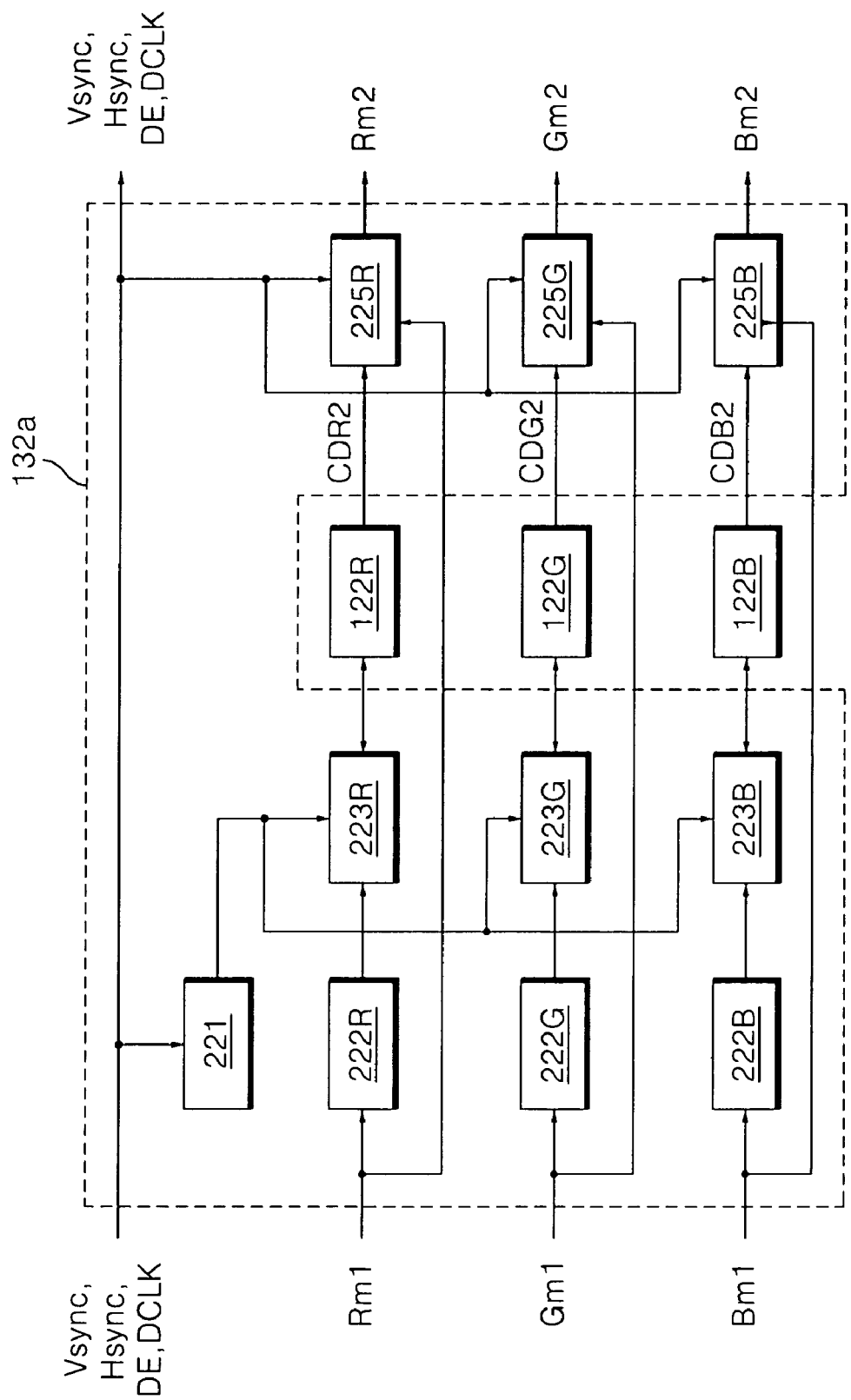
Figure 34:
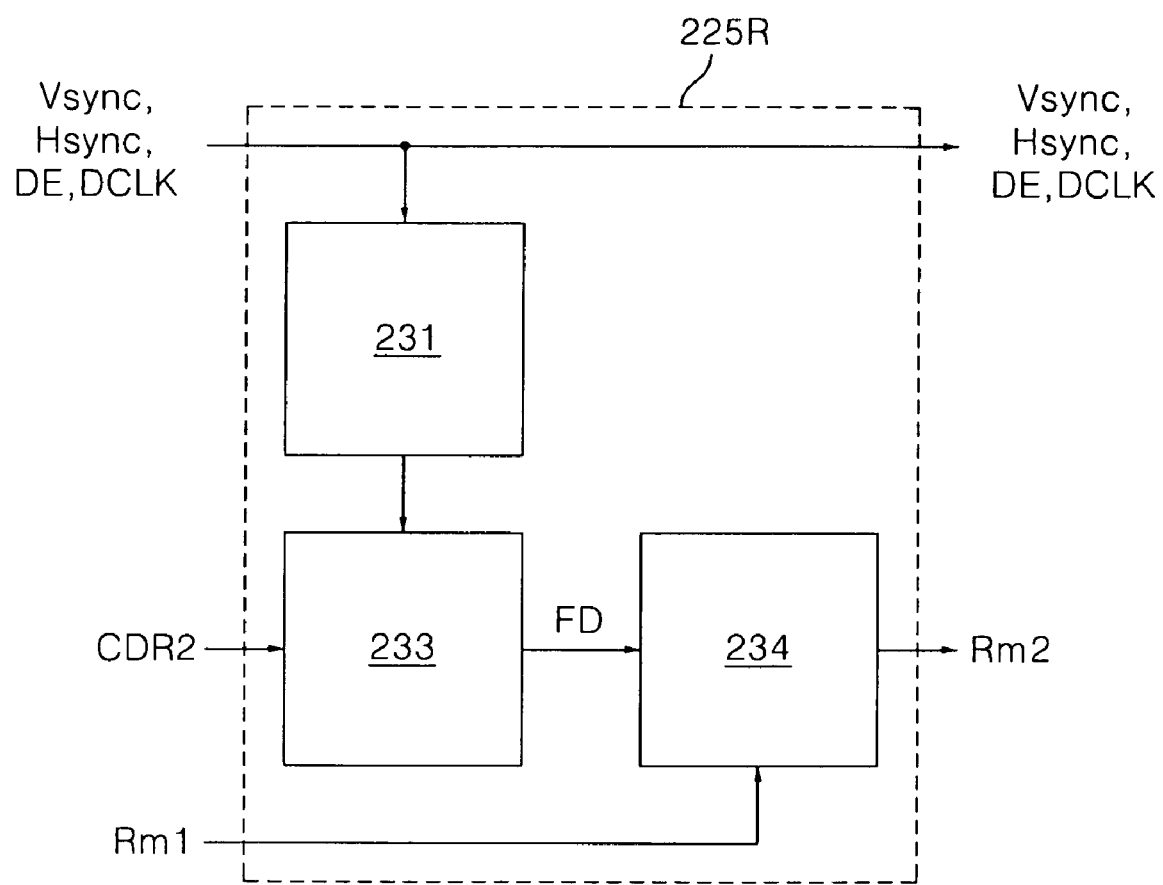
Figure 35:
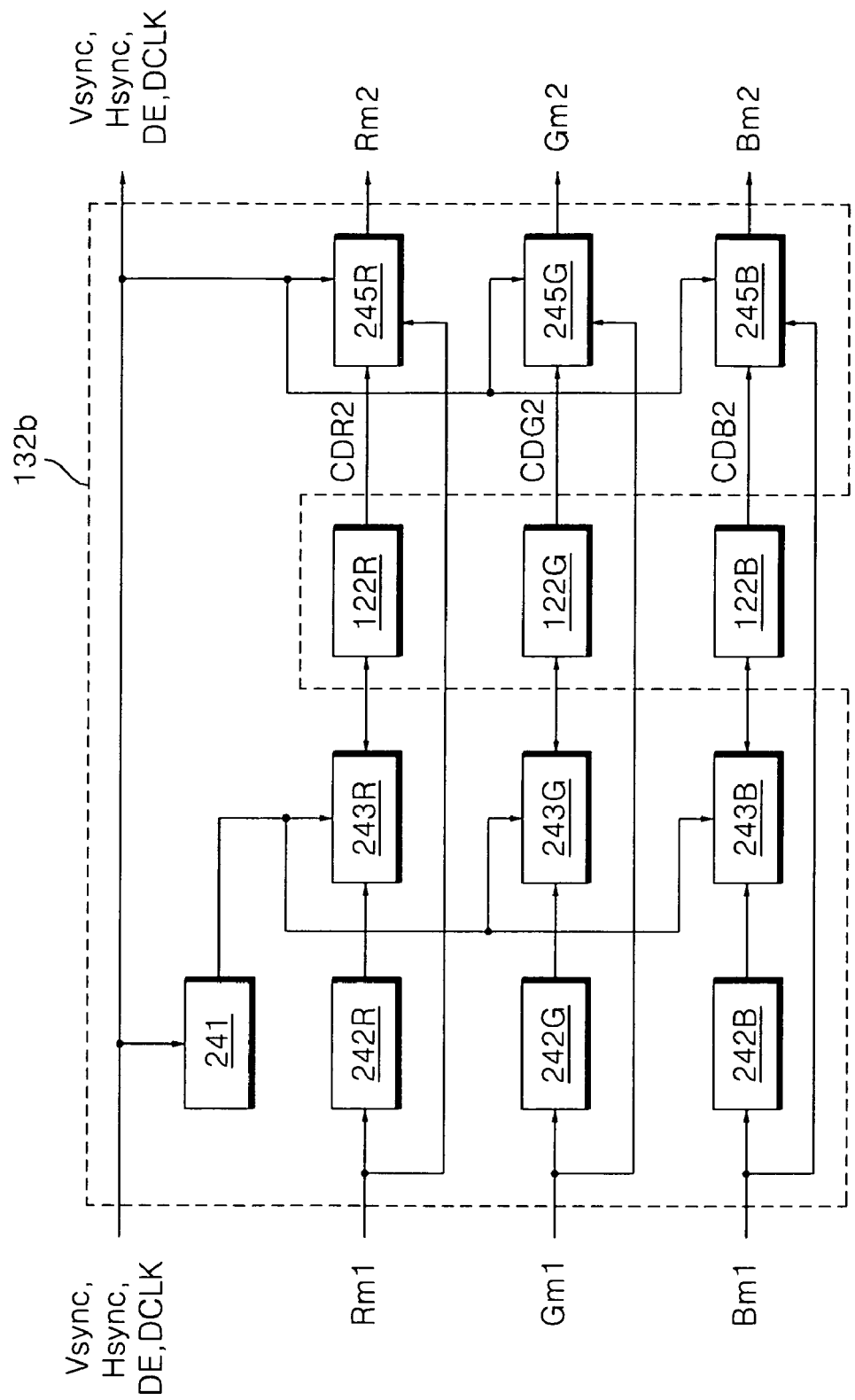

FIGS. 33 to 35 represent embodiments for a second compensating 132 according to the present invention.

Referring to FIG. 33, the second compensation part 132A according to the first embodiment of the present invention modulates the first intermediate correction data Rm1, Gm1, Bm1, which are to be supplied to the bordering part, by the dithering method by using of second compensation data CDR2, CDG2, CDB2 stored at the EEPROM 122R, 122G, 122B. Herein, the first intermediate correction data Rm1, Gm1, Bm1 includes the modulated input data Ri, Gi, Bi through the first compensation part 131 and the un-modulated input data Ri, Gi, Bi. The second compensation part 132A includes a location judging part 221, the gray level judging part 222R, 222G, 222B, an address generator 223R, 223G, 223B and a dithering controller 225R, 225G, 225B.

The location judging part 221 judges a display location of the first intermediate correction data Rm1, Gm1, Bm1 on the liquid crystal display panel 103 by using of a vertical/horizontal synchronization signal Vsync, Hsync, a data enable signal DE and a dot clock DCLK.

The gray level judging part 222R, 222G, 222B analyzes a gray level section inclusive of a gray level of the first intermediate correction data Rm1, Gm1, Bm1 or a gray level of the first intermediate correction data Rm1, Gm1, Bm1.

The address generating part 223R, 223G, 223B generates a read address for reading the second compensation data CDR2, CDG2, CDB2 of the EEPROM 122R, 122G, 122B from the location data of the bordering part stored at the EEPROM 122R, 122G, 122B, the location judging result of the location judging part 221, and the gray level judging result of the gray level judging part 222R, 222G, 222B, and supplies the read address to the EEPROM 122R, 122G, 122B. The second compensation data CDR2, CDG2, CDB2 outputted from the EEPROM 122R, 122G, 122B are supplied to the dithering controller 225R, 225G, 225B in accordance with the read address.

The dithering controller 225R, 225G, 225B disperses the second compensation data CDR2, CDG2, CDB2 from the EEPROM 122R, 122G, 122B to each pixel within a dither pattern having a plurality of pixels, and increases or decreases the first intermediate correction data Rm1, Gm1, Bm1 to be displayed in the bordering part to the dispersed second compensation data CDR2, CDG2, CDB2. The dithering controller 225R, 225G, 225B includes a first dithering controller 225R for correcting red data, a second dithering controller 225G for correcting green data, and a third dithering controller 225B for correcting blue data.

Referring to FIG. 34, the first dithering controller 225R includes a compensation value judging part 233, a pixel location sensing part 232 and a calculating part 234.

The compensation value judging part 233 judges the R compensation value and generates dither data DD to the compensation value which is to be dispersed to the pixels included in the dither pattern. The compensation value judging part 233 is programmed to automatically output the dithering data DD in accordance with the second R compensation data CDR2. For example, the compensation value judging part 233 is pre-programmed so that the compensation value for a 0 gray level is recognized if the second R compensation data CDR2 expressed as a binary data is '00', a ¼ gray level if it is '01', a ½ gray level if it is '10', and a ¾ gray level if it is '11'. And, in case of performing the dithering for the dither pattern inclusive of 4 pixels, as in FIG. 34, the compensation value judging part 233 generates '1' as the dithering data DD in one pixel location within the dither pattern and generates '0' as the dithering data DD at the remaining 3 pixel locations, as in FIG. 19B (a), if the second R compensation data CDR2 of '01' is supplied. The compensation value judging part 233 determines a plurality of dither patterns where the location of the pixel to which the second R compensation data CDR2 is dispersed can be differently designated within the dither pattern. And, different dither patterns between the vertically or horizontally adjacent dither patterns DD are applied.

The pixel location sensing part 232 senses the pixel location using any one of vertical/horizontal synchronization signals Vsync, Hsync, a dot clock DCLK and a data enable signal DE. For example, the pixel location sensing part 232 counts the horizontal synchronization signal Hsync and the dot clock DCLK to sense the pixel location.

The calculating part 234 increases or decreases the first intermediate data (Rm2) to the dithering data DD, thereby generating a second R intermediate correction data Rm2.

On the other hand, the first R intermediate correction data Rm1 to be corrected and the R compensation data CDR2 are supplied to the first dithering controller 225R through the different data transmission lines, or the first R intermediate correction data Rm1 to be corrected can be combined with the R compensation data CDR2 to be supplied in the same line. For example, if the first R intermediate correction data Rm1 to be corrected is '01000000' of 8 bits and the R compensation data CDR2 is '011' of 3 bits, the '01000000' and '011' can be supplied to the first dithering controller 225R through the different data transmission lines respectively or they can be combined to an 11 bit data of '01000000011' to be supplied to the first dithering controller 225R. If the first R intermediate correction data Rm1 to be corrected and the R compensation data CDR2 are combined to the 11 bit data to be supplied to the first dithering controller 225R, the first dithering controller 225R recognizes the upper 8 bits in the 11 bit data as the first R intermediate correction data Rm1 to be corrected, and the lower 3 bits as the R compensation data CDR2. On the other hand, as one example of a method of forming the data of '01000000011' into which the '01000000' and '011' are combined, there is a method that a dummy bit '000' is added to the lowest bit of '01000000' to convert them into '01000000000' and '011' is added to generate the data of '01000000011'.

The second and third dithering controllers 225G, 225B substantially have the same circuit configuration as the first dithering controller 225R. Accordingly, a detail description for the second and third dithering controllers 225G, 225B will be omitted.

As described above, the second compensation part 132A according to the first embodiment of the present invention can minutely adjust the data to be displayed in the panel defect area to the compensation value which is sub-divided into 1021 gray levels for each of R, G, B, when assuming that the R, G, B data are each 8 bit, the dither pattern for dithering is composed of 4 pixel, and the compensation value is spatially dispersed, and it is possible to prevent the brightness jump which appears between the dither patterns and which is causingd by the application of the normal dither pattern.

Referring to FIG. 35, the second compensation part 132B according to the second embodiment of the present invention modulates the first intermediate correction data Rm1, Gm1, Bm1, which are to be supplied to the panel defect area, by the FRC and dithering methods by using of second compensation data CDR2, CDG2, CDB2 stored at the EEPROM 122R, 122G, 122B. Herein, the first intermediate correction data Rm1, Gm1, Bm1 includes the modulated input data Ri, Gi, Bi through the first compensation part 131 and the un-modulated input data Ri, Gi, Bi. The second compensation part 132B includes a location judging part 241, the gray level judging part 242R, 242G, 242B, an address generator 243R, 243G, 243B and a FRC/dithering controller 245R, 245G, 245B.

The location judging part 241 judges a display location of the first intermediate correction data Rm1, Gm1, Bm1 on the liquid crystal display panel 103 by using of a vertical/horizontal synchronization signal Vsync, Hsync, a data enable signal DE and a dot clock DCLK.

The gray level judging part 242R, 242G, 242B analyzes a gray level section inclusive of a gray level of the first intermediate correction data Rm1, Gm1, Bm1 or a gray level of the first intermediate correction data Rm1, Gm1, Bm1.

The address generating part 243R, 243G, 243B generates a read address for reading the second compensation data CDR2, CDG2, CDB2 of the EEPROM 122R, 122G, 122B from the location data of the panel defect area stored at the EEPROM 122R, 122G, 122B, the location judging result of the location judging part 241, and the gray level judging result of the gray level judging part 242R, 242G, 242B, and supplies the read address to the EEPROM 122R, 122G, 122B. The second compensation data CDR2, CDG2, CDB2 outputted from the EEPROM 122R, 122G, 122B are supplied to the FRC/dithering controller 245R, 245G, 245B in accordance with the read address.

The FRC/dithering controller 245R, 245G, 245B disperses the second compensation data CDR2, CDG2, CDB2 from the EEPROM 122R, 122G, 122B to the pixels within the foregoing dither patterns and to a plurality of frame periods, and increases or decreases the data Ri/Gi/Bi, which are to be displayed in the panel defect area, to the dispersed second compensation data CDR2, CDG2, CDB2. The FRC/dithering controller 245R, 245G, 245B includes a first FRC/dithering controller 245R for correcting red data, a second FRC/dithering controller 245G for correcting green data, a third FRC/dithering controller 245B for correcting blue data.

Figure 36:
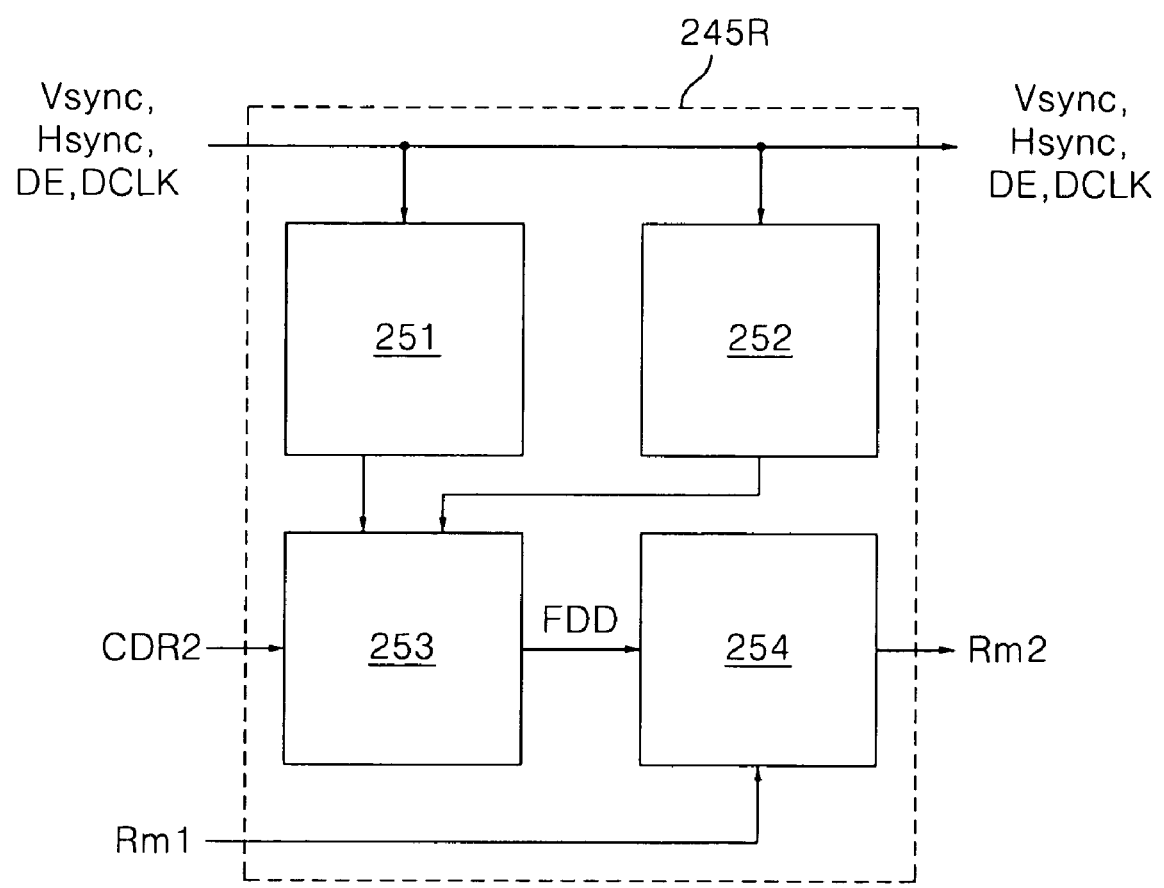

Referring to FIG. 36, the first FRC/dithering controller 245R includes a compensation value judging part 253, a frame number sensing part 251, a pixel location detector 252 and a calculating part 254.

The compensation value judging part 253 judges the R compensation value and generates the FRC/dithering data FDD to the value, which is to be dispersed for a plurality of frame periods and the pixels included in the dither pattern. The compensation value judging part 253 is programmed for the FRC/dithering data FDD to be automatically outputted in accordance with the second R compensation data CDR2. For example, the compensation value judging part 253 is pre-programmed so that the compensation value for a 0 gray level is recognized if the second R compensation data CDR2 expressed as a binary data is '00', a ¼ gray level if it is '01', a ½ gray level if it is '10', and a ¾ gray level if it is '11'. In case of carrying out the FRC having a unit frame inclusive of four frames as an FRC unit and the dither pattern inclusive of four pixels as a dithering unit, '1' is generated as the FRC/dithering data FDD at one pixel location within the dither pattern for four frame periods and '0' is generated as the FRC/dithering data FDD at the remaining three pixel locations, but the location of pixel where '1' is generated is changed fore each frame, if the second R compensation data CDR2 of '01' is supplied. At this moment, the compensation value judging part 253 can determine a plurality of FRC patterns which differently designates the frame to which the second R compensation data CDR2 is to be dispersed and a plurality of dither patterns which differently designates the location of the pixel to which the second R compensation data CDR2 is dispersed within the dither pattern.

The frame number sensing part 251 senses the frame number by using of any one of vertical/horizontal synchronization signals Vsync, Hsync, a dot clock DCLK and a data enable signal DE. For example, the frame number sensing part 251 counts the vertical synchronization signal Vsync to sense the frame number.

The pixel location sensing part 252 senses the pixel location by using of any one of vertical/horizontal synchronization signals Vsync, Hsync, a dot clock DCLK and a data enable signal DE. For example, the pixel location sensing part 252 counts the horizontal synchronization signal Hsync and the dot clock DCLK to sense the pixel location.

The calculating part 254 increases or decreases the first R intermediate correction data Rm1 to the FRC/dithering data FDD, thereby generating a second R intermediate correction data Rm2.

On the other hand, the first R intermediate correction data Rm1 to be corrected and the second R compensation data CDR2 are supplied to the first FRC/dithering controller 243R through the different data transmission lines, or the first R intermediate correction data Rm1 to be corrected can be combined with the second R compensation data CDR2 to be supplied in the same line. For example, if the first R intermediate correction data Rm1 to be corrected is '01000000' of 8 bits and the second R compensation data CDR2 is '011' of 3 bits, the '01000000' and '011' can be supplied to the FRC/dithering controller 253 through the different data transmission lines respectively or they can be combined to an 11 bit data of '01000000011' to be supplied to the FRC/dithering controller 253. If the first R intermediate correction data Rm1 to be corrected and the second R compensation data CDR2 are combined to the 11 bit data to be supplied to the FRC/dithering controller 253, the FRC/dithering controller 253 recognizes the upper 8 bits in the 11 bit data as the first R intermediate correction data Rm1 to be corrected, and the lower 3 bits as the second R compensation data CDR2 to perform the FRC and dithering control. On the other hand, as one example of a method of forming the data of '01000000011' into which the '01000000' and '011' are combined, there is a method that a dummy bit '000' is added to the lowest bit of '01000000' to convert them into '01000000000' and '011' is added to generate the data of '01000000011'.

The second and third dithering controllers 245G, 245B substantially have the same circuit configuration as the first FRC controller 245R. Accordingly, a detail description for the second and third dithering controller 245G, 245B will be omitted.

As described above, the second compensation part 132B according to the second embodiment of the present invention can minutely adjust the data, which are to be displayed in the panel defect area, with the compensation value, which is sub-divided into 1021 gray levels almost without flickers and resolution deterioration for each of the R, G, B when assuming that the R, G, B data are each 8 bits, 4 frames are usingd as the unit frame of the FRC, the dither pattern for dithering is made of 4 pixels, and the compensation value is temporally and spatially dispersed. And further, it is possible to prevent the brightness jump from appearing between the dither patterns causingd by the application of the regular dither pattern.

Figure 37:
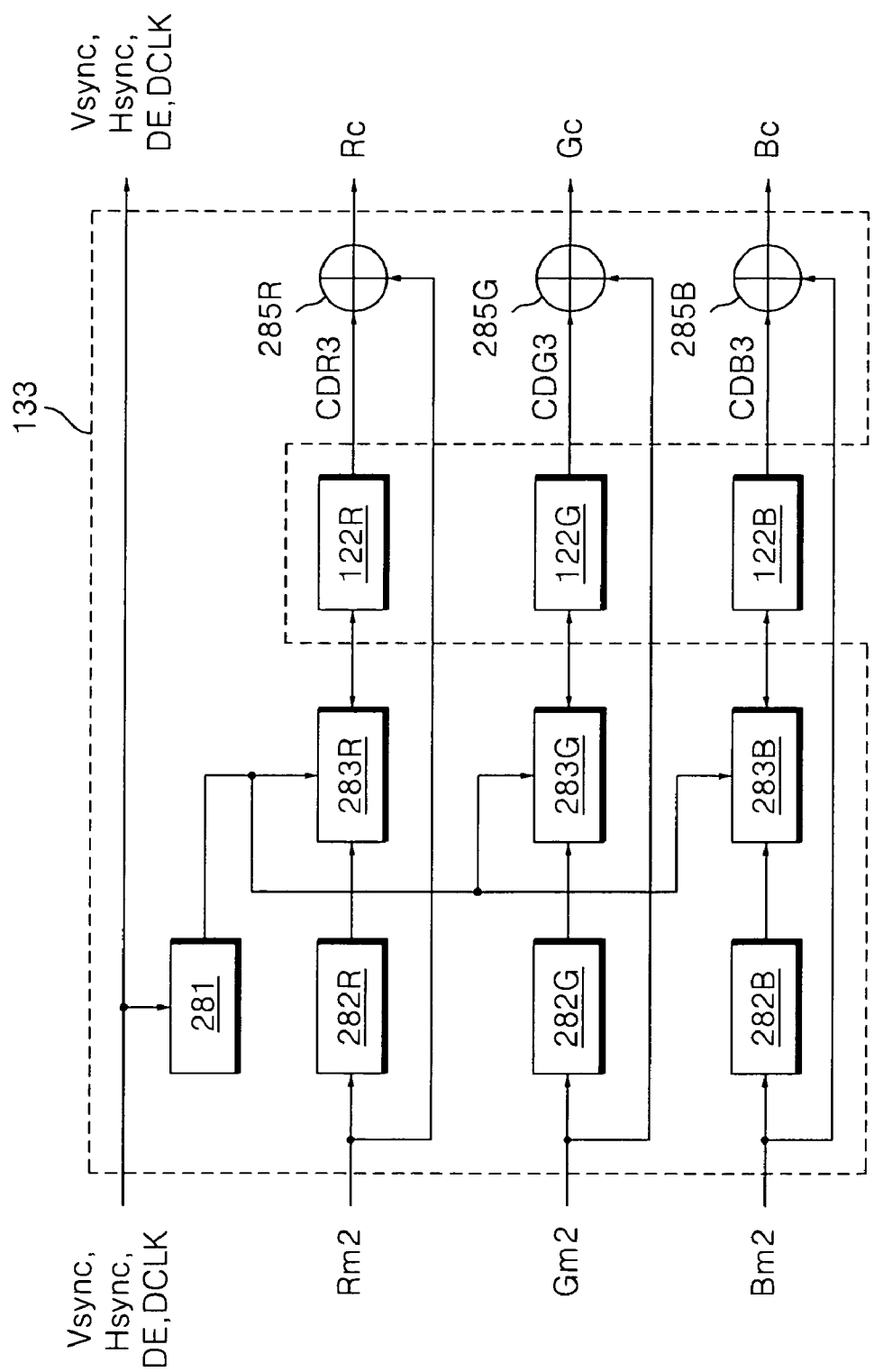

FIG. 37 shows an embodiment for a third compensation part 133 according to the present invention.

Referring to FIG. 37, the third compensation part 133 according to the embodiment of the present invention modulates the second intermediate correction data Rm2, Gm2, Bm2, which are to be supplied to the link pixel by increasing or decreasing to third compensation data CDR3, CDG3, CDB3 stored at the EEPROM 122R, 122G, 122B. Herein, the second intermediate correction data Rm2, Gm2, Bm2 includes the modulated input data Gi, Gi, Bi through the first and second compensation parts 131, 132 and the un-modulated input data Ri, Gi, Bi. The third compensation part 133 includes a location judging part 281, the gray level judging part 282R, 282G, 282B, an address generator 283R, 283G, 283B and a calculating part 285R, 285G, 285B.

The location judging part 281 judges a display location of the second intermediate correction data Rm2, Gm2, Bm2 on the liquid crystal display panel 103 by using of a vertical/horizontal synchronization signal Vsync, Hsync, a data enable signal DE and a dot clock DCLK.

The gray level judging part 282R, 282G, 282B analyzes a gray level section inclusive of a gray level of the second intermediate correction data Rm2, Gm2, Bm2 or a gray level of the second intermediate correction data Rm2, Gm2, Bm2.

The address generating part 283R, 283G, 283B generates a read address for reading the third compensation data CDR3, CDG3, CDB3 of the EEPROM 122R, 122G, 122B from the location data of the like pixel stored at the EEPROM 122R, 122G, 122B, the location judging result of the location judging part 281, and the gray level judging result of the gray level judging part 282R, 282G, 282B, and supplies the read address to the EEPROM 122R, 122G, 122B. The third compensation data CDR3, CDG3, CDB3 outputted from the EEPROM 122G, 122B are supplied to the FRC/dithering controller 285R, 285G, 285B in accordance with the read address.

The calculating part 285R, 285G, 285B increases or decreases the second R intermediate correction data Rm2, Gm2, Bm2 to the third compensation data CDR3, CDG3, CDB3 to generated the corrected data Rc, Gc, Bc. On the other hand, the calculating part 285R, 285G, 285B might include a multiplier or divider, which multiplies the third compensation data CDR3, CDG3, CDB3 to the second intermediate correction data Rm2, Gm2, Bm2 or divides the second intermediate correction data Rm2, Gm2, Bm2 by the third compensation data CDR3, CDG3, CDB3, other than an adder or subtractor.

The data Rc, Gc, Bc corrected by the above-mentioned first to third compensation parts 131, 132, 133 are supplied to the liquid crystal display panel j103 through the timing controller 104 and the data drive circuit 101 to display the picture of which the quality is corrected.

On the other hand, the flat panel display device and the picture quality controlling method according to the embodiment of the present invention has been explained centering on the liquid crystal display device, but it can be similarly applied to other flat panel display device such as an active matrix organic light emitting diode (OLED).

As described above, the flat panel display device and the picture quality controlling method according to the embodiment of the present invention carries out an electrical compensation with the picture quality controlling method where a minute adjustment such as FRC and dithering is possible for the bordering part of the panel defect area and the non-defect area and the panel defect area of the display panel, thus it is possible to do more natural picture quality compensation. Especially, irregularity of the dither pattern is applied to the dither patterns which are arranged in parallel when performing the dithering, thus the brightness jump between the dither patterns can be prevented. And, the electrical compensation is performed for the link pixel formed by the repair process which connects the defect pixel with the normal pixel, thereby clearly reducing the degree of perception of the defect pixel so that the panel defect can be perfectly compensated.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A flat panel display device, comprising:
a display panel having a non-defect area and a panel defect area;
a memory to store first compensation data for compensating the panel defect area and, a second compensation data for compensating a boundary between the panel defect area and the non-defect area;
a first compensation part to change a first data that are to be displayed in the panel defect area to the first compensation data by dispersing the first compensation data to the panel defect area;
a second compensation part to change a second data that are to be displayed in a fixed area inclusive of the boundary to the second compensation data by dispersing the second compensation data to the fixed area inclusive of the boundary; and
a driver for driving the display panel using the first and second data which are changed by the first and second compensation parts,
wherein the first compensation part comprises:
a location judging part judging and outputting a first location information of the first data;
a gray level judging part analyzing and outputting a first gray level information of the first data;

an address generating part generating a read address for reading the first compensation data of the memory using the first location information and the first gray level information, wherein the memory outputs the first compensation data in accordance with the first read address; and a FRC (Frame Rate Control) controller compensating the first data with the first compensation data by dispersing the first compensation data for a plurality of frame periods in the panel defect area, wherein the second compensation part comprises:

a location judging part judging and outputting a second location information of the second data;

a gray level judging part analyzing and outputting a second gray level information of the second data;

an address generating part generating a second read address for reading the second compensation data of the memory using the second location information and the second gray level information, wherein the memory outputs the second compensation data in accordance with the second read address; and a FRC controller compensating the second data with the second compensation data by dispersing the second compensation data for a plurality of frame periods in the boundary.

2. The flat panel display device according to claim 1, wherein the display panel includes at least one link pixel in the non-defect area connected to a pixel in the panel defect area and a third compensation part to change third data that are to be displayed in the at least one link pixel to a third compensation data.

3. The flat panel display device according to claim 2, wherein the third compensation part increases or decreases the third data to the third compensation data.

4. The flat panel display device according to claim 2, wherein the link pixel includes a defect pixel and a normal pixel that is electrically connected to the defect pixel.

5. The flat panel display device according to claim 1, wherein the memory includes at least any one of EEPROM and EDID ROM.

6. The flat panel display device according to claim 1, wherein the first compensation data differ in accordance with a gray level of the first data and a location of the panel defect area.

7. The flat panel display device according to claim 1, wherein the second compensation data differ in accordance with a gray level of the second data and a location of the boundary.

8. The flat panel display device according to claim 1, wherein the third compensation data differ in accordance with a gray level of the third data and a location of the link pixel.

9. A method of controlling picture quality of a flat panel display device, comprising:

determining a first compensation data for compensating first data that are to be displayed in a panel defect area of the display panel, a second compensation data for compensating second data that are to be displayed in a boundary between the panel defect area and a non-defect area of the display panel;

storing the first and second compensation data to a memory;

a first compensation step of adjusting the first data that are to be displayed in the panel defect area to the first compensation data through a dispersion method;

a second compensation step of adjusting the second data that are to be displayed in a fixed area inclusive of the boundary to the second compensation data by dispersing the second compensation data to the fixed area inclusive of the boundary;

driving the display panel by using the first and second data which are adjusted by the first and second compensation steps, wherein the first compensation step comprises:

a location judging step of judging and outputting a first location information of the first data:

a gray level judging step of analyzing and outputting a first gray level information of the first data;

an address generating step of generating a read address for reading the first compensation data of the memory using the first location information and the first gray level information, wherein the memory outputs the first compensation data in accordance with the first read address; and a FRC (Frame Rate Control) controlling step of compensating the first data with the first compensation data by dispersing the first compensation data for a plurality of frame periods in the panel defect area, wherein the second compensation step comprises:

a location judging step of judging and outputting a second location information of the second data;

a gray level judging step of analyzing and outputting a second gray level information of the second data;

an address generating step of generating a second read address for reading the second compensation data of the memory_ using the second location information and the second gray level information, wherein the memory outputs the second compensation data in accordance with the second read address; and a FRC controlling step of compensating the second data with the second compensation data by dispersing the second compensation data for a plurality of frame periods in the boundary.

10. The method of claim 9, further comprising a third compensation step of changing the data that are to be displayed in a link pixel where adjacent pixels are connected to each other in the display panel to third compensation data for compensating the data that are to be displayed in the link pixel .

11. The method according to claim 10, wherein the third compensation data differ in accordance with a gray level of the third data and a location of the link pixel.

12. The method according to claim 9, wherein the third compensation step increases or decreases the data that are to be displayed in the link pixel to the third compensation data.

13. The method according to claim 9, wherein the first compensation data differ in accordance with a gray level of the first data and a location of the panel defect area.

14. The method according to claim 9, wherein the second compensation data differ in accordance with a gray level of the second data and a location of the boundary.

* * * * *